(12) United States Patent
Iwaki et al.

(10) Patent No.: US 11,572,939 B2
(45) Date of Patent: Feb. 7, 2023

(54) TRANSMISSION STRUCTURE AND WORKING VEHICLE

(71) Applicant: KANZAKI KOKYUKOKI MFG. CO., LTD., Amagasaki (JP)

(72) Inventors: Koji Iwaki, Amagasaki (JP); Kazuhiro Owada, Amagasaki (JP); Kengo Sasahara, Amagasaki (JP)

(73) Assignee: Kanzaki Kokyukoki Mfg. Co., Ltd., Amagasaki (JP)

( * ) Notice: Subject to any disclaimer, the term of this patent is extended or adjusted under 35 U.S.C. 154(b) by 0 days.

(21) Appl. No.: 17/454,922

(22) Filed: Nov. 15, 2021

(65) Prior Publication Data
US 2022/0074491 A1 Mar. 10, 2022

Related U.S. Application Data

(63) Continuation of application No. 16/654,533, filed on Oct. 16, 2019, now Pat. No. 11,204,097.

(30) Foreign Application Priority Data

Oct. 19, 2018 (JP) .............................. JP2018-197738
Nov. 22, 2018 (JP) .............................. JP2018-218789

(Continued)

(51) Int. Cl.
*F16H 61/462* (2010.01)
*F16H 3/44* (2006.01)
(Continued)

(52) U.S. Cl.
CPC ............. *F16H 47/04* (2013.01); *B60K 17/02* (2013.01); *B60K 17/10* (2013.01); *F16H 3/62* (2013.01);
(Continued)

(58) Field of Classification Search
CPC ...... F16H 61/462; F16H 3/62; F16H 37/0833; F16H 37/042; F16H 47/04;
(Continued)

(56) References Cited

U.S. PATENT DOCUMENTS 3,966,005 A 6/1976 Binger
8,308,597 B2 * 11/2012 Hiraoka .................. F16H 47/04
475/219

(Continued)

FOREIGN PATENT DOCUMENTS

JP 4162328 B2 10/2008
JP 5822761 B2 10/2015

*Primary Examiner* — Tinh Dang
(74) *Attorney, Agent, or Firm* — Sterne, Kessler, Goldstein & Fox P.L.L.C.

(57) ABSTRACT

In a transmission structure according to this invention, speed change ratios of input side first and second transmission mechanisms are set so that the rotational speed of a planetary second element is the same when an HST output is set to a second HST speed in either a first transmission state or a second transmission state, and the rotational speed of a planetary first element is the same when the HST output is set to the second HST speed in either the second transmission state or the first transmission state. The speed change ratios of an output side first and second transmission mechanisms are set so that the rotational speed developed in a speed change output shaft when the HST output is set to the second HST speed is the same in either the first or second transmission states.

14 Claims, 29 Drawing Sheets

(30) Foreign Application Priority Data

| | | | |
|---|---|---|---|
| Nov. 27, 2018 | (JP) | ............................. | JP2018-221546 |
| Dec. 11, 2018 | (JP) | ............................. | JP2018-231234 |
| Mar. 18, 2019 | (JP) | ............................. | JP2019-049886 |
| Jul. 4, 2019 | (JP) | ............................. | JP2019-125483 |

(51) Int. Cl.

| | |
|---|---|
| *F16H 47/04* | (2006.01) |
| *F16H 3/62* | (2006.01) |
| *F16H 37/04* | (2006.01) |
| *B60K 17/10* | (2006.01) |
| *B60K 17/02* | (2006.01) |
| *F16H 37/08* | (2006.01) |

(52) U.S. Cl.
 CPC ......... *F16H 37/042* (2013.01); *F16H 61/462* (2013.01); *F16H 37/0833* (2013.01)

(58) Field of Classification Search
 CPC .......... F16H 61/0202; B60Y 2200/221; B60Y 17/10; B60Y 17/02
 See application file for complete search history.

(56) References Cited

U.S. PATENT DOCUMENTS

| | | | |
|---|---|---|---|
| 8,452,500 | B1 | 5/2013 | Seipold |
| 8,608,605 | B2 | 12/2013 | Hiraoka et al. |
| 8,657,713 | B2 * | 2/2014 | Hana ...................... F16H 47/04 |
| | | | 180/53.4 |
| 8,882,623 | B2 | 11/2014 | Mutschler et al. |
| 9,744,843 | B2 | 8/2017 | Kochidomar et al. |
| 9,874,279 | B1 * | 1/2018 | Guo ........................ F16H 61/70 |
| 2006/0032321 | A1 | 2/2006 | Aitzetmueller et al. |
| 2011/0021302 | A1 | 2/2011 | Panizzolo et al. |
| 2012/0046138 | A1 | 2/2012 | Hana et al. |
| 2012/0225746 | A1 | 9/2012 | Hiraoka et al. |
| 2014/0128196 | A1 | 5/2014 | Rintoo |
| 2015/0018153 | A1 | 1/2015 | Stålberg et al. |
| 2015/0072823 | A1 | 3/2015 | Rintoo |
| 2015/0292610 | A1 | 10/2015 | Rintoo |
| 2016/0312872 | A1 * | 10/2016 | Hirase ................ F16H 57/0457 |

\* cited by examiner

TRANSMISSION STRUCTURE AND WORKING VEHICLE

TECHNICAL FIELD

The present invention relates to a transmission structure including a hydromechanical transmission structure (HMT structure) that has a hydrostatic transmission (HST) and a planetary gear mechanism, and a working vehicle provided with the transmission structure.

BACKGROUND ART

The HMT structure containing a combination of the HST and the planetary gear mechanism has been suitably used for a traveling system transmission path of working vehicles, such as a combine and a tractor, for example. Further, various configurations for expanding the vehicle speed variable range in the working vehicle provided with the HMT structure have also been proposed.

For example, Japanese Patent No. 5822761 (hereinafter referred to as Patent Document 1) discloses a combine in which the HMT structure and a multistage speed change structure having three speed change stages of a low speed stage, an intermediate speed stage, and a high speed stage are disposed in series in a traveling system transmission path, whereby the vehicle speed variable range is extended.

However, the configuration described in Patent Document 1 assumes that a speed change operation of the multistage speed change structure is performed in advance before starting the traveling of a vehicle, and thus, when the speed change operation of the multistage speed change structure is performed during the vehicle traveling, the following inconveniences arise.

This point is described taking, as an example, a case where the HMT structure is operated to increase the traveling vehicle speed in a state where the multistage speed change structure is engaged with the low speed stage, and, when the traveling vehicle speed reaches a predetermined vehicle speed, the multistage speed change structure is speed-changed from the low speed stage to the intermediate speed stage.

In this case, in a stage where an output of the HMT structure reaches the maximum speed or around the maximum speed in the low speed stage engagement state of the multistage speed change structure, the multistage speed change structure is shifted from the low speed stage to the intermediate speed stage while the output of the HMT structure is maintained at the maximum speed or around the maximum speed, which causes a significant vehicle speed change in speed changing, so that the ride comfort reduces and an excessive load is applied to the traveling system transmission path.

With respect to this point, Japanese Patent No. 4162328 (hereinafter referred to as Patent Document 2) proposes a working vehicle transmission in which the HMT structure and the multistage speed change structure are disposed in series in the traveling system transmission path and which can suppress a vehicle speed change to prevent the application of an excessive load to the traveling system transmission path even when the multistage speed change structure is speed-changed during the vehicle traveling.

In detail, the transmission described in Patent Document 2 is provided with the HMT structure having the HST and the planetary gear mechanism, the multistage speed change structure speed-changing the output of the HMT structure in multiple stages, and a lock-up mechanism.

The HST has a pump inputting rotation power from a driving source, a motor fluidly driven by the pump, and an output adjustment member varying the capacity of at least one of the pump and the motor (for example, pump), in which the output adjustment member operates according to the operation amount of a speed change operation member which is manually operated, so that the rotational speed of the motor continuously changes in response to the operation.

The planetary gear mechanism is configured to synthesize rotation power from the HST input into a sun gear and rotation power from a driving source input into the carrier, and output the synthesized rotation power from an internal gear toward the multistage speed change structure.

The lock-up mechanism is configured to synchronously rotate the carrier and the internal gear only during a speed change period of the multistage speed change structure.

The speed change operation of the transmission described in Patent Document 2 is described taking a case where the multistage speed change structure is accelerated from a first speed stage to a second speed stage as an example.

When the speed change operation member is operated in a acceleration direction within the first speed stage operation range, the output adjustment member is moved in a direction of changing the speed from a first HST speed (for example, reverse rotation side maximum speed) to a second HST speed (for example, normal rotation side maximum speed).

Then, when the speed change operation member is operated to a boundary position between the first speed stage operation range and a second speed stage operation range, the output adjustment member is operated to a second HST speed position (for example, normal rotation side maximum tilted position), so that an HST output is brought into the second HST speed (for example, normal rotation side maximum speed).

This state is the maximum speed output state of the HMT structure in a first speed stage engagement state of the multistage speed change structure.

When the speed change operation member is operated to the second speed stage operation range beyond the boundary position between the first speed stage operation range and the second speed stage operation range, the speed of the multistage speed change structure is accelerated from the first speed stage to the second speed stage in response to the operation.

In the speed change period of the multistage speed change structure, the internal gear and the carrier are coupled by the lock mechanism to be synchronously rotated as described above.

Thus, the rotation power synchronized with the rotation power from the driving source input into the carrier is transmitted to the multistage speed change structure to which the rotation power from the internal gear is input.

Meanwhile, in the speed change period of the multistage speed change structure, the output adjustment member is brought into a free state where the connection with the speed change operation member is canceled. Therefore, a motor shaft and the sun gear which are operatively coupled with each other are rotated at a rotational speed (hereinafter referred to as "speed change period rotational speed") defined by the rotational speed of the internal gear and the carrier which are coupled by the lock mechanism to be synchronously rotated with the rotation power from the driving source.

Thus, the output adjustment member is returned from the second HST speed position (for example, normal rotation side maximum tilted position) to a position where an HST output corresponding to the speed change period rotational speed of the sun gear is developed (hereinafter referred to as "speed change period reference position") in a direction toward the first HST speed position.

Thereafter, when the speed change operation member is operated in the acceleration direction within the second speed stage operation range, the output adjustment member is operated from the speed change period reference position toward the second HST speed position, so that the rotational speed of the motor shaft is accelerated.

Thus, the rotational speed of the sun gear rotationally driven by the HST output from the motor shaft is accelerated, so that the rotational speed of the internal gear is accelerated.

As described above, in the transmission described in Patent Document 2, the rotation power input into the sun gear in the speed change operation of the multistage speed change structure is reduced from the second HST speed (for example, normal rotation side maximum speed) to the speed change period rotational speed.

Although the transmission described in Patent Document 2 having such a configuration is useful in the point that the change width of the traveling vehicle speed in the speed change of the multistage speed change structure can be suppressed as compared with the configuration described in Patent Document 1, a certain large degree of speed change has still remained in the traveling vehicle speed in the speed change of the multistage speed change structure.

SUMMARY OF THE INVENTION

The present invention has been made in view of the above-described conventional technique. It is a first object of the present invention to provide a transmission structure having an HST and a planetary gear mechanism and a speed change output shaft operatively driven by an output portion of the planetary gear mechanism and capable of extending the speed change width of the speed change output shaft without causing a rapid rotational speed change in the speed change output shaft.

Moreover, it is a second object of the present invention to provide a working vehicle provided with the transmission structure.

In order to achieve the first object, a first aspect of the present invention provides a transmission structure including: an HST continuously changing rotation power operatively input into a pump shaft from a driving source to rotation power at least between a first HST speed and a second HST speed according to an operation position of an output adjustment member, and then outputting the changed rotation power as an HST power from a motor shaft; a planetary gear mechanism having first to third elements, in which the third element functions as an input portion of the HST output; a speed change output shaft; an input side first transmission mechanism capable of operatively transmitting the rotation power of the driving source to the first element at an input side first speed change ratio; an input side second transmission mechanism capable of operatively transmitting the rotation power of the driving source to the second element at an input side second speed change ratio; input side first and second clutch mechanisms engaging/disengaging power transmission of the input side first and second transmission mechanisms, respectively; an output side first transmission mechanism capable of operatively transmitting the rotation power of the second element to the speed change output shaft at an output side first speed change ratio; an output side second transmission mechanism capable of operatively transmitting the rotation power of the first element to the speed change output shaft at an output side second speed change ratio; output side first and second clutch mechanisms engaging/disengaging power transmission of the output side first and second transmission mechanisms, respectively; a speed change operation member; an HST sensor directly or indirectly detecting a speed change state of the HST; an output sensor directly or indirectly detecting rotational speed of the speed change output shaft; and a control device controlling operations of the output adjustment member, the input side first and second clutch mechanisms, and the output side first and second clutch mechanisms. In the first aspect of the present invention, based on detection signals of the HST sensor and the output sensor, while the control device develops a first transmission state where the first element is functioned as an input portion of reference power operatively transmitted from the driving source and the second element is functioned as an output portion of synthetic rotation power by bringing the input side and output side first clutch mechanisms into an engagement state and bringing the input side and output side second clutch mechanisms into a disengagement state in a low speed state where the rotational speed of the speed change output shaft is less than a predetermined switching speed, the control device operates the output adjustment member so that the HST output is speed-changed from the first HST speed toward the second HST speed in response to an acceleration operation of the speed change operation member, and meanwhile, while the control device develops a second transmission state where the first element is functioned as the output portion and the second element is functioned as the input portion of the reference power by bringing the input side and output side first clutch mechanisms into the disengagement state and bringing the input side and output side second clutch mechanisms into the engagement state in a high speed state where the rotational speed of the speed change output shaft is equal to or higher than the switching speed, the control device operates the output adjustment member so that the HST output is speed-changed from the second HST speed toward the first HST speed in response to the acceleration operation of the speed change operation member. The input side first and second speed change ratios are set so that rotational speed of the second element when the HST output is set to the second HST speed in the first transmission state and rotational speed of the second element by rotation power transmitted through the input side second transmission mechanism in the second transmission state are same and so that rotational speed of the first element when the HST output is set to the second HST speed in the second transmission state and rotational speed of the first element by rotation power transmitted through the input side first transmission mechanism in the first transmission state are same. The output side first and second speed change ratios are set so that rotational speed developed in the speed change output shaft when the HST output is set to the second HST speed is same in the first and second transmission states.

The transmission structure according to the first aspect can develop the first transmission state where the speed change output shaft is increased to the switching speed as the HST output is speed-changed from the first HST speed to the second HST speed and the second transmission state where the speed change output shaft is increased from the switching speed as the HST output is speed-changed from the second HST speed to the first HST speed to thereby expand the speed changeable range (speed change region) of the speed change output shaft, and further can effectively prevent or reduce the rotational speed difference in the speed change output shaft at the timing of switching between the first and second transmission states.

In order to achieve the first object, a second aspect of the present invention provides a transmission structure including an HST continuously changing rotation power operatively input into a pump shaft from a driving source to rotation power at least between a first HST speed and a second HST speed according to an operation position of an output adjustment member, and then outputting the changed rotation power as an HST output from a motor shaft; a planetary gear mechanism having first to third elements, in which the third element functions as an input portion of the HST output; a speed change output shaft; an input side first transmission mechanism capable of operatively transmitting the rotation power of the driving source to the first element at an input side first speed change ratio; an input side second transmission mechanism capable of operatively transmitting the rotation power of the driving source to the second element at an input side second speed change ratio; input side first and second clutch mechanisms engaging/disengaging power transmission of the input side first and second transmission mechanisms, respectively; output side first and second clutch mechanisms engaging/disengaging power transmission from the second element and the first element, respectively, to the speed change output shaft; a speed change operation member; an HST sensor directly or indirectly detecting a speed change state of the HST; an output sensor directly or indirectly detecting rotational speed of the speed change output shaft; and a control device controlling operations of the output adjustment member, the input side first and second clutch mechanisms, and the output side first and second clutch mechanisms, wherein based on detection signals of the HST sensor and the output sensor, while the control device develops a first transmission state where the first element is functioned as an input portion of reference power operatively transmitted from the driving source and the second element is functioned as an output portion of synthetic rotation power by bringing the input side and output side first clutch mechanisms into an engagement state and bringing the input side and output side second clutch mechanisms into a disengagement state in a low speed state where the rotational speed of the speed change output shaft is less than a predetermined switching speed, the control device operates the output adjustment member so that the HST output is speed-changed from the first HST speed toward the second HST speed in response to an acceleration operation of the speed change operation member and meanwhile, while the control device develops a second transmission state where the first element is functioned as the output portion and the second element is functioned as the input portion of reference power by bringing the input side and output side first clutch mechanisms into the disengagement state and bringing the input side and output side second clutch mechanisms into the engagement state in a high speed state where the rotational speed of the speed change output shaft is equal to or higher than the switching speed, the control device operates the output adjustment member so that the HST output is speed-changed from the second HST speed toward the first HST speed in response to the acceleration operation of the speed change operation member, and the input side first and second speed change ratios are set so that rotational speed of the second element when the HST output is set to the second HST speed in the first transmission state and rotational speed of the second element by rotation power transmitted through the input side second transmission mechanism in the second transmission state are same and so that rotational speed of the first element when the HST output is set to the second HST speed in the second transmission state and rotational speed of the first element by rotation power transmitted through the input side first transmission mechanism in the first transmission state are same.

The transmission structure according to the second aspect can develop the first transmission state where the speed change output shaft is increased to the switching speed as the HST output is speed-changed from the first HST speed to the second HST speed and the second transmission state where the speed change output shaft is increased from the switching speed as the HST output is speed-changed from the second HST speed to the first HST speed to thereby expand the speed changeable range (speed change region) of the speed change output shaft, and further can effectively prevent or reduce the rotational speed difference in the speed change output shaft at the timing of switching between the first and second transmission states.

In the second aspect, the control device preferably may operate, in switching between the first and second transmission states, the output adjustment member so that rotational speed developed in the speed change output shaft in a transmission state after the switching coincides with or approaches rotational speed developed in the speed change output shaft in a transmission state before the switching.

In any one of the various configurations according to the first and second aspects, in a switching transition stage between the first and second transmission states, a double transmission state preferably may be developed in which both the input side first and second clutch mechanisms are brought into the engagement state and both the output side first and second clutch mechanisms are brought into the engagement state.

In one embodiment capable of developing the double transmission state, at least one of an input side clutch unit formed by the input side first and second clutch mechanisms and an output side clutch unit formed by the output side first and second clutch mechanisms is configured as a dog clutch type.

The clutch unit of the dog clutch type has a slider supported by a corresponding rotation shaft so as not to be relatively rotatable and so as to be movable in an axial direction and first and second recess-projection engagement portions on one side and another side, respectively, in the axial direction.

When the slider is located at a first position on the one side in the axial direction, the first recess-projection engagement portion is engaged with a corresponding recess-projection engagement portion while the second recess-projection engagement portion is not engaged with a corresponding recess-projection engagement portion, whereby the slider brings only the first clutch mechanism into the engagement state, when the slider is located at a second position on the another side in the axial direction, the second recess-projection engagement portion is engaged with a corresponding recess-projection engagement portion while the first recess-projection engagement portion is not engaged with a corresponding recess-projection engagement portion, whereby the slider brings only the second clutch mechanism into the engagement state, and when the slider is located at an intermediate position between the first and second positions with respect to the axial direction, both the first and second recess-projection engagement portions are engaged with corresponding recess-projection engagement portions, whereby the slider brings both first and second clutch mechanisms into the engagement state.

The input side first transmission mechanism may have an input side first driving gear relatively rotatably supported by a main driving shaft operatively coupled with the driving source and an input side first driven gear operatively coupled with the input side first driven gear and made relatively unrotatable to the first element, and the input side second transmission mechanism may have an input side second driving gear relatively rotatably supported by the main driving shaft and an input side second driven gear operatively coupled with the input side second driving gear and made relatively unrotatable to the second element.

In this embodiment, the input side clutch unit may be configured as the dog clutch type and having an input side slider as the slider.

The input side slider is supported by the main driving shaft between the input side first and second driving gears so as not to be relatively rotatable and so as to be movable in the axial direction, when located at the first position, the first recess-projection engagement portion is engaged with a recess-projection engagement portion of the input side first driving gear while the second recess-projection engagement portion is not engaged with a recess-projection engagement portion of the input side second driving gear, whereby the input side slider brings only the input side first clutch mechanism into the engagement state, when located at the second position, the second recess-projection engagement portion is engaged with the recess-projection engagement portion of the input side second driving gear while the first recess-projection engagement portion is not engaged with the recess-projection engagement portion of the input side first driving gear, whereby the input side slider brings only the input side second clutch mechanism into the engagement state, and, when located at an intermediate position, the first and second recess-projection engagement portions are engaged with the recess-projection engagement portions of the input side first and second driving gears, respectively, whereby the input side slider brings both the first and second clutch mechanisms into the engagement state.

The transmission structure according to the first aspect may further include a speed change intermediate shaft coupled with the second element so as not to be relatively rotatable around an axis, and the first element may be relatively rotatably supported by the speed change intermediate shaft.

In this case, the output side first transmission mechanism has an output side first driving gear supported by the speed change intermediate shaft so as not to be relatively rotatable and an output side first driven gear operatively coupled with the output side first driving gear and relatively rotatably supported by the speed change output shaft. The output side second transmission mechanism has an output side second driving gear coupled with the first element so as not to be relatively rotatable and an output side second driven gear operatively coupled with the output side second driving gear and relatively rotatably supported by the speed change output shaft. The output side first and second clutch mechanisms have recess-projection engagement portions provided in the output side first and second driven gears and an output side slider supported between the output side first and second driven gears by the speed change output shaft so as not to be relatively rotatable and so as to be movable in an axial direction and provided with first and second recess-projection engagement portions on one side and another side, respectively, in the axial direction.

When the output side slider is located at a first position on the one side in the axial direction, the first recess-projection engagement portion is engaged with a recess-projection engagement portion of the output side first driven gear while the second recess-projection engagement portion is not engaged with a recess-projection engagement portion of the output side second driven gear, whereby the output side slider brings only the output side first clutch mechanism into the engagement state, when the output side slider is located at a second position on the another side in the axial direction, the second recess-projection engagement portion is engaged with the recess-projection engagement portion of the output side second driven gear while the first recess-projection engagement portion is not engaged with the recess-projection engagement portion of the output side first driven gear, whereby the output side slider brings only the output side second clutch mechanism into the engagement state, and, when the output side slider is located at an intermediate position between the first direction and the second direction in the axial direction, the first and second recess-projection engagement portions are engaged with the recess-projection engagement portions of the output side first and second driven gears, respectively, whereby the output side slider brings both the output side first and second clutch mechanisms into the engagement state.

In another embodiment capable of developing the double transmission state, at least one of an input side clutch unit formed by the input side first and second clutch mechanisms and an output side clutch unit formed by the output side first and second clutch mechanisms may be configured as a hydraulic friction plate type developing a clutch engagement state by receiving pressure oil supply.

The transmission structure according to this embodiment is further provided with a pressure oil supply line receiving pressure oil supply from a hydraulic source, first and second supply/discharge lines supplying/discharging pressure oil to the first and second clutch mechanisms, respectively, in the clutch units of the hydraulic friction plate type, first and second electromagnetic valves which are interposed in the first and second supply/discharge lines, respectively, and which can take a discharge position where a corresponding supply/discharge line is drained and a supply position where a corresponding supply/discharge line is fluid-connected to the pressure oil supply line, and a clutch engagement detection unit detecting an engagement state of the first and second clutch mechanisms in the clutch units of the hydraulic friction plate type.

The control device locates the first electromagnetic valve at the supply position and locates the second electromagnetic valve at the discharge position to develop the first transmission state in the low speed state where the rotational speed of the speed change output shaft is less than the switching speed, while locating the first electromagnetic valve at the discharge position and locating the second electromagnetic valve at the supply position to develop the second transmission state in the high speed state where the rotational speed of the speed change output shaft is equal to or higher than the switching speed. Also, the control device moves the electromagnetic valve located at the discharge position at time before the switching from the discharge position to the supply position while maintaining the electromagnetic valve located at the supply position at the time before the switching at the supply position in the switching between the first and second transmission states, and then moves the electromagnetic valve located at the supply position at the time before the switching from the supply position to the discharge position after passage of predetermined time from time when recognizing that the clutch mechanism to which pressure oil is supplied through the electromagnetic valve, a position of which is moved from the discharge position to the supply position is brought into the engagement state based on a signal from the clutch engagement detection unit.

Preferably, the first and second electromagnetic valves may be configured as proportional electromagnetic valves configured to receive hydraulic pressure of corresponding supply/discharge lines as pilot pressure to thereby maintain the hydraulic pressure of the corresponding supply/discharge lines in a state where a position signal from the control device to the supply position is input at an engagement hydraulic pressure.

In the first and second aspects of the present invention, the input side first and second clutch mechanisms may be configured as a hydraulic friction plate type developing a clutch engagement state by receiving pressure oil supply.

In this case, the transmission structure is provided with a pressure oil supply line receiving pressure oil supply from a hydraulic source, input side first and second supply/discharge lines supplying/discharging pressure oil to the input side first and second clutch mechanisms, respectively, input side first and second electromagnetic valves which are interposed in the input side first and second supply/discharge lines, respectively, and which can take a discharge position where a corresponding supply/discharge line is drained and a supply position where a corresponding supply/discharge line is fluid-connected to the pressure oil supply line, and a clutch engagement detection unit detecting an engagement state of the input side first and second clutch mechanisms.

The control device locates the input side first electromagnetic valve at the supply position and locates the input side second electromagnetic valve at the discharge position in the low speed state where the rotational speed of the speed change output shaft is less than the switching speed, while locating the input side first electromagnetic valve at the discharge position and locating the input side second electromagnetic valve at the supply position in the high speed state where the rotational speed of the speed change output shaft is equal to or higher than the switching speed. Also, the control device moves the electromagnetic valve located at the discharge position at time before the switching from the discharge position to the supply position while maintaining the electromagnetic valve located at the supply position at the time before the switching at the supply position in the switching between the first and second transmission states, and then moves the electromagnetic valve located at the supply position at the time before the switching from the supply position to the discharge position when recognizing that the clutch mechanism to which pressure oil is supplied through the electromagnetic valve, a position of which is moved from the discharge position to the supply position, is brought into a sliding engagement state based on a signal from the clutch engagement detection unit.

In the first and second aspects of the present invention, the output side first and second clutch mechanisms may be configured as a hydraulic friction plate type developing a clutch engagement state by receiving pressure oil supply.

In this case, the transmission structure is provided with a pressure oil supply line receiving pressure oil supply from a hydraulic source, output side first and second supply/discharge lines supplying/discharging pressure oil to the output side first and second clutch mechanisms, respectively, output side first and second electromagnetic valves which are interposed in the output side first and second supply/discharge lines, respectively, and which can take a discharge position where a corresponding supply/discharge line is drained and a supply position where a corresponding supply/discharge line is flued-connected to the pressure oil supply line, and a clutch engagement detection unit detecting an engagement state of the output side first and second clutch mechanisms.

The control device locates the output side first electromagnetic valve at the supply position and locates the output side second electromagnetic valve at the discharge position in the low speed state where the rotational speed of the speed change output shaft is less than the switching speed, while locating the output side first electromagnetic valve at the discharge position and locating the output side second electromagnetic valve at the supply position in the high speed state where the rotational speed of the speed change output shaft is equal to or higher than the switching speed. Also, the control device moves, in switching between the low speed state and the high speed state, the electromagnetic valve located at the discharge position at time before the switching from the discharge position to the supply position while maintaining the electromagnetic valve located at the supply position at the time before the switching at the supply position, and then moves the electromagnetic valve located at the supply position at the time before the switching from the supply position to the discharge position when recognizing that the clutch mechanism to which pressure oil is supplied through the electromagnetic valve, a position of which is moved from the discharge position to the supply position, is brought into a sliding engagement state based on a signal from the clutch engagement detection unit.

In the first and second aspect of the present invention, the input side second clutch mechanism and the output side second clutch mechanism preferably may be configured as friction plate clutch mechanisms.

In more preferable configuration, all of the input side first clutch mechanism and the output side first clutch mechanism are configured as friction plate clutch mechanisms.

The transmission structure according to the present invention may include a pressure oil supply line, an upstream side of which is fluid-connected to a hydraulic source, a drain line, a first supply/discharge line supplying/discharging pressure oil to the input side and output side first clutch mechanisms, a second supply/discharge line supplying/discharging pressure oil to the input side and output side second clutch mechanisms, and a switching valve, a position of which is controlled by the control device.

The switching valve is configured to be able to take a first position where the pressure oil supply/discharge line is fluid-connected to the first supply/discharge line and the second supply/discharge line is fluid-connected to the drain line and a second position where the first supply/discharge line is fluid-connected to the drain line and the pressure oil supply/discharge line is fluid-connected to the second supply/discharge line. The input side first and second clutch mechanisms and the output side first and second clutch mechanisms are configured as a hydraulic type engaging power transmission of a corresponding transmission mechanism by receiving pressure oil supply.

Also, in order to achieve the first object, a third aspect of the present invention provides a transmission structure interposed in a traveling system transmission path of a working vehicle including an HST continuously changing rotation power operatively input into a pump shaft from a driving source to rotation power at least between a first HST speed and a second HST speed according to an operation position of an output adjustment member, and then outputting the changed rotation power as an HST output from a motor shaft; a planetary gear mechanism having first to third elements, in which the third element functions as an input portion of the HST output; a speed change output shaft;

input side first and second transmission mechanisms capable of operatively transmitting the rotation power of the driving source to the first and second elements, respectively; input side and second clutch mechanisms engaging/disengaging power transmission of the input side first and second transmission mechanisms, respectively; output side first and second clutch mechanisms engaging/disengaging power transmission from the second element and the first element, respectively, to the speed change output shaft; a speed change operation member; an HST sensor directly or indirectly detecting a speed change state of the HST; an output sensor directly or indirectly detecting rotational speed of the speed change output shaft; and a control device controlling operations of the output adjustment member, the input side first and second clutch mechanisms, and the output side first and second clutch mechanisms, wherein at least one of an input side clutch unit formed by the input side first and second clutch mechanisms and an output side clutch unit formed by the output side first and second clutch mechanisms is configured as a hydraulic friction plate type developing a clutch engagement state by receiving pressure oil supply, the transmission structure is further provided with a pressure oil supply line receiving pressure oil supply from a hydraulic source, first and second supply/discharge lines supplying/discharging pressure oil to the first and second clutch mechanisms, respectively, in the clutch units of the hydraulic friction plate type, first and second electromagnetic valves which are interposed in the first and second supply/discharge lines, respectively, and which can take a discharge position where a corresponding supply/discharge line is drained and a supply position where a corresponding supply/discharge line is fluid-connected to the pressure oil supply line, and a clutch engagement detection unit detecting an engagement state of the first and second clutch mechanisms in the clutch units of the hydraulic friction plate type, wherein based on detection signals of the HST sensor and the output sensor, in a low speed state where the rotational speed of the speed change output shaft is less than a predetermined switching speed, while the control device develops a first transmission state where the first element is functioned as an input portion of reference power operatively transmitted from the driving source and the second element is functioned as an output portion of synthetic rotation power by bringing the input side and output side first clutch mechanisms into an engagement state and bringing the input side and output side second clutch mechanisms into a disengagement state, the control device operates the output adjustment member so that the HST output is speed-changed from the first HST speed toward the second HST speed in response to an acceleration operation of the speed change operation member and meanwhile, in a high speed state where the rotational speed of the speed change output shaft is equal to or higher than the switching speed, while the control device develops a second transmission state where the first element is functioned as the output portion and the second element is functioned as the input portion of reference power by bringing the input side and output side first clutch mechanisms into the disengagement state and bringing the input side and output side second clutch mechanisms into the engagement state, the control device operates the output adjustment member so that the HST output is speed-changed from the second HST speed toward the first HST speed in response to the acceleration operation of the speed change operation member, further, in switching between the first and second transmission states, while maintaining one of the first and second electromagnetic valves located at the supply positions at time before the switching at the supply positions, the control device moves another one of the first and second electromagnetic valves located at the discharge positions at the time before the switching from the discharge position to the supply position, and then, when recognizing that the clutch mechanism to which pressure oil is supplied through the other electromagnetic valve is brought into a sliding engagement state based on a signal from the clutch engagement detection unit, the control device moves the one electromagnetic valve from the supply position to the discharge position to thereby switch engagement/disengagement of the first and second clutch mechanisms in the hydraulic friction plate clutch units.

The transmission structure according to the third aspect makes it possible to increase a degree of freedom for design to thereby enhance flexibility in designing device, since it is not needed to strictly set the speed change ratios of the input side second transmission mechanism and the output side transmission mechanisms for preventing the rotational speed difference in the speed change output shaft in shifting between the first and second transmission states. The transmission structure according to the third aspect makes it also possible to suppress unintentional disengagement and reduction of power transmission in sifting clutch mechanisms under traveling with heavy load.

Also, in order to achieve the first object, a fourth aspect of the present invention provides a transmission structure including an HST continuously changing rotation power operatively input into a pump shaft from a driving source to rotation power at least between first HST speed and second HST speed according to an operation position of an output adjustment member, and then outputting the changed rotation power as an HST output from a motor shaft; a planetary gear mechanism having first to third elements, in which the third element functions as an input portion of the HST output; a speed change output shaft; input side first and second transmission mechanisms capable of operatively transmitting the rotation power of the driving source to the first element and the second element, respectively; input side first and second clutch mechanisms engaging/disengaging power transmission of the input side first and second transmission mechanisms, respectively; forward movement first and second transmission mechanisms capable of operatively transmitting rotation power of the second element and the first element, respectively, to the speed change output shaft in a normal rotation state; a reverse movement transmission mechanism capable of operatively transmitting the rotation power of the second element to the speed change output shaft in a reverse rotation state; a forward movement first clutch mechanism, a forward movement second clutch mechanism, and a reverse movement clutch mechanism engaging/disengaging power transmission of the forward movement first transmission mechanism, the forward movement second transmission mechanism, and the reverse movement transmission mechanism, respectively; a speed change operation member; an HST sensor directly or indirectly detecting a speed change state of the HST; an output sensor directly or indirectly detecting rotational speed of the speed change output shaft; and a control device controlling operations of the output adjust member, the input side first clutch mechanism, the input side second clutch mechanism, the forward movement first clutch mechanism, the forward movement second clutch mechanism, and the reverse movement clutch mechanism, wherein, based on detection signals of the HST sensor and the output sensor, in a low speed state where the rotational speed of the speed change output shaft is from zero speed to speed less than switching speed in a forward movement direction, while the control device develops a forward movement first transmission state where the input side first clutch mechanism and the forward movement first clutch mechanism are brought into an engagement state, the control device operates the output adjustment member so that the HST output is speed-changed from the first HST speed toward the second HST speed in response to a forward movement side acceleration operation of the speed change operation member, in a high speed state where the rotational speed of the speed change output shaft is equal to or higher than the switching speed in the forward movement direction, while the control device develops a forward movement second transmission state where the input side second clutch mechanism and the forward movement second clutch mechanism are brought into the engagement state, the control device operates the output adjustment member so that the HST output is speed-changed from the first HST speed toward the second HST speed in response to the forward movement side acceleration operation of the speed change operation member, and, in a reverse movement transmission state where the rotational speed of the speed change output shaft is changed from the zero speed to the reverse movement side, while the control device develops a reverse movement transmission state where the input side first clutch mechanism and the reverse movement clutch mechanism are brought into the engagement state, the control device operates the output adjustment member so that the HST output is speed-changed from the first HST speed toward the second HST speed in response to a reverse movement side acceleration operation of the speed change operation member.

The transmission structure according to the fourth aspect makes it possible to develop the forward movement first transmission state where the rotational speed of the speed change output shaft is increased in forward movement direction until the switching speed as the HST output is speed-changed from the first HST speed to the second HST speed, the forward movement second transmission state where the rotational speed of the speed change output shaft is increased in forward movement direction from the switching speed as the HST output is speed-changed from the second HST speed to the first HST speed and the reverse movement transmission state where the rotational speed of the speed change output shaft is increased in reverse movement direction as the HST output is speed-changed from the first HST speed to the second HST speed to thereby expand the speed change range of the speed change output shaft, and further can effectively prevent or reduce the rotational speed difference in the speed change output shaft in switching between the forward movement first and second transmission states and between the forward movement first transmission state and the reverse movement transmission state.

In the fourth aspect, the input side first transmission mechanism may operatively transmit the rotation power of the driving source to the first element at an input side first speed change ratio, and the input side second transmission mechanism may operatively transmit the rotation power of the driving source to the second element at an input side second speed change ratio.

In this case, the input side first and second speed change ratios are preferably set so that rotational speed of the second element when the HST output is set to the second HST speed in the forward movement first transmission state and rotational speed of the second element by rotation power transmitted through the input side second transmission mechanism in the forward movement second transmission state are same and so that rotational speed of the first element when the HST output is set to the second HST speed in the forward movement second transmission state and rotational speed of the first element by rotation power transmitted through the input side first transmission mechanism in the forward movement first transmission state are same.

In the fourth aspect, the forward movement first transmission mechanism may operatively transmit the rotation power of the second element to the speed change output shaft at a forward movement first speed change ratio and the forward movement second transmission mechanism may operatively transmit the rotation power of the first element to the speed change output shaft at a forward movement second speed change ratio.

In this case, the forward movement first and second speed change ratios are preferably set so that rotational speed developed in the speed change output shaft when the HST output is set to the second HST speed is same in the first and second transmission states.

In the fourth aspect, the HST and the planetary gear mechanism are preferably set so that the rotational speed of the second element becomes the zero speed when the HST output is set to the first HST speed in the engagement state of the input side first clutch mechanism.

Also, in order to achieve the first object, a fifth aspect of the present invention provides a transmission mechanism including an HST continuously changing rotation power operatively input into a pump shaft from a driving source to rotation power at least between a first HST speed and a second HST speed according to an operation position of an output adjustment member, and then outputting the changed rotation power as an HST output from a motor shaft; a planetary gear mechanism having first to third elements, in which the third element functions as an input portion of the HST output; a speed change output shaft; an input side first transmission mechanism capable of operatively transmitting the rotation power of the driving source to the first element at an input side first speed change ratio; an input side second transmission mechanism capable of operatively transmitting the rotation power of the driving source to the second element at an input side second speed change ratio; input side first and second clutch mechanisms engaging/disengaging power transmission of the input side first and second transmission mechanisms, respectively; an output side first transmission mechanism capable of operatively transmitting the rotation power of the second element to the speed change output shaft at an output side first speed change ratio; an output side second transmission mechanism capable of operatively transmitting the rotation power of the first element to the speed change output shaft at an output side second speed change ratio; an output side third transmission mechanism capable of operatively transmitting the rotation power of the first element to the speed change output shaft at an output side third speed change ratio rotating the speed change output shaft at speed higher than the output side second speed change ratio; output side first to third clutch mechanisms engaging/disengaging power transmission of the output side first to third transmission mechanisms, respectively; a speed change operation member; an HST sensor directly or indirectly detecting a speed change state of the HST; an output sensor directly or indirectly detecting rotational speed of the speed change output shaft; and a control device controlling operations of the output adjustment member, the input side first and second clutch mechanisms, and the output side first to third clutch mechanism, wherein, based on detection signals of the HST sensor and the output sensor, in a low speed state where the rotational speed of the speed change output shaft is less than a first switching speed, while the control device develops a first transmission state where the first element is functioned as an input portion of reference power operatively transmitted from the driving source and the second element is functioned as an output portion of synthetic rotation power by bringing the output side first clutch mechanism into an engagement state and bringing other output side clutch mechanisms into a disengagement state while bringing the input side first clutch mechanism into the engagement state and bringing the input side second clutch mechanism into the disengagement state, the control device operates the output adjustment member so that the HST output is speed-changed from the first HST speed toward the second HST speed in response to an acceleration operation of the speed change operation member, in an intermediate speed state where the rotational speed of the speed change output shaft is equal to or higher than the first switching speed and less than a second switching speed, while the control device develops a second transmission state where the second element is functioned as the input portion of reference power and the rotation power of the first element is operatively transmitted to the speed change output shaft at the output side second speed change ratio by bringing the output side second clutch mechanism into the engagement state and bringing other output side clutch mechanisms into the disengagement state while bringing the input side first clutch mechanisms into the disengagement state and bringing the input side second clutch mechanism into the engagement state, the control device operates the output adjustment member so that the HST output is speed-changed from the second HST speed toward the first HST speed in response to the acceleration operation of the speed change operation member, and, in a high speed state where the rotational speed of the speed change output shaft is equal to or higher than the second switching speed, while the control device develops a third transmission state where the second element is functioned as the input portion of reference power and the rotation power of the first element is operatively transmitted to the speed change output shaft at the output side third speed change ratio by bringing the output side third clutch mechanism into the engagement state and bringing other output side clutch mechanisms into the disengagement state while bringing the input side first clutch mechanism into the disengagement state and bringing the input side second clutch mechanism into the engagement state, the control device operates the output adjustment member so that the HST output is speed-changed from the second HST speed toward the first HST speed in response to the acceleration operation of the speed change operation member, and meanwhile the control device operates the output adjustment member in switching between the second and third transmission states so that rotational speed developed in the speed change output shaft in a transmission state after the switching coincides with or approaches rotational speed developed in the speed change output shaft in a transmission state before the switching, and the input side first and second speed change ratios are set so that rotational speed of the second element when the HST output is set to the second HST speed in the first transmission state and rotational speed of the second element by rotation power transmitted through the input side second transmission mechanism in the second transmission state are same and so that rotational speed of the first element when the HST output is set to the second HST speed in the second transmission state and rotational speed of the first element by rotation power transmitted through the input side first transmission mechanism in the first transmission state are same.

The transmission structure according to the fifth aspect makes it possible to develop the first transmission state where the rotational speed of the speed change output shaft is increased until the first switching speed as the HST output is speed-changed from the first HST speed to the second HST speed, the second transmission state where the rotational speed of the speed change output shaft is increased from the first switching speed until the second switching speed as the HST output is speed-changed from the second HST speed to the first HST speed and the third transmission state where the rotational speed of the speed change output shaft is increased from the second switching speed as the HST output is speed-changed from the side of the second HST speed to the side of the first HST speed to thereby expand the speed change range of the speed change output shaft, and further can effectively prevent or reduce the rotational speed difference in the speed change output shaft in switching between the first and second transmission states and between the second and third transmission states.

The transmission structure according to the fifth aspect may include a speed change intermediate shaft coupled with the second element so as not to be relatively rotatable around an axis, and a speed change transmission shaft externally inserted into the speed change intermediate shaft in a relatively rotatable manner and coupled with the first element so as not to be relatively rotatable.

In this case, the input side first transmission mechanism has an input side first driving gear relatively rotatably supported by a main driving shaft operatively coupled with the driving source and an input side first driven gear operatively coupled with the input side first driving gear and made relatively unrotatable to the speed change transmission shaft. The input side second transmission mechanism has an input side second driving gear relatively rotatably supported by the main driving shaft and an input side second driven gear operatively coupled with the input side second driving gear and made relatively unrotatable to the second element. The output side first transmission mechanism has an output side first driving gear supported by the speed change intermediate shaft so as not to be relatively rotatable and an output side first driven gear operatively coupled with the output side first driving gear and relatively rotatably supported by the speed change output shaft. The output side second transmission mechanism has an output side second driving gear supported by the speed change transmission shaft so as not to be relatively rotatable and an output side second driven gear operatively coupled with the output side second driving gear and relatively rotatably supported by the speed change output shaft. The output side third transmission mechanism has an output side third driving gear supported by the speed change transmission shaft so as not to be relatively rotatable and an output side third driven gear operatively coupled with the output third driving gear and relatively rotatably supported by the speed change output shaft.

The transmission structure according to the present invention may further include a traveling transmission shaft disposed on a downstream side in a transmission direction relative to the speed change output shaft, and a forward/reverse movement switching mechanism capable of switching a rotation direction of driving force in a forward movement direction and a reverse movement direction between the speed change output shaft and the traveling transmission shaft.

Also, in order to achieve the first object, a sixth aspect of the present invention provides a transmission mechanism including an HST continuously changing rotation power operatively input into a pump shaft from a driving source to rotation power at least between first HST speed and second HST speed according to an operation position of an output adjustment member, and then outputting the changed rotation power as an HST output from a motor shaft; a planetary gear mechanism having first to third elements, in which the third element functions as an input portion of the HST output; an input side first transmission mechanism capable of operatively transmitting the rotation power of the driving source to the first element at an input side first speed change ratio; an input side second transmission mechanism capable of operatively transmitting the rotation power of the driving source to the second element at an input side second speed change ratio; an input side first and second clutch mechanisms engaging/disengaging power transmission of the input side first and second transmission mechanisms, respectively; a speed change output shaft; a traveling transmission shaft disposed on a downstream side in a transmission direction relative to the speed change output shaft; a forward/reverse movement switching mechanism interposed in a transmission path from the speed change output shaft to the traveling transmission shaft and capable of switching the traveling transmission state between a forward movement transmission state of rotating the traveling transmission shaft in a forward movement direction and a reverse movement transmission state of rotating the traveling transmission shaft in a reverse movement direction; an output side first transmission mechanism capable of operatively transmitting the rotation power of the second element to the speed change output shaft at an output side first speed change ratio; an output side second transmission mechanism capable of operatively transmitting the rotation power of the first element to the speed change output shaft at an output side second speed change ratio; an output side third transmission mechanism which can operatively transmit the rotation power of the first element to the traveling transmission shaft as driving force in the forward movement direction and in which a speed change ratio is set so that rotational speed of the traveling transmission shaft when the rotation power of the first element is operatively transmitted to the traveling transmission shaft through the output side third transmission mechanism is higher than rotational speed of the traveling transmission shaft when the rotation power of the first element is operatively transmitted to the traveling transmission shaft through the output side second transmission mechanism and the forward and reverse movement change mechanism in the forward movement transmission state; output side first to third clutch mechanisms engaging/disengaging power transmission of the output side first to third transmission mechanisms, respectively; a speed change operation member; an HST sensor directly or indirectly detecting a speed change state of the HST; and a control device controlling operations of the output adjustment member, the input side first and second clutch mechanisms, and the output side first to third clutch mechanisms.

The transmission structure according to the sixth aspect makes it possible to expand the speed change range of the forward movement which is high in frequency of use while effectively preventing or reducing the rotational speed difference in the speed change output shaft in switching between the first and second transmission states and between the second and third transmission states.

In the sixth aspect, the control device operates the output adjustment member so that the HST output is set to the first HST speed which makes a synthetic rotation power of the planetary gear mechanism zero when the speed change operation member is positioned at a zero speed position, when the speed change operation member is operated in a forward movement side low speed range from the zero speed position to a forward movement side first switching speed position, while the control device develops a first transmission state where the first element is functioned as an input portion of reference power operatively transmitted from the driving source and the second element is functioned as an output portion of the synthetic rotation power by bringing the output side first clutch mechanism into an engagement state and bringing other output side clutch mechanisms into a disengagement state while bringing the input side first clutch mechanism into the engagement state and bringing the input side second clutch mechanism into the disengagement state, the control device brings the forward/reverse movement switching mechanism into the forward movement transmission state and the control device operates the output adjustment member so that the HST output is speed-changed from the side of the first HST speed toward the side of the second HST speed in response to an acceleration operation of the speed change operation member, when the speed change operation member is operated in a forward movement side intermediate speed range from the forward movement side first switching speed position to a forward movement side second switching speed position, while the control device develops a second transmission state where the second element is functioned as the input portion of reference power and the rotation power of the first element is operatively transmitted to the speed change output shaft at the output side second speed change ratio by bringing the output side second clutch mechanism into the engagement state and bringing other output side clutch mechanisms into the disengagement state while bringing the input side first clutch mechanism into the disengagement state and bringing the input side second clutch mechanism into the engagement state, the control device brings the forward/reverse movement switching mechanism into the forward movement transmission state and the control device operates the output adjustment member so that the HST output is speed-changed from the side of the second HST speed toward the side of the first HST speed in response to an acceleration operation of the speed change operation member, when the speed change operation member is operated in a forward movement side high speed range beyond the forward movement side second switching speed position, while the control device develops a third transmission state where the second element is functioned as the input portion of reference power and the rotation power of the first element is operatively transmitted to the traveling transmission shaft as driving force in the forward movement direction through the output side third transmission mechanism by bringing the output side third clutch mechanism into the engagement state and bringing other output side clutch mechanisms into the disengagement state while bringing the input side first clutch mechanism into the disengagement state and bringing the input side second clutch mechanism into the engagement state, the control device operates the output adjustment member so that the HST output is speed-changed from the side of the second HST speed toward the side of the first HST speed in response to the acceleration operation of the speed change operation member, when the speed change operation member passes the forward movement side second switching speed position between the forward movement side intermediate speed range and the forward movement side high speed range, the control device operates the output adjustment member so that rotational speed of the traveling transmission shaft in a transmission state developed immediately after the passage coincides with or approaches rotational speed of the traveling transmission shaft in a transmission state developed immediately before the passage, when the speed change operation member is operated in a reverse movement side low speed range from the zero speed position to a reverse movement side first switching speed position, while the control device develops the first transmission state, the control device brings the forward/reverse movement switching mechanism into the reverse movement transmission state and operates the output adjustment member so that the HST output is speed-changed from the side of the first HST speed toward the side of the second HST speed in response to the acceleration operation of the speed change operation member, and when the speed change operation member is operated in a reverse movement side high speed range beyond the reverse movement side first switching speed position, while the control device develops the second transmission state, the control device brings the forward/reverse movement switching mechanism into the reverse movement transmission state and operates the output adjustment member so that the HST output is speed-changed from the side of the second HST speed toward the side of the first HST speed in response to the acceleration operation of the speed change operation member.

In the sixth aspect, the input side first and second speed change ratios are set so that rotational speed of the second element when the HST output is set to the second HST speed in the first transmission state and the rotational speed of the second element by rotation power transmitted through the input side second transmission mechanism in the second transmission state are same and so that rotational speed of the first element when the HST output is set to the second HST speed in the second transmission state and the rotational speed of the first element by rotation power transmitted through the input side first transmission mechanism in the first transmission state are same.

The transmission structure according to the sixth aspect may include a speed change intermediate shaft coupled with the second element so as not to be relatively rotatable around an axis.

In this case, the input side first transmission mechanism has an input side first driving gear relatively rotatably supported by a main driving shaft operatively coupled with the driving source and an input side first driven gear operatively coupled with the input side first driving gear and the first element in a state of being relatively rotatably supported by the speed change intermediate shaft. The input side second transmission mechanism has an input side second driving gear relatively rotatably supported by the main driving shaft and an input side second driven gear operatively coupled with the input side second driving gear in a state of being supported by the speed change intermediate shaft so as not to be relatively rotatable. The output side first transmission mechanism has an output side first driven gear operatively coupled with the input side second driven gear in a state of relatively rotatably supported by the speed change output shaft. The output side second transmission mechanism has an output side second driven gear operatively coupled with the input side first driven gear in a state of being relatively rotatably supported by the speed change output shaft. The output side third transmission mechanism has an output side third driven gear operatively coupled with one of the output side first and second driven gears in a state of being relatively rotatably supported by the traveling transmission shaft.

The input side first and second clutch mechanisms are supported by the main driving shaft so as to engage/disengage the input side first and second driving gears, respectively, with/from the main driving shaft, the output side first and second clutch mechanisms are supported by the speed change output shaft so as to engage/disengage the output side first and second driven gears, respectively, with/from the speed change output shaft, and the output side third clutch mechanism is supported by the traveling transmission shaft so as to engage/disengage the output side third driven gear with/from the traveling transmission shaft.

Preferably, the transmission structure according to the sixth aspect may further include a hollow housing body; a first bearing plate detachably coupled with the housing body; and a second bearing plate detachably coupled with the housing body at a position spaced from the first bearing plate in a longitudinal direction of the housing body.

In this case, the main driving shaft, the speed change intermediate shaft, the speed change output shaft, and the traveling transmission shaft are supported by the first and second bearing plates in a state of being parallel to one another. The input side first and second driving gears and the input side first and second clutch mechanisms are supported in a portion located in a partitioned space sandwiched between the first and second bearing plates of the main driving shaft in a state where the input side first and second clutch mechanisms are located between the input side first and second driving gears with respect to an axial direction of the main driving shaft. The the input side first and second driven gears are supported in a portion located in the partitioned space of the speed change intermediate shaft in a state of being located at same positions as positions of the input side first and second driving gears, respectively, with respect to the axial direction. The output side first and second driven gears and the output side first and second clutch mechanisms are supported in a portion located in the partitioned space of the speed change output shaft in a state where the output side first and second driven gears are located at same positions as positions of the input side second and first driven gears, respectively, with respect to the axial direction and the output side first and second clutch mechanisms are located between the input side first and second driven gears with respect to the axial direction. The output side third driven gear and the output side third clutch mechanism are supported in a portion located in the partitioned space of the traveling transmission shaft in a state where the output side third driven gear is located at a same position in the axial direction as a position of one of the output side first and second driven gears and the output side third clutch mechanism is located on a far side of one of the output side first and second driven gears from the output side first and second clutch mechanisms with respect to the axial direction. The forward/reverse movement switching mechanism is supported in a portion located outside the partitioned space of the speed change output shaft and the traveling transmission shaft.

In one example, the housing body has a front housing body and a rear housing body detachably connected in series.

In this case, the first bearing plate is detachably coupled with a boss portion provided in an inner surface of the front housing body near a rear opening of the front housing body, and the second bearing plate is detachably coupled with a boss portion provided in an inner surface of the rear housing body near a front opening of the rear housing body.

In the fifth and sixth aspects, the output side first and second speed change ratios may be set so that rotational speed developed in the speed change output shaft when the HST output is set to the second HST speed is same in the first and second transmission states.

Alternatively, the control device may be configured to operate the output adjustment member so that, in switching between the first and second transmission states, rotational speed developed in the speed change output shaft in a transmission state after the switching coincides with or approaches rotational speed developed in the speed change output shaft in a transmission state before the switching.

In any one of the above configurations according to the present invention, assuming that a rotation direction of the rotation power input into the pump shaft is a normal rotation direction, the HST outputs rotation power in one of normal and reverse directions as the HST output of the first HST speed and outputs rotation power in another one of the normal and reverse directions as the HST output of the second HST speed.

In any one of the above configurations according to the present invention, an internal gear, a carrier, and a sun gear of the planetary gear mechanism form the first, second, and third elements, respectively.

In order to achieve the second object, the present invention provides a working vehicle including a driving source; a driving wheel; and the transmission structure according to any one of the above configurations interposed in the traveling system transmission path reaching the driving wheel from the driving source, wherein switching speed of the speed change output shaft is set to speed higher than speed in a work speed range.

DETAILED DESCRIPTION OF THE PREFERRED EMBODIMENTS

Embodiment 1

Hereinafter, one embodiment of a transmission structure according to the present invention is described with reference to the accompanying drawings.

Figure 1:
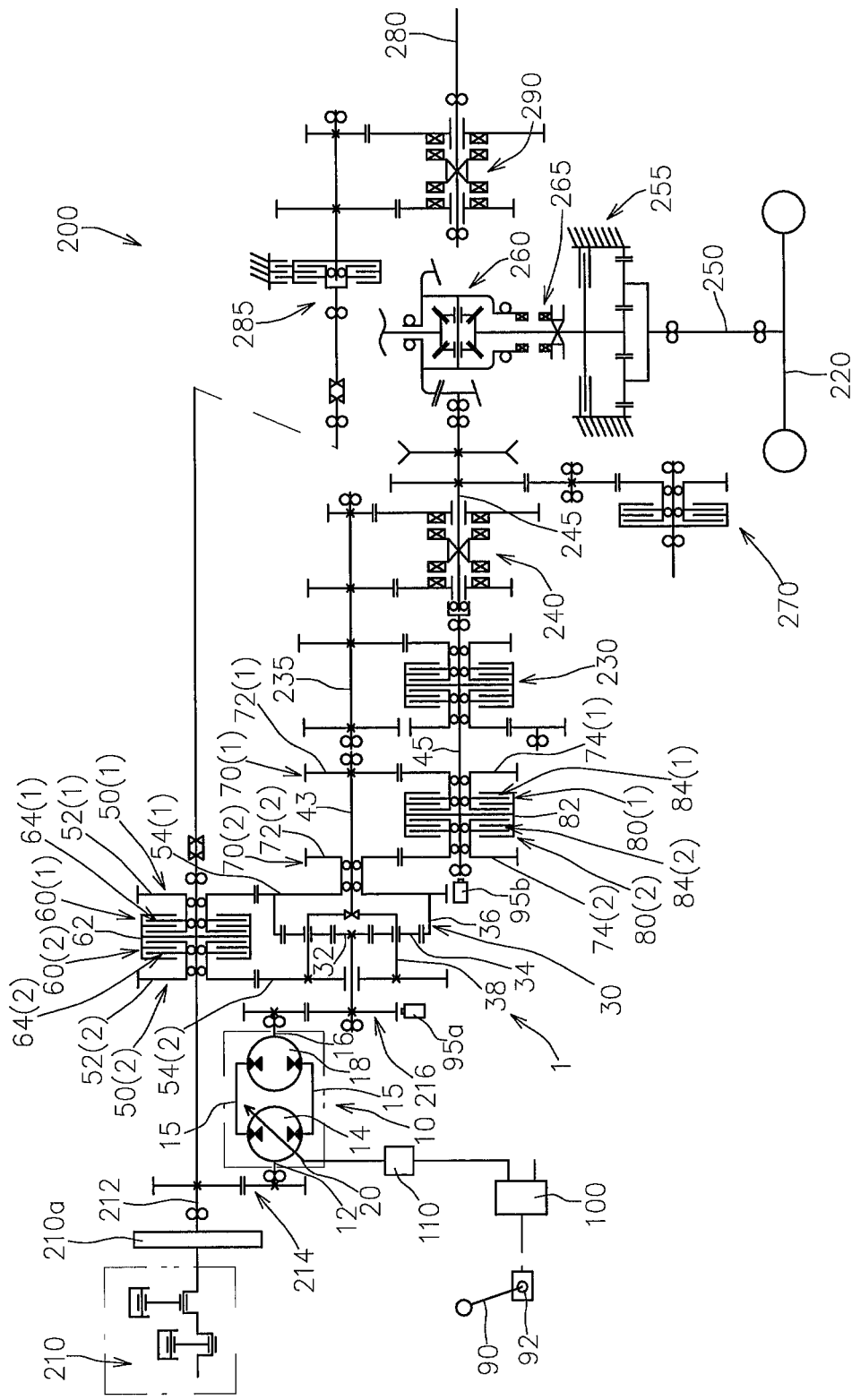
FIG. 1 is a transmission schematic view of a working vehicle to which a transmission structure according to an embodiment 1 of the present invention is applied.

FIG. 1 illustrates a transmission schematic view of a working vehicle 200 to which a transmission structure 1 according to this embodiment is applied.

Figure 2:
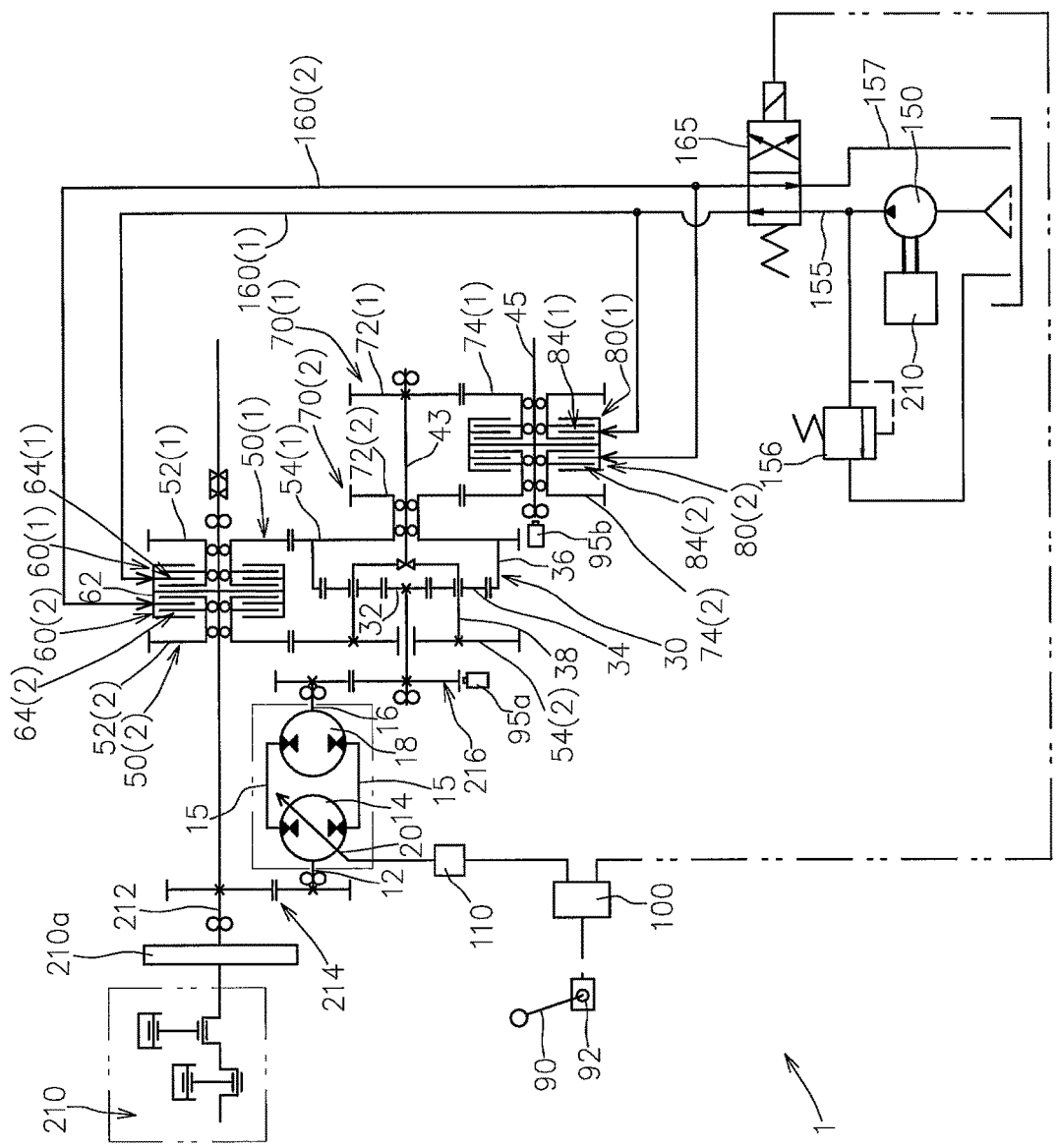
FIG. 2 is a hydraulic circuit diagram of the transmission structure according to the embodiment 1.

FIG. 2 illustrates a hydraulic circuit diagram of the transmission structure 1.

As illustrated in FIG. 1 and FIG. 2, the working vehicle 200 is provided with a driving source 210, driving wheels 220, and the transmission structure 1 interposed in a traveling system transmission path reaching the driving wheels 220 from the driving source 210. The reference numeral 210a in FIG. 1 and FIG. 2 designates a flywheel contained in the driving source 210.

As illustrated in FIG. 1 and FIG. 2, the transmission structure 1 is provided with a hydrostatic transmission (HST) 10, a planetary gear mechanism 30 forming an HMT structure (hydromechanical transmission structure) in cooperation with the HST 10, a speed change output shaft 45, a speed change operation member 90, such as a speed change lever, capable of detecting the operation position by an operation position sensor 92, an HST sensor 95a directly or indirectly detecting the speed change state of the HST 10, an output sensor 95b directly or indirectly detecting the rotational speed of the speed change output shaft 45, and a control device 100.

As illustrated in FIG. 1 and FIG. 2, the HST 10 has a pump shaft 12 operatively rotationally driven by the driving source 210, a hydraulic pump 14 supported by the pump shaft 12 so as not to be relatively rotatable, a hydraulic motor 18 fluid-connected to the hydraulic pump 14 through a pair of hydraulic oil lines 15 and hydraulically rotationally driven by the hydraulic pump 14, a motor shaft 16 supporting the hydraulic motor 18 so as not to be relatively rotatable, and an output adjustment member 20 varying the capacity of at least one of the hydraulic pump 14 and the hydraulic motor 18.

The HST 10 can continuously change the ratio of the rotational speed of the HST output to be output from the motor shaft 16 to the rotational speed of the power input into the pump shaft 12 (i.e., speed change ratio of the HST 10) according to the operation position of the output adjustment member 20.

More specifically, when the rotational speed of the rotation power operatively input into the pump shaft 12 from the driving source 210 is set to a reference input speed, the HST 10 continuously changes the rotation power of the reference input speed to the rotation power at least between the first HST speed and the second HST speed according to the operation position of the output adjustment member 20, and then outputs the changed rotation power from the motor shaft 16.

In this embodiment, the pump shaft 12 is coupled with a main driving shaft 212 operatively coupled with the driving source 210 through a gear train 214 as illustrated in FIG. 1.

In this embodiment, the HST 10 is configured so that the rotation direction of the HST output can be switched between the normal rotation direction and the reverse rotation direction.

More specifically, the HST 10 is configured so that, in the case where the rotation direction of the reference input speed is set to the normal rotation direction, when the output adjustment member 20 is located at a first operation position, the rotation power of the first HST speed in which the rotation direction is set to one of the normal rotation direction and the reverse rotation direction (for example, reverse rotation direction) is output from the motor shaft 16 and, when the output adjustment member 20 is located at a second operation position, the rotation power of the second HST speed in which the rotation direction is set to the other one of the normal rotation direction and the reverse rotation direction (for example, normal rotation direction) is output from the motor shaft 16.

In this case, when the output adjustment member 20 is located at a neutral position between the first and second operation positions, the rotational speed of the HST output becomes neutral speed (zero speed).

In this embodiment, the HST 10 has, as the output adjustment member 20, a movable swash plate varying the capacity of the hydraulic pump 14 by being oscillated around an oscillation shaft and capable of being oscillated to one side and the other side around the oscillation shaft across the neutral position where the discharge amount of pressure oil discharged from the hydraulic pump 14 is set to zero as illustrated in FIG. 1 and FIG. 2.

When the movable swash plate is located at the neutral position, the pressure oil is not discharged from the hydraulic pump 14, so that the HST 10 is brought into a neutral state where the output of the hydraulic motor 18 is zero.

Then, when the movable swash plate is oscillated from the neutral position to the normal rotation side which is the one side around the oscillation shaft, the pressure oil is supplied to one of the pair of hydraulic oil lines 15 from the hydraulic pump 14, so that the one hydraulic oil line 15 becomes a high-pressure side and the other operation line 15 becomes a low-pressure side.

Thus, the hydraulic motor 18 is rotationally driven in the normal rotation direction, so that the HST 10 brought into a normal rotation output state.

On the contrary, when the movable swash plate is oscillated from the neutral position to the reverse rotation side which is the other side around the oscillation shaft, the pressure oil is supplied to the other side of the pair of hydraulic oil lines 15 from the hydraulic pump 14, so that the other hydraulic oil line 15 becomes a high-pressure side and the one hydraulic oil line 15 becomes a low-pressure side.

Thus, the hydraulic motor 18 is rotationally driven in the reverse rotation direction, so that the HST 10 is brought into a reverse rotation output state.

In the HST 10, the capacity of the hydraulic motor 18 is fixed by the fixed swash plate.

As illustrated in FIG. 2, the output adjustment member 20 is operatively controlled by the control device 100 based on the operation of the speed change operation member 90.

More specifically, the control device 100 operates the output adjustment member 20 through an actuator 110 based on the operation to the speed change operation member 90.

The actuator 110 can take various configurations, such as an electric motor and a hydraulic servo mechanism, insofar as the operation is controlled by the control device 100.

As illustrated in FIG. 1 and FIG. 2, the planetary gear mechanism 30 has a sun gear 32, a planetary gear 34 meshed with the sun gear 32, an internal gear 36 meshed with the planetary gear 34, and a carrier 38 supporting the planetary gear 34 so as to be rotatable around the axis and rotating around the axis of the sun gear 32 while interlocked with the revolution around the sun gear 32 of the planetary gear 34, in which the sun gear 32, the carrier 38, and the internal gear 36 form three planetary elements.

A third element which is one of the three planetary elements is operatively coupled with the motor shaft 16 and the third element functions as a variable power input portion which inputs the HST output.

As illustrated in FIG. 1 and FIG. 2, the sun gear 32 is set as the third element in this embodiment.

In this embodiment, the sun gear 32 is operatively coupled with the motor shaft 16 through a gear train 216.

The transmission structure 1 according to this embodiment enables switching between a first transmission state where the first element is functioned as a reference power input portion inputting the reference rotation power from the driving source 210 and the second element is functioned as an output portion outputting synthetic rotation power, and a second transmission state where the first element is functioned as the output portion and the second element is functioned as the reference power input portion.

Specifically, as illustrated in FIG. 1 and FIG. 2, the transmission structure 1 has an input side first transmission mechanism 50(1) and an input side second transmission mechanism 50(2) capable of operatively transmitting the rotation power of the driving source 210 to the first element and the second element, respectively, an input side first clutch mechanism 60(1) and an input side second clutch mechanism 60(2) engaging/disengaging the power transmission of the input side first transmission mechanism 50(1) and the input side second transmission mechanism 50(2), respectively, an output side first transmission mechanism 70(1) and an output side second transmission mechanism 70(2) capable of operatively transmitting the rotation power of the first element and the second element, respectively, to the speed change output shaft, and an output side first clutch mechanism 80(1) and an output side second clutch mechanism 80(2) engaging/disengaging the power transmission of the output side first transmission mechanism 70(1) and the output side second transmission mechanism 70(2), respectively.

In this embodiment, the internal gear 36 and the carrier 38 function as the first and second elements, respectively.

The input side first transmission mechanism 50(1) is configured to be able to transmit the rotation power of the driving source 210 to the first element (the internal gear 36 in this embodiment) at an input side first speed change ratio.

In detail, as illustrated in FIG. 1 and FIG. 2, the input side first transmission mechanism 50(1) has an input side first driving gear 52(1) relatively rotatably coupled with the main driving shaft 212 and an input side first driven gear 54(1) meshed with the input side first driving gear 52(1) and coupled with the first element.

The input side second transmission mechanism 50(2) is configured to be able to transmit the rotation power of the driving source 210 to the second element (the carrier 38 in this embodiment) at an input side second speed change ratio.

In detail, as illustrated in FIG. 1 and FIG. 2, the input side second transmission mechanism 50(2) has an input side second driving gear 52(2) relatively rotatably supported by the main driving shaft 212 and an input side second driven gear 54(2) meshed with the input side second driving gear 52(2) and coupled with the second element.

In this embodiment, the input side first and second clutch mechanisms 60(1) and 60(2) are configured as friction plate clutch mechanisms.

In detail, the input side first clutch mechanism 60(1) has an input side clutch housing 62 supported by the main driving shaft 212 so as not to be relatively rotatable, an input side first friction plate group 64(1) containing a first driving side friction plate supported by the input side clutch housing 62 so as not to be relatively rotatable and a first driven side friction plate supported by the input side first driving gear 52(1) so as not to be relatively rotatable in a state of being opposed to the first driving side friction plate, and an input side first piston (not illustrated) causing the input side first friction plate group 64(1) to be frictionally engaged.

The input side second clutch mechanism 60(2) has the input side clutch housing 62, an input side second friction plate group 64(2) containing a second driving side friction plate supported by the input side clutch housing 62 so as not to be relatively rotatable and a second driven side friction plate supported by the input side second driving gear 52(2) so as not to be relatively rotatable in a state of being opposed to the second driving side friction plate, and an input side second piston (not illustrated) causing the input side second friction plate group 64(2) to be frictionally engaged.

The output side first transmission mechanism 70(1) is configured to be able to transmit the rotation power of the second element to the speed change output shaft 45 at an output side first speed change ratio.

In detail, the transmission structure has a speed change intermediate shaft 43 disposed coaxially with the planetary gear mechanism 30 and coupled with one of the first and second elements so as not to be relatively rotatable around the axis.

In this embodiment, the speed change intermediate shaft 43 is coupled with the second element so as not to be relatively rotatable.

Then, the output side first transmission mechanism 70(1) has an output side first driving gear 72(1) supported by the speed change intermediate shaft 43 so as not to be relatively rotatable and an output side first driven gear 74(1) meshed with the output side first driving gear 72(1) and relatively rotatably supported by the speed change output shaft 45.

The output side second transmission mechanism 70(2) is configured to be able to transmit the rotation power of the first element to the speed change output shaft 45 at an output side second speed change ratio.

In detail, the output side second transmission mechanism 70(2) has an output side second driving gear 72(2) coupled with the first element and an output side second driven gear 74(2) meshed with the output side second driving gear 72(2) and relatively rotatably supported by the speed change output shaft 45.

In this embodiment, the output side second driving gear 72(2) is supported by the speed change intermediate shaft 43 so as to be relatively rotatable.

In this embodiment, the output side first and second clutch mechanisms 80(1) and 80(2) are configured as friction plate clutch mechanisms.

In detail, the output side first clutch mechanism 80(1) has an output side clutch housing 82 supported by the speed change output shaft 45 so as not to be relatively rotatable, an output side first friction plate group 84(1) containing a first driving side friction plate supported by the output side first driven gear 74(1) so as not to be relatively rotatable and a first driven side friction plate supported by the output side clutch housing 82 so as not to be relatively rotatable in a state of being opposed to the first driving side friction plate, and an output side first piston (not illustrated) causing the output side first friction plate group to be frictionally engaged.

The output side second clutch mechanism 80(2) has the output side clutch housing 82, an output side second friction plate group 84(2) containing a second driving side friction plate supported by the output side second driven gear 74(2) so as not to be relatively rotatable and a second driven side friction plate supported by the output side clutch housing 82 so as not to be relatively rotatable in a state of being opposed to the second driving side friction plate, and an output side second piston (not illustrated) causing the output side second friction plate group to be frictionally engaged.

In the transmission structure 1 according to this embodiment, the input side first and second clutch mechanisms 60(1) and 60(2) and the output side first and second clutch mechanisms 80(1) and 80(2) are of a hydraulic type in which an engagement state is exhibited when it receives pressure oil supply.

In detail, as illustrated in FIG. 2, the transmission structure 1 further has a pressure oil supply line 155, the upstream side of which is fluid-connected to a hydraulic source 150, such as a hydraulic pump, a drain line 157, a first supply/discharge line 160(1) supplying/discharging pressure oil to the input side and output side first clutch mechanisms 60(1) and 80(1), a second supply/discharge line 160(2) supplying/discharging pressure oil to the input side and output side second clutch mechanisms 60(2) and 80(2), and a switching valve 165, the position of which is controlled by the control device 100.

The reference numeral 156 in FIG. 2 designates a relief valve setting the hydraulic pressure of the pressure oil supply line 155.

The switching valve 165 is configured to be able to take a first position where the pressure oil supply/discharge line 155 is fluid-connected to the first supply/discharge line 160(1) and the second supply/discharge line 160(2) is fluid-connected to the drain line 157 and a second position where the first supply/discharge line 160(1) is fluid-connected to the drain line 157 and the pressure oil supply/discharge line 155 is fluid-connected to the second supply/discharge line 160(2).

As illustrated in FIG. 1, the transmission structure 1 according to this embodiment further has a traveling transmission shaft 235 disposed on the downstream side in the transmission direction relative to the speed change output shaft 45 and a forward/reverse movement switching mechanism 230 configured to be able to switch the rotation direction of the driving force between the forward movement direction and the reverse movement direction between the speed change output shaft 45 and the traveling transmission shaft 235.

The forward/reverse movement switching mechanism 230 is configured so that the forward movement direction and the reverse movement direction is switched by the control device 100 in response to the operation to the forward movement side and the reverse movement side of the speed change operation member 90, for example.

More specifically, when recognizing that the speed change operation member 90 is operated to the forward movement side, the control device 100 brings the forward/reverse movement switching mechanism 230 into a forward movement transmission state and, when recognizing that the speed change operation member 90 is operated to the reverse movement side, the control device 100 brings the forward/reverse movement switching mechanism 230 into a reverse movement transmission state.

As illustrated in FIG. 1, the transmission structure 1 according to this embodiment is further provided with a second traveling transmission shaft 245 disposed on the downstream side in the transmission direction relative to the traveling transmission shaft 235 and a sub speed change mechanism 240 capable of changing, in multiple stages, the rotational speed of the driving force in two stages of a high speed stage and a low speed stage between the traveling transmission shaft 235 and the second traveling transmission shaft 245.

The sub speed change mechanism 240 is configured so that switching between a high speed transmission state and a low speed transmission state is performed through a mechanical link mechanism or by the control device in response to a manual operation to a sub speed change operation member (not illustrated), for example.

The working vehicle 200 has one pair of right and left main driving wheels as the driving wheels 220. Therefore, the working vehicle 200 further has a pair of main driving axles 250 correspondingly driving the pair of main driving wheels and a differential mechanism 260 differentially transmitting the rotation power of the second traveling transmission shaft 245 to the pair of main driving axles 250 as illustrated in FIG. 1.

As illustrated in FIG. 1, the working vehicle 200 further has a traveling brake mechanism 255 selectively applying braking force to the main driving axle 250, a differential lock mechanism 265 forcibly synchronously driving the pair of main driving axles 250 by the rotation power from the second traveling transmission shaft 245, and a driving force take-out mechanism 270 for sub-driving wheels capable of selectively outputting the rotation power branched from the second traveling transmission shaft 245 toward the sub-driving wheels.

Moreover, the working vehicle 200 has a PTO shaft 280 outputting the rotation power to the outside and a PTO clutch mechanism 285 and a PTO multistage speed change mechanism 290 interposed in a PTO transmission path reaching the PTO shaft 280 from the driving source 210.

Herein, the operation control of the HST 10, the input side first and second clutch mechanisms 60(1) and 60(2), and the output side first and second clutch mechanisms 80(1) and 80(2) by the control device 100 is described.

Figure 3A:
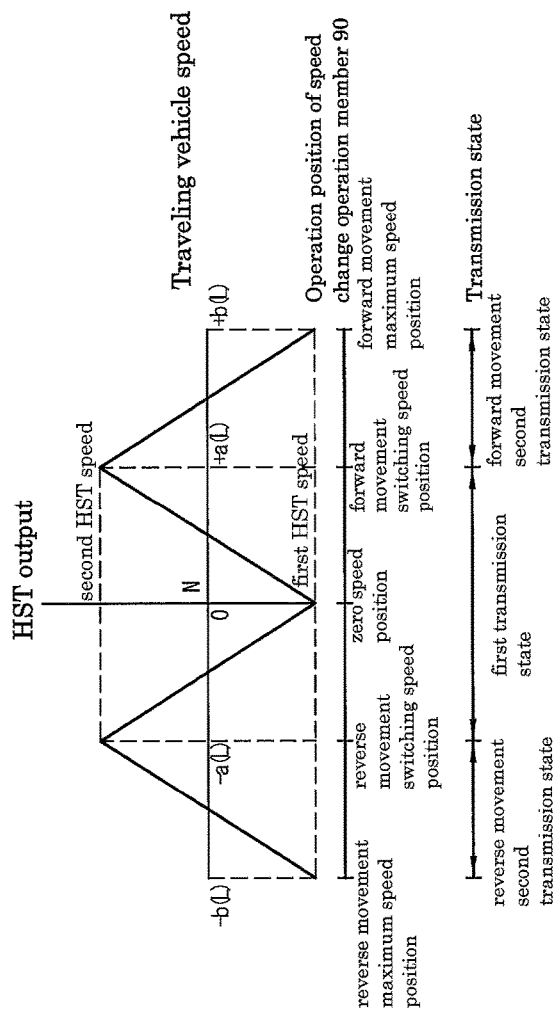
FIGS. 3A and 3B are graphs illustrating the relationship between the traveling vehicle speed and the rotational speed of the HST output in the working vehicle to which the transmission structure according to the embodiment 1 is applied, and illustrate states where a sub speed change mechanism 240 provided in the transmission structure is engaged with a low speed stage and a high speed stage, respectively.
Figure 3B:
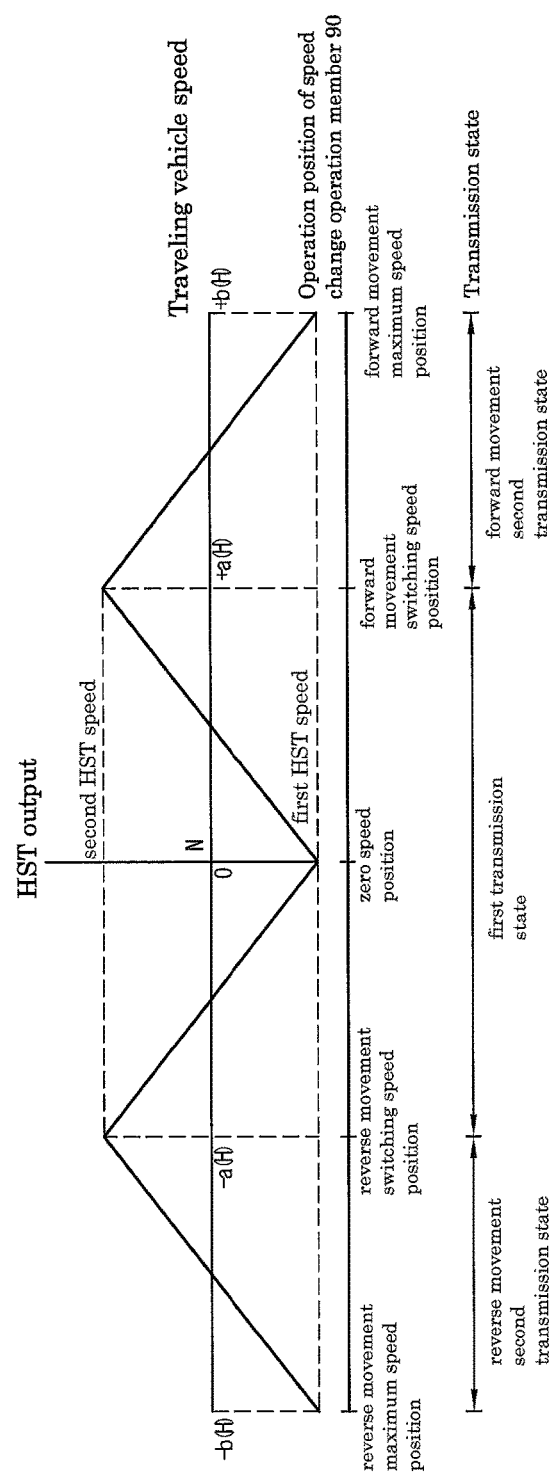

FIG. 3A and FIG. 3B illustrate graphs illustrating the relationship between the traveling vehicle speed and the rotational speed of the HST output in the working vehicle 200.

FIG. 3A and FIG. 3B illustrates states where the sub speed change mechanism 240 is engaged with a low speed stage and a high speed stage, respectively.

The control device 100 produces the first transmission state where the first element (the internal gear 36 in this embodiment) is functioned as the reference power input portion which receives the reference power operatively transmitted from the driving source 210 and the second element (the carrier 38 in this embodiment) is functioned as an output portion of the synthetic rotation power by bringing the input side and output side first clutch mechanisms 60(1) and 80(1) into an engagement state and bringing the input side and output side second clutch mechanisms 60(2) and 80(2) into a disengagement state when the speed change operation member 90 is operated before the switching speed positions (i.e., in a low speed state where the rotational speed of the speed change output shaft 45 is less than a predetermined switching speed based on a detection signal of the output sensor 95b).

The output sensor 95b may take various forms, such as a sensor detecting the rotational speed of the speed change output shaft 45 and a sensor detecting the rotational speed of the driving wheel 20 or the driving axle 250, insofar as the rotational speed of the speed change output shaft 45 can be directly or indirectly recognized.

The low speed state where the rotational speed of the speed change output shaft 45 is less than the predetermined switching speed means that, in a case where the traveling vehicle speed is set as a reference, the vehicle speed is within the range of −a(L) to +a (L) when the sub speed change mechanism 240 is engaged with the low speed stage (see FIG. 3A) and the vehicle speed is within the range of −a(H) to +a (H) when the sub speed change mechanism 240 is engaged with the high speed stage (see FIG. 3B).

"+" and "−" of the traveling vehicle speed mean that the traveling directions of the working vehicle 200 are the forward movement direction and the reverse movement direction, respectively.

In the first transmission state, the control device 100 operates the output adjustment member 20 so that the HST output is speed-changed from the first HST speed (reverse rotation side predetermined speed in this embodiment) toward the second HST speed (normal rotation side predetermined speed in this embodiment) based on the HST sensor 95a in response to an acceleration operation of the speed change operation member 90.

The HST sensor 95a may take various forms, such as a sensor detecting the rotational speed of the motor shaft 16 and a sensor detecting the operation position of the output adjustment member 20, insofar as the output state of the HST 10 can be detected.

More specifically, when the speed change operation member 90 is located before the switching speed position, the control device 100 produces the first transmission state, and then, (1) when the speed change operation member 90 is located at a zero speed position (vehicle stop position), the control device 100 locates the output adjustment member 20 at the first HST speed position (reverse rotation side predetermined speed position in this embodiment) where the HST output is set to the first HST speed, (2) until the speed change operation member 90 reaches the switching speed position (i.e., until the rotational speed of the speed change output shaft 45 reaches the switching speed from the zero speed (in a case where the traveling vehicle speed in the working vehicle 200 of this embodiment is used as a reference, equivalent to the time until the traveling vehicle speed reaches the vehicle speed −a(L) (in reverse movement) from the zero speed and the time until the traveling vehicle speed reaches the vehicle speed +a(L) (in forward movement) from the zero speed when the sub speed change mechanisms 240 is in the low speed stage engagement state (FIG. 3A) and equivalent to the time until the traveling vehicle speed reaches the vehicle speed −a(H) (in reverse movement) from the zero speed and the time until the traveling vehicle speed reaches the vehicle speed +a(H) (in forward movement) from the zero speed when the sub speed change mechanism 240 is in the high speed stage engagement state (FIG. 3B)), the control device 100 operates the output adjustment member 20 so that the HST output is speed-changed from the side of the first HST speed to the side of the second HST speed in response to the acceleration operation of the speed change operation member 90 (so that the output adjustment member 20 is moved from the reverse rotation side predetermined speed position side to a normal rotation side predetermined speed position side in this embodiment), and (3) when the speed change operation member 90 is located at the switching speed position (i.e., when the rotational speed of the speed change output shaft 45 reaches the switching speed (in a case where the traveling vehicle speed in the working vehicle 200 of this embodiment is used as a reference, equivalent to the time when the traveling vehicle speed reaches the vehicle speed −a(L) (in reverse movement) and the time when the traveling vehicle speed reaches the vehicle speed +a(L) (in forward movement) when the sub speed change mechanisms 240 is in the low speed stage engagement state (FIG. 3A) and equivalent to the time when the traveling vehicle speed reaches the vehicle speed −a(H) (in reverse movement) and the time when the traveling vehicle speed reaches the vehicle speed +a(H) (in forward movement) when the sub speed change mechanism 240 is in the high speed stage engagement state (FIG. 3B)), the control device 100 operates the output adjustment member 20 at the second HST speed position (in this embodiment, normal rotation side predetermined speed position) where the HST output is set to the second HST speed.

Furthermore, when recognizing that the speed change operation member 90 is operated to the high speed side beyond the switching speed position (i.e., recognizing that the rotational speed of the speed change output shaft 45 reaches a high speed state equal to or higher than the predetermined switching speed based on a detection signal of the output sensor 95b), the control device 100 produces a second transmission state where the first element is functioned as an output portion and the second element is functioned as the reference power input portion by bringing the input side and output side first clutch mechanisms 60(1) and 80(1) into the disengagement state and bringing the input side and output side second clutch mechanisms 60(2) and 80(2) into the engagement state.

The high speed state where the rotational speed of the speed change output shaft 45 is equal to or higher than the predetermined switching speed means a state where, in a case where the traveling vehicle speed is used as a reference, the traveling vehicle speed is higher than or equal to −a(L) (in reverse movement) and higher than or equal to +a(L) (in forward movement) when the sub speed change mechanism 240 is engaged with the low speed stage (see FIG. 3A) and, the traveling vehicle speed is higher than or equal to −a(H) (in reverse movement) and higher than or equal to +a(H) (in forward movement) when the sub speed change mechanism 240 is engaged with the high speed stage (see FIG. 3B).

In the second transmission state, the control device 100 operates the output adjustment member 20 so that the HST output is speed-changed from the second HST speed (normal rotation side predetermined speed in this embodiment) toward the first HST speed (the reverse rotation side predetermined speed in this embodiment) based on the HST sensor 95a in response to the acceleration operation of the speed change operation member 90.

More specifically, when the speed change operation member 90 is operated to the forward movement high speed side relative to the switching speed position, the control device 100 produces the second transmission state, and then, (1) when the speed change operation member 90 is located at the speed switching position, the control device 100 locates the output adjustment member 20 at the second HST speed position where the HST output is set to the second HST speed (normal rotation side predetermined speed position in this embodiment), (2) when the speed change operation member 90 is located between the switching speed position and a forward movement maximum speed position (i.e., until the rotational speed of the speed change output shaft 45 reaches the maximum speed from the switching speed (in a case where the traveling vehicle speed in the working vehicle 200 of this embodiment is used as a reference, equivalent to the time until the traveling vehicle speed reaches the vehicle speed −b(L) from the vehicle speed −a(L) (in reverse movement) and the time until the traveling vehicle speed reaches the vehicle speed +b(L) from the vehicle speed +a(L) (in forward movement) when the sub speed change mechanism 240 is engaged with the low speed stage (FIG. 3A) and equivalent to the time until the traveling vehicle speed reaches the vehicle speed −b(H) from the vehicle speed −a(H) (in reverse movement) and the time until the traveling vehicle speed reaches the vehicle speed +b(H) from the vehicle speed +a(H) (in forward movement) when the sub speed change mechanism 240 is in the high speed stage engagement state (FIG. 3B)), the control device 100 operates the output adjustment member 20 so that the HST output is speed-changed from the side of the second HST speed to the side of the first HST speed in response to the acceleration operation of the speed change operation member 90 (the output adjustment member 20 is moved from the normal rotation side predetermined speed position to the reverse rotation side predetermined speed position in this embodiment), and (3) when the speed change operation member 90 is operated to the forward movement maximum speed position (i.e., when the rotational speed of the speed change output shaft 45 reaches the maximum speed (in a case where the traveling vehicle speed in the working vehicle 200 of this embodiment is used as a reference, equivalent to the time when the traveling vehicle speed reaches the vehicle speed −b(L) (in reverse movement) and the time when the traveling vehicle speed reaches the vehicle speed +b(L) (in forward movement) when the sub speed change mechanism 240 is in the low speed stage engagement state (FIG. 3A) and equivalent to the time when the traveling vehicle speed reaches the vehicle speed −b(H) (in reverse movement) and the time when the traveling vehicle speed reaches the vehicle speed +b(H) (in forward movement) when the sub speed change mechanism 240 is in the high speed stage engagement state (FIG. 3B)), the control device 100 locates the output adjustment member 20 at the first HST speed position (the reverse rotation side predetermined speed position in this embodiment) where the HST output is set to the first HST speed.

Herein, in this embodiment, the input side first and second speed change ratios are set so that the rotational speed of the second element is the same in the interval of time between when the HST output is set to the second HST speed under the first transmission state where the second element functions as the output portion and when the second transmission state is realized where the second element functions as the reference power input portion that receives the reference power from the driving source operatively transmitted through the input side second transmission mechanism 50(2). The input side first and second speed ratios are also set so that the rotational speed of the first element is the same in the interval of time between when the HST output is set to the second HST speed under the second transmission state where the first element functions as the output portion and when the first transmission state is realized where the first element functions as the reference power input portion that receives the reference power from the driving source operatively transmitted through the input side first transmission mechanism 50(1).

More specifically, in this embodiment, the input side first and second speed change ratios are set so that a rotational speed difference does not occur in the second element and the third element during the transition between the first transmission state (where the first element is functioned as the reference power input portion and the second element is functioned as the output portion) and the second transmission state (where the first element is functioned as the output portion and the second element is functioned as the reference power input portion).

Furthermore, in this embodiment, the output side first and second speed change ratios are set so that the rotational speed developed in the speed change output shaft 45 when the HST output is set to the second HST speed is same in the first and second transmission states.

More specifically, in this embodiment, the output side first and second speed change ratios are set so that a change does not occur in the rotational speed of the speed change output shaft 45, i.e., the traveling vehicle speed, during the transition between the first and second transmission states.

According to the transmission structure 1 provided with such a configuration, as illustrated in FIG. 3, a continuous speed change can be achieved over the speed change range where the speed change output shaft 45 is accelerated by speed-changing the HST output from the first HST speed to the second HST speed (speed change range of 0 to −a and 0 to +a in a case where the traveling vehicle speed is used as a reference, which is hereinafter referred to as a low speed side speed change range) and the speed change range where the speed change output shaft 45 is accelerated by speed-changing the HST output from the second HST speed to the first HST speed (speed change range of −a to −b and +a to +b in a case where the traveling vehicle speed is used as a reference, which is hereinafter referred to as a high speed side speed change range).

Furthermore, in the switching between the low speed side speed change range (first transmission state) and the high speed side speed change range (second transmission state), a change in the operation position of the output adjustment member 20 of the HST 10 is not required and a change in the traveling vehicle speed is not caused.

Therefore, the switching can be smoothly performed without applying a load to constituent members of the traveling system transmission path in which the transmission structure 1 is interposed.

Moreover, the transmission structure 1 enables the switching without causing a speed difference between the low speed side speed change range (first transmission state) and the high speed side speed change range (second transmission state) without being provided with two or more the planetary gear mechanisms 30, and thus enables the realization of good transmission efficiency.

More specifically, when two or more of the planetary gear mechanisms are provided, the switch between the transmission state in the low speed side speed change range and the transmission state in the high speed side speed change range is enabled without requiring a change in the operation position of the output adjustment member of the HST and without causing a traveling vehicle speed change.

However, the transmission efficiency of the planetary gear mechanism is poor, and thus good transmission efficiency cannot be obtained in the configuration provided with two or more of the planetary gear mechanisms.

In contrast thereto, the transmission structure 1 can obtain the above-described effect by simply being provided with the single planetary gear mechanism 30.

Moreover, in the transmission structure 1 according to this embodiment, the input side first and second clutch mechanisms 60(1) and 60(2) and the output side first and second clutch mechanisms 80(1) and 80(2) are configured as the friction plate clutch mechanisms as described above.

According to such a configuration, the switching between the low speed side speed change range (first transmission state) and the high speed side speed change range (second transmission state) can be more smoothly performed.

Preferably, the switching speed of the speed change output shaft 45 serving as the target speed to start the switch between the first and second transmission states can be set to a speed higher than speed in the work speed range set in the working vehicle 200.

More specifically, working vehicles, such as a tractor and a combine, perform heavy load work, such as tilling work, plowing work, tamping work, and reaping work, while traveling at low speed in many cases.

In general, in the working vehicles, the traveling vehicle speed in performing such heavy load work is set as the work speed range. Traveling vehicle speed of 0 to 8 km/h is usually set as the work speed range and, depending on the specification, traveling vehicle speed of 0 to 10 km/h is set as the work speed range.

Therefore, by setting the switching speed of the speed change output shaft 45 to be higher than the speed in the work speed range in a case where the traveling vehicle speed is used as a reference, it can be effectively prevented that the switching between the first and second transmission states is performed in the state where the heavy load work is performed.

Embodiment 2

Hereinafter, another embodiment of the transmission structure according to the present invention is described with reference to the accompanying drawings.

Figure 4:
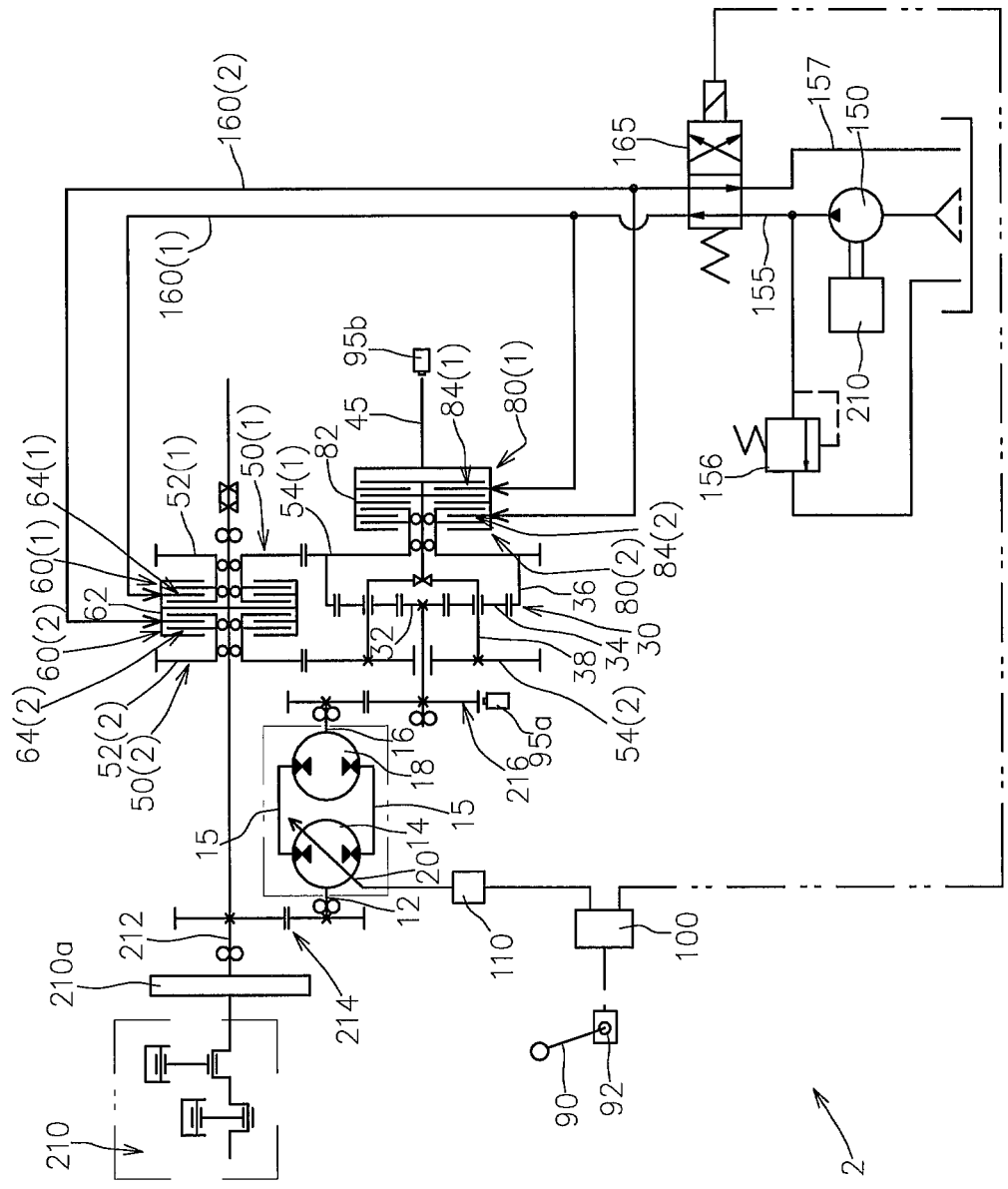
FIG. 4 is a hydraulic circuit diagram of a transmission structure according to an embodiment 2 of the present invention.

FIG. 4 illustrates a hydraulic circuit diagram of a transmission structure 2 according to this embodiment.

In the figure, the same components as those in Embodiment 1 described above are designated by the same reference numerals and a description thereof is omitted as appropriate.

The transmission structure 2 according to this embodiment is different from the transmission structure 1 according to Embodiment 1 in a point that the output side first and second transmission mechanisms 70(1) and 70(2) are deleted.

In this embodiment, the output side first and second clutch mechanisms 80(1) and 80(2) are provided to engage/disengage the power transmission from the second element (the carrier 38 in this embodiment) and the first element (the internal gear 36 in this embodiment), respectively, to the speed change output shaft 45.

Figure 5A:
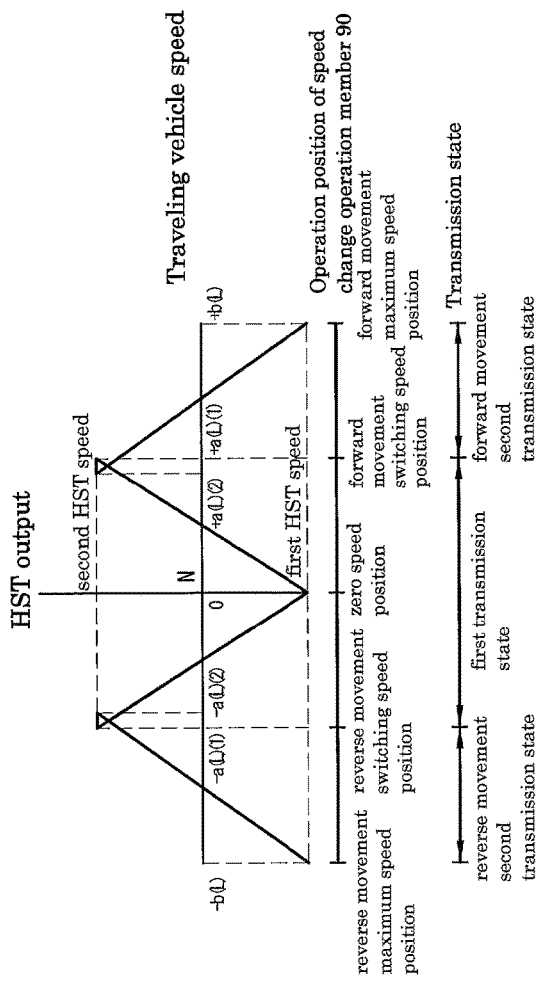
FIG. 5A and FIG. 5B illustrate graphs illustrating the relationship between the traveling vehicle speed and the rotational speed of the HST output in a working vehicle to which the transmission structure 2 is applied, and illustrate states where the sub speed change mechanism is engaged with a low speed stage and a high speed stage, respectively.
Figure 5B:
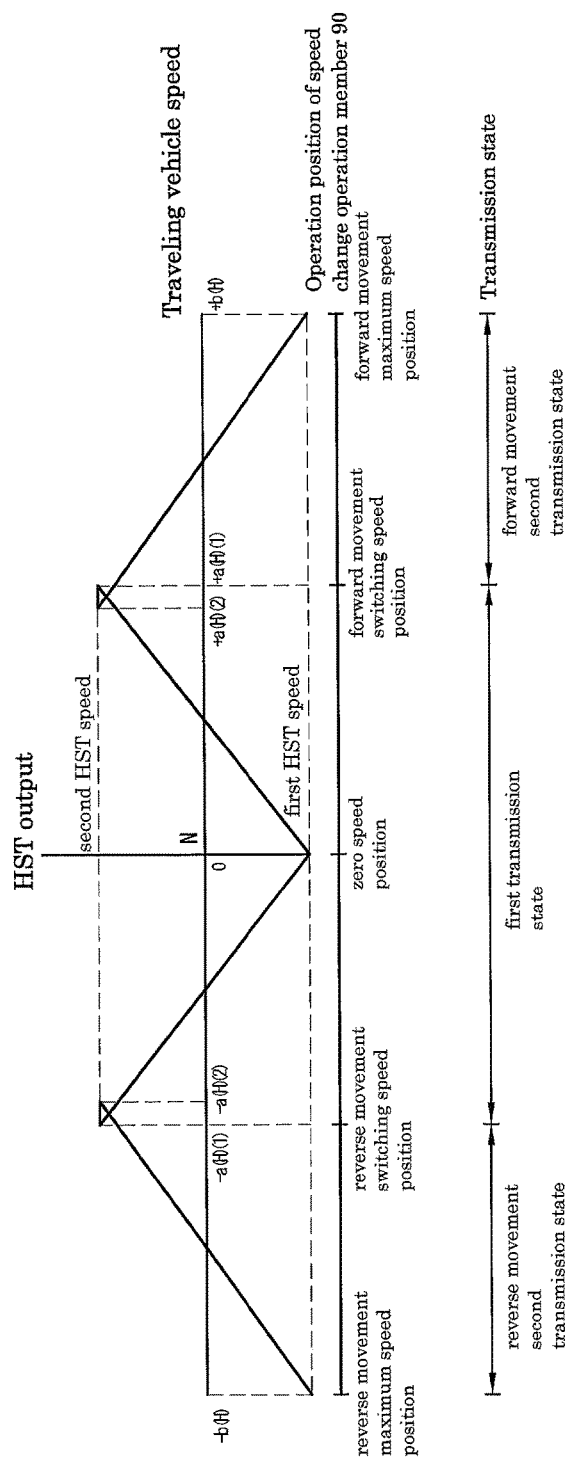

FIG. 5A and FIG. 5B illustrate graphs illustrating the relationship between the traveling vehicle speed and the rotational speed of the HST output in a working vehicle to which the transmission structure 2 is applied.

FIG. 5A and FIG. 5B illustrate states where the sub speed change mechanism 240 is engaged with a low speed stage and a high speed stage, respectively.

As illustrated in FIG. 5A and FIG. 5B, in this embodiment, the control device 100 is configured to perform switching from the first transmission state to the second transmission state when the speed change operation member 90 is operated from the zero speed position to the first switching speed positions, i.e., when recognizing that the speed change output shaft 45 reaches a predetermined first switching speed in the first transmission state based on a detection signal of the output sensor 95b (in a case where the traveling vehicle speed is used as a reference, −a(L)(1) (in reverse movement) or +a(L)(1) (in forward movement) in the low speed stage engagement and −a(H)(1) (in reverse movement) or +a(H)(1) (in forward movement) in the high speed stage engagement).

Herein, when the HST output is set to the second HST speed in the first transmission state, the rotational speed of the first switching speed is developed in the speed change output shaft 45.

More specifically, when the reference power from the driving source 210 is operatively input into the first element (the internal gear 36 in this embodiment), the HST output of the second HST speed is operatively input into the third element (the sun gear 32 in this embodiment), and the synthetic rotation power is output from the second element (the carrier 38 in this embodiment), the speed change output shaft 45 rotates at the first switching speed by the synthetic rotation power operatively transmitted from the second element.

At this time, the traveling vehicle speed is set to −a(L)(1) (in reverse movement) or +a(L)(1) (in forward movement) (FIG. 5A) in the low speed stage engagement of the sub speed change mechanism 240 and is set to −a(H)(1) (in reverse movement) or +a(H)(1) (in forward movement) (FIG. 5B) in the high speed stage engagement of the sub speed change mechanism 240.

When the speed change operation member 90 is operated to the first switching speed positions (i.e., when the switching from the first transmission state to the second transmission state is performed due to the fact that the HST output is set to the second HST speed, so that the rotational speed of the speed change output shaft 45 reaches the first switching speed in the first transmission state), a state is set where the reference power from the driving source 210 is operatively input into the second element (the carrier 38 in this embodiment), the HST output of the second HST speed is operatively input into the third element (the sun gear 32 in this embodiment), and the synthetic rotation power is output from the first element (the internal gear 38 in this embodiment), so that the speed change output shaft 45 is rotated by the synthetic rotation power operatively transmitted from the first element.

At this time, the transmission structure 2 according to this embodiment does not have the output side first and second transmission mechanisms 70(1) and 70(2) as described above, and therefore the rotational speed of the speed change output shaft 45 changes from the first switching speed to a second switching speed.

The traveling vehicle speed when the rotational speed of the speed change output shaft 45 is the second switching speed becomes −a(L)(2) (in reverse movement) or +a(L)(2) (in forward movement) (FIG. 5A) in the low speed stage engagement of the sub speed change mechanism 240, and becomes −a(H)(2) (in reverse movement) or +a(H)(2) (in forward movement) (FIG. 5B) in the high speed stage engagement of the sub speed change mechanism 240.

More specifically, in the transmission structure 2 according to this embodiment, a rotational speed difference occurs in the speed change output shaft 45 in the switching between the first and second transmission states, so that the traveling vehicle speed changes.

However, the rotational speed difference is not so large, and therefore can be absorbed by components forming the traveling system transmission path.

In particular, in this embodiment, the input side first and second clutch mechanisms 60(1) and 60(2) and the output side first and second clutch mechanisms 80(1) and 80(2) are configured as the friction plate clutch mechanisms, and thus the rotational speed difference can be effectively absorbed by the friction plate clutch mechanisms.

In place thereof, the input side second clutch mechanism 60(2) brought into the engagement state in the second transmission state out of the input side first and second clutch mechanisms 60(1) and 60(2) and the output side second clutch mechanism 80(2) brought into the engagement state in the second transmission state out of the output side first and second clutch mechanisms 80(1) and 80(2) can be configured as the friction plate clutch mechanisms and the remaining clutch mechanisms 60(1) and 80(1) can be configured as the other forms, such as a dog clutch mechanism.

According to the transmission structure 2 having such a configuration, although a certain traveling speed difference occurs in the switching between the first and second transmission states, the structure can be simplified by the deletion of the output side first and second transmission mechanisms 70(1) and 70(2) as compared with Embodiment 1.

Figure 6A:
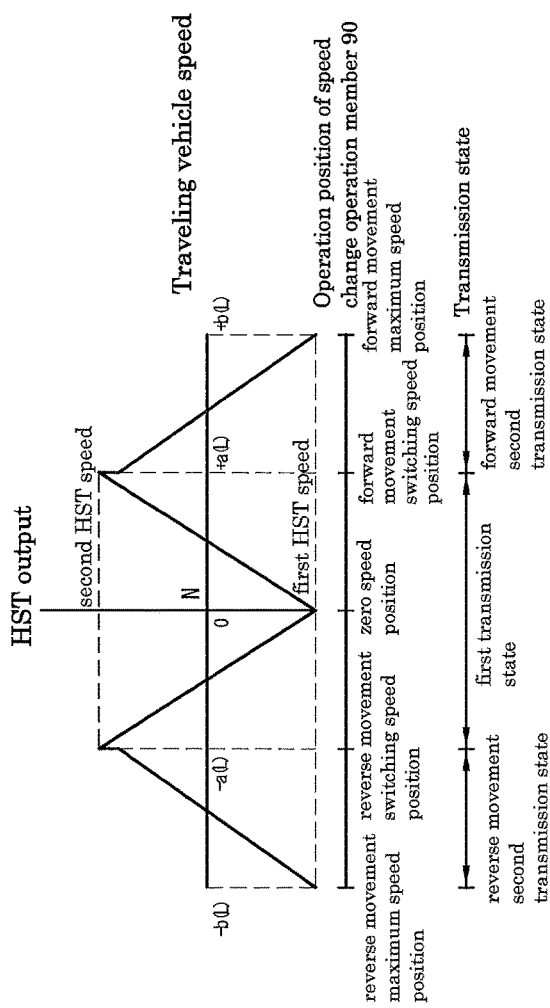
FIGS. 6A and 6B illustrate graphs illustrating the relationship between the traveling vehicle speed and the rotational speed of the HST output in a working vehicle to which a modification of the embodiment 2 is applied, and illustrate states where the sub speed change mechanism is engaged with the low speed stage and the high speed stage, respectively.
Figure 6B:
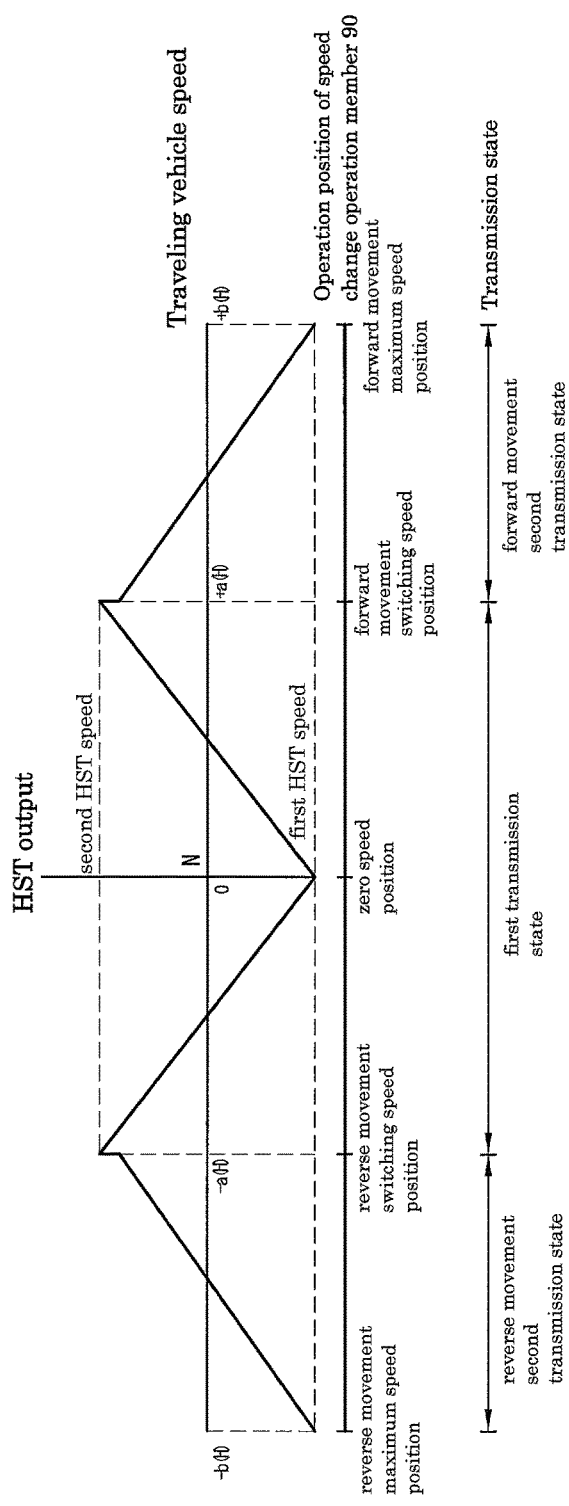

FIG. 6A and FIG. 6B illustrate graphs illustrating the relationship between the traveling vehicle speed and the rotational speed of the HST output in a modification of this embodiment.

FIG. 6A and FIG. 6B illustrate states where the sub speed change mechanism 240 is engaged with the low speed stage and the high speed stage, respectively.

In the modification, the control device 100 operates the output adjustment member 20 so that the switching speed in a transmission state after the switching coincides with or approaches the switching speed in a transmission state before the switching in the switching between the first and second transmission states.

More specifically, in a case where the switching from the first transmission state to the second transmission state is taken as an example, the control device 100 is configured to operate the output adjustment member 20 so that the switching speed (second switching speed) in the second transmission state which is a transmission state after the switching coincides with or approaches the switching speed (first switching speed) in the first transmission state which is the transmission state before the switching.

Such a modification can effectively prevent or reduce the occurrence of the rotational speed difference in the speed change output shaft 45 in the switching between the first and second transmission states, i.e. the occurrence of a traveling speed difference.

Embodiment 3

Hereinafter, a still another embodiment of the transmission structure according to the present invention is described with reference to the accompanying drawings.

Figure 7:
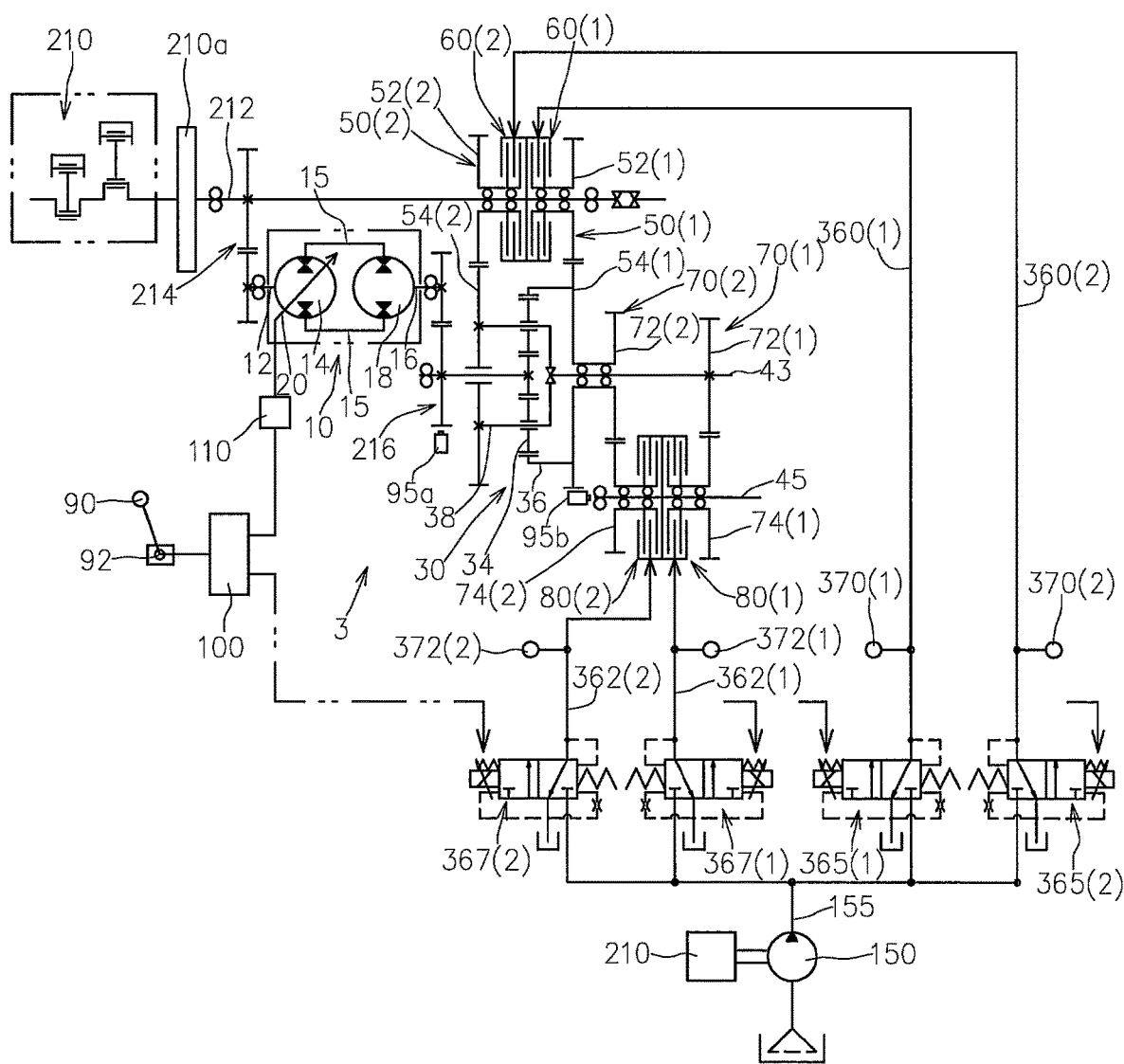
FIG. 7 is a hydraulic circuit diagram of a transmission structure 3 according to an embodiment 3 of the present invention.

FIG. 7 illustrates a hydraulic circuit diagram of a transmission structure 3 according to this embodiment.

In the figure, the same components as those in Embodiments 1 and 2 described above are designated by the same reference numerals and a description thereof is omitted as appropriate.

The transmission structure 3 according to this embodiment is different from the transmission structure 1 according to Embodiment 1 in a point that a double transmission state where both the input side first and second clutch mechanisms 60(1) and 60(2) are brought into the engagement state and both the output side first and second clutch mechanisms 80(1) and 80(2) are brought into the engagement state is developed in the switching transition stage of the first and second transmission states.

Specifically, the transmission structure 3 is different from the transmission 1 according to Embodiment 1 in the pressure oil supply/discharge configuration to the input side first and second clutch mechanisms 60(1) and 60(2) and the output side first and second clutch mechanisms 80(1) and 80(2).

More specifically, as illustrated in FIG. 7, the transmission structure 3 is provided with the pressure oil supply line 155, an input side first supply/discharge line 360(1), an input side second supply/discharge line 360(2), an output side first supply/discharge line 362(1) and an output side second supply/discharge line 362(2) supplying/discharging pressure oil to the input side first clutch mechanism 60(1), the input side second clutch mechanism 60(2), the output side first clutch mechanism 80(1) and the output side second clutch mechanism 80(2), respectively, an input side first electromagnetic valve 365(1), an input side second electromagnetic valve 365(2), an output side first electromagnetic valve 367(1) and an output side second electromagnetic valve 367(2) interposed between the pressure oil supply line 155 and the input side first supply/discharge line 360(1), the input side second supply/discharge line 360(2), the output side first supply/discharge line 362(1) and the output side second supply/discharge line 362(2), respectively, and an input side first pressure sensor 370(1), an input side second pressure sensor 370(2), an output side first pressure sensor 372(1) and an output side second pressure sensor 372(2) interposed in the input side first supply/discharge line 360 (1), the input side second supply/discharge line 360(2), the output side first supply/discharge line 362(1) and the output side second supply/discharge line 362(2), respectively.

Each of the electromagnetic valves 365(1), 365(2), 367(1) and 367(2) is configured to be able to take a discharge position where the corresponding supply/discharge line 360 (1), 360(2), 362(1) and 362(2) is drained and a supply position where the corresponding supply/discharge line 360 (1), 360(2), 362(1) and 362(2) is fluid-connected to the pressure oil supply line 155.

In this embodiment, each of the electromagnetic valves 365(1), 365(2), 367(1) and 367(2) is biased toward the discharge positions by a biasing member and located at the supply position against the pressing force of the biasing member when a control signal from the control device 100 is input.

In this embodiment, as illustrated in FIG. 7, each of the electromagnetic valve 365(1), 365(2), 367(1) and 367(2) is configured as a proportional electromagnetic valve that receives the hydraulic pressure of the corresponding supply/discharge line 360(1), 360(2), 362(1) and 362(2) as pilot pressure to thereby maintain the hydraulic pressure of the corresponding supply/discharge line 360(1), 360(2), 362(1)

and 362(2) at engagement hydraulic pressure in a state where a position signal to the supply position is input from the control device 100.

The position control of the electromagnetic valves 365(1), 365(2), 367(1) and 367(2) by the control device 100 is described taking a case of the switching from the first transmission state to the second transmission state as an example.

Figure 8:
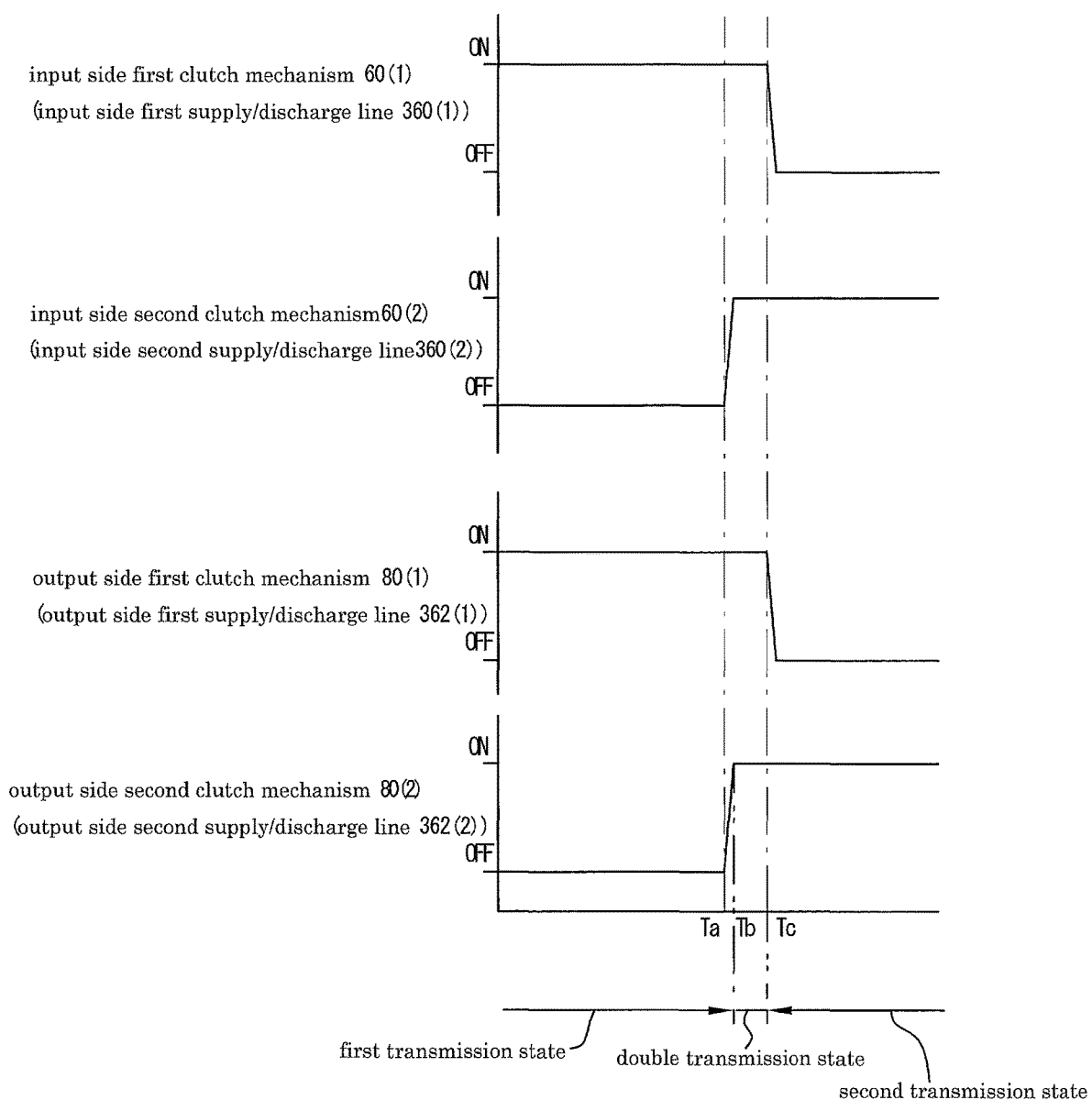
FIG. 8 is hydraulic pressure waveform charts in switching from first to second transmission states in the transmission structure according the embodiment 3.

FIG. 8 illustrates hydraulic pressure waveform charts of the supply/discharge lines 360(1), 360(2), 362(1) and 362(2) in the switching from the first transmission state to the second transmission state.

In a state where the speed change operation member 90 is located between the zero speed position and the switching speed position (i.e., in a low speed state where the rotational speed of the speed change output shaft 45 is less than the switching speed), the control device 100 locates the input side first electromagnetic valve 365(1) and the output side first electromagnetic valve 367(1) at the supply positions and locates the input side second electromagnetic valve 365(2) and the output side second electromagnetic valve 367(2) at the discharge positions.

In this state, while the hydraulic pressure of the input side second supply/discharge line 360(2) and the output side second supply/discharge line 362(2) are released, so that the input side second clutch mechanism 60(2) and the output side second clutch mechanism 80(2) are brought into the disengagement state, the input side first supply/discharge line 360(1) and the output side first supply/discharge line 362(1) are maintained at the engagement hydraulic pressure set by the pilot pressure of the corresponding electromagnetic valves 365(1) and 367(1), so that the input side first clutch mechanism 60(1) and the output side first clutch mechanism 80(1) are brought into the engagement state.

Thus, the transmission structure 3 is brought into the first transmission state.

Meanwhile, in a state where the speed change operation member 90 is operated beyond the switching speed position (i.e., in a high speed state where the rotational speed of the speed change output shaft 45 is equal to or higher than the switching speed), the control device 100 locates the input side first electromagnetic valve 365(1) and the output side first electromagnetic valve 367(1) at the discharge positions and locates the input side second electromagnetic valve 365(2) and the output side second electromagnetic valve 367(2) at the supply positions.

In this state, while the hydraulic pressure of the input side first supply/discharge line 360(1) and the output side first supply/discharge line 362(1) is released, so that the input side first clutch mechanism 60(1) and the output side first clutch mechanism 80(1) are brought into the disengagement state, the input side second supply/discharge line 360(2) and the output side second supply/discharge line 362(2) are maintained at the engagement hydraulic pressure set by the pilot pressure of the corresponding electromagnetic valves 365(2) and 367(2), so that the input side second clutch mechanism 60(2) and the output side second clutch mechanism 80(2) are brought into the engagement state.

Thus, the transmission structure 3 is brought into the second transmission state.

Herein, when recognizing that the speed change operation member 90 is operated to the switching speed position at time Ta (see FIG. 8), (i.e., when recognizing that the rotational speed of the speed change output shaft 45 reaches the switching speed from the state where the rotational speed is less than the switching speed based on a signal from the output sensor 95b), the control device 100 moves the input side second electromagnetic valve 365(2) and the output side second electromagnetic valve 367(2) located at the discharge positions at the time before the switching to the supply positions from the discharge positions while maintaining the input side first electromagnetic valve 365(1) and the output side first electromagnetic valve 367(1) located at the supply positions at the time before the switching of the transmission state (at the time of the first transmission state in this example) at the supply positions.

Thus, while the input side first supply/discharge line 360(1) and the output side first supply/discharge line 362(1) are maintained at the engagement hydraulic pressure, the hydraulic pressure of the input side second supply/discharge line 360(2) and the output side second supply/discharge line 362(2) increase to the engagement hydraulic pressure at time Tb, so that the double transmission state is developed.

Thereafter, the control device 100 moves the input side first electromagnetic valve 365(1) and the output side first electromagnetic valve 367(1) located at the supply positions at the time before the switching from the supply positions to the discharge positions when predetermined time (time Tc) has passed from the time (time Tb) when recognizing that the hydraulic pressure of the input side second supply/discharge line 360(2) and the output side second supply/discharge line 362(2) to which pressure oil is supplied through the input side second electromagnetic valve 365(2) and the output side second electromagnetic valve 367(2) moved to the supply positions reaches the engagement hydraulic pressure based on the signals from the corresponding pressure sensors 370(2) and 372(2).

Thus, the second transmission state where, while the input side second clutch mechanism 60(2) and the output side second clutch mechanism 80(2) are brought into the engagement state, the input side first clutch mechanism 60(1) and the output side first clutch mechanism 80(1) are brought into the disengagement state is developed.

The transmission structure 3 according to this embodiment having such a configuration can effectively prevent the occurrence of a state where traveling driving force is not transmitted to the driving wheels 220 in the switching between the first and second transmission states.

This is particularly effective when the switching between the first and second transmission states occurs in the work traveling.

This embodiment is configured so that the engagement states of the corresponding friction plate clutch mechanisms are detected based on the pressure sensors 370(1), 370(2), 372(1) and 372(2). However, in place of the configuration, this embodiment can be configured so that the engagement states of the corresponding friction plate clutch mechanisms are detected based on other clutch engagement detection units detecting a supply current value, supply current time, and the like of the proportional electromagnetic valves 365(1), 365(2), 367(1) and 367(2).

Embodiment 4

Hereinafter, yet still another embodiment of the transmission structure according to the present invention is described with reference to the accompanying drawings.

Figure 9:
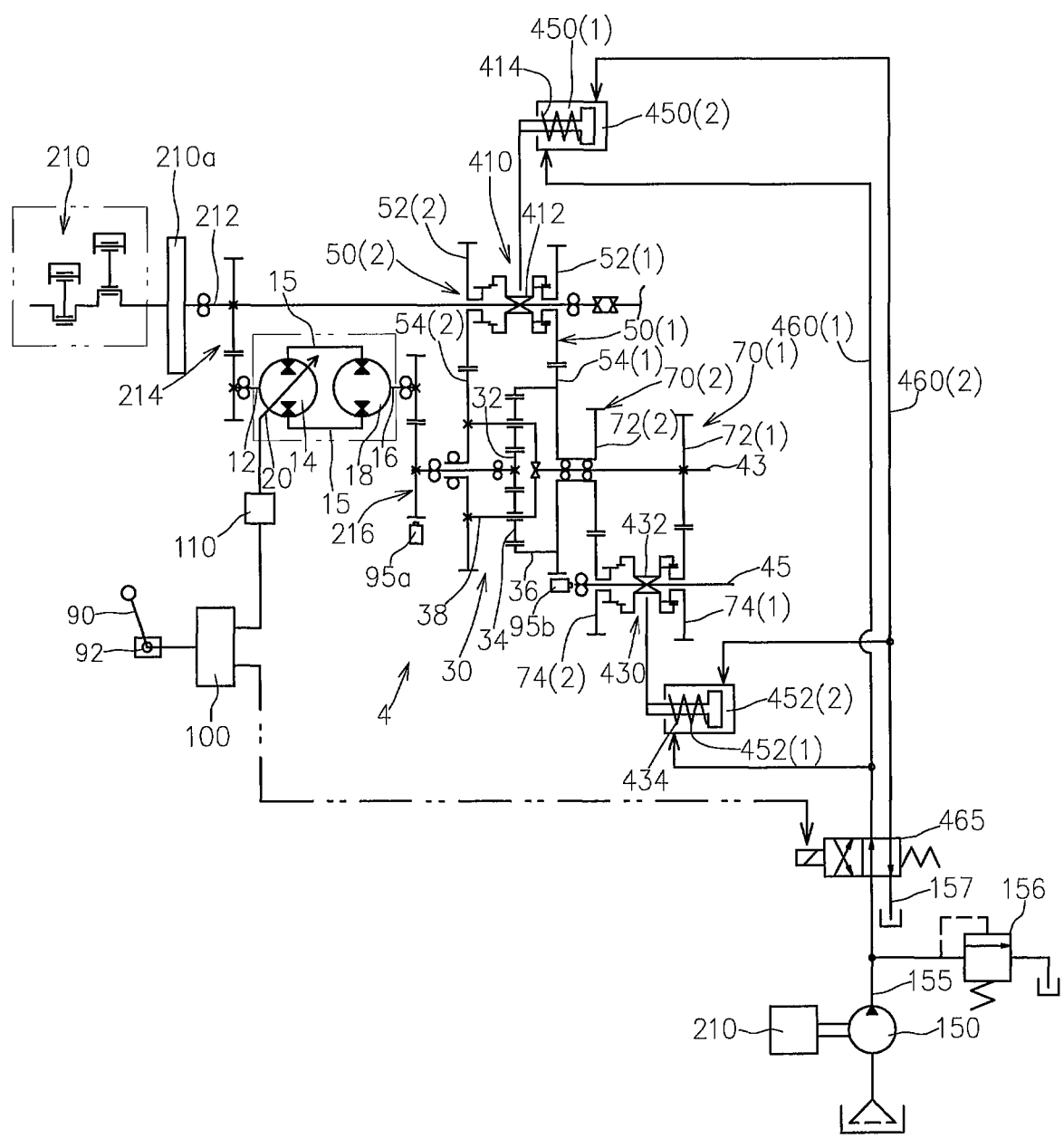
FIG. 9 is a hydraulic circuit diagram of a transmission structure according to an embodiment 4 of the present invention.

FIG. 9 illustrates a hydraulic circuit diagram of a transmission structure 4 according to this embodiment.

In the figure, the same components as those in Embodiments 1 to 3 described above are designated by the same reference numerals and a description thereof is omitted as appropriate.

The transmission structure 4 according to this embodiment has an input side clutch unit 410 and an output side clutch unit 430 of a dog clutch type in place of the input side first and second clutch mechanisms 60(1) and 60(2) and the output side first and second clutch mechanisms 80(1) and 80(2) of the friction plate type as compared with the transmission structure 1 according to Embodiment 1.

Figure 10:
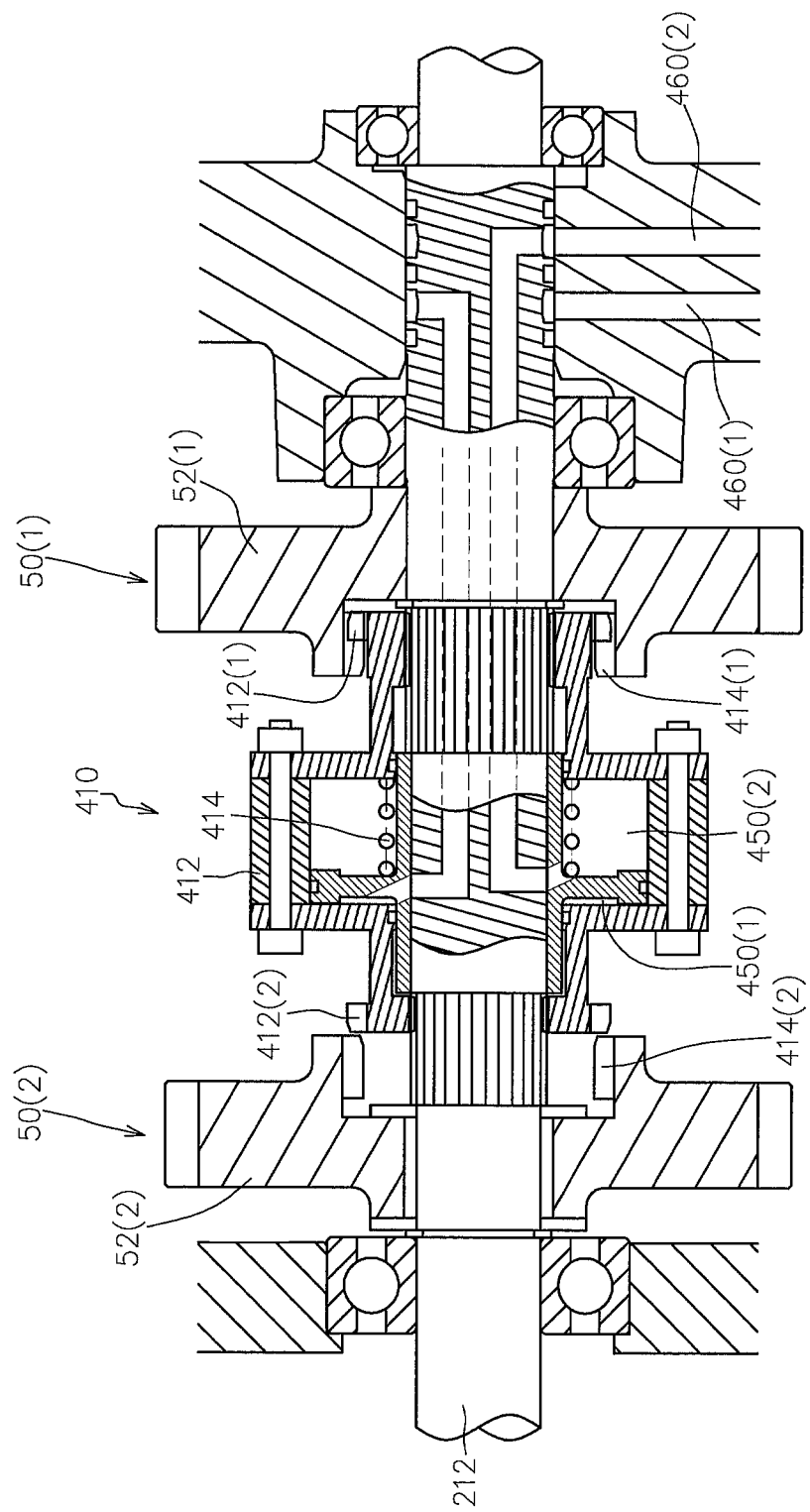
FIG. 10 is a partial cross sectional view of a vicinity of an input side clutch unit of the transmission structure according to the embodiment 4, and shows a state in which an input side slider is positioned at a first position so that an input side first clutch mechanism is engaged and an input side second clutch mechanism is disengaged.

FIG. 10 illustrates a partial cross sectional view of the input side clutch unit 410.

As illustrated in FIG. 10, the input side clutch unit 410 has an input side slider 412 supported by a corresponding main driving shaft 212 so as not to be relatively rotatable and so as to be movable in the axial direction.

The input side slider 412 is disposed between the input side first and second driving gears 52(1) and 52(2) and has a first recess-projection engagement portion 412(2) on one side in the axial direction close to the input side first driving gear 52(1) and a second recess-projection engagement portion 412(1) on the other side in the axial direction close to the input side second driving gear 52(2).

The input side clutch unit 410 further has recess-projection engagement portions 414(1) and 414(2) formed in the input side first and second driving gears 52(1) and 52(2), respectively.

More specifically, when the input side slider 412 is located at a first position on the one side in the axial direction illustrated in FIG. 10, while the second recess-projection engagement portion 412(2) is not engaged with the recess-projection engagement portion 414(2) of the input side second driving gear 52(2), the first recess-projection engagement portion 412(1) is engaged with the recess-projection engagement portion 414(1) of the input side first driving gear 52(1), whereby the input side first driving gear 52(1) is coupled with the main driving shaft 212, so that the input side slider 412 brings only an input side first clutch mechanism formed by the first recess-projection engagement portion 412(1) and the recess-projection engagement portion 414(1) into the engagement state.

When the input side slider 412 is located at a second position on the other side in the axial direction, while the first recess-projection engagement portion 412(1) is not engaged with the recess-projection engagement portion 414(1) of the input side first driving gear 52(1), the second recess-projection engagement portion 412(2) is engaged with the recess-projection engagement portion 414(2) of the input side second driving gear 52(2), whereby the input side second driving gear 52(2) is coupled with the main driving shaft 212, so that the input side slider 412 brings only the input side second clutch mechanism formed by the second recess-projection engagement portion 412(2) and the recess-projection engagement portion 414(2) into the engagement state.

Figure 11:
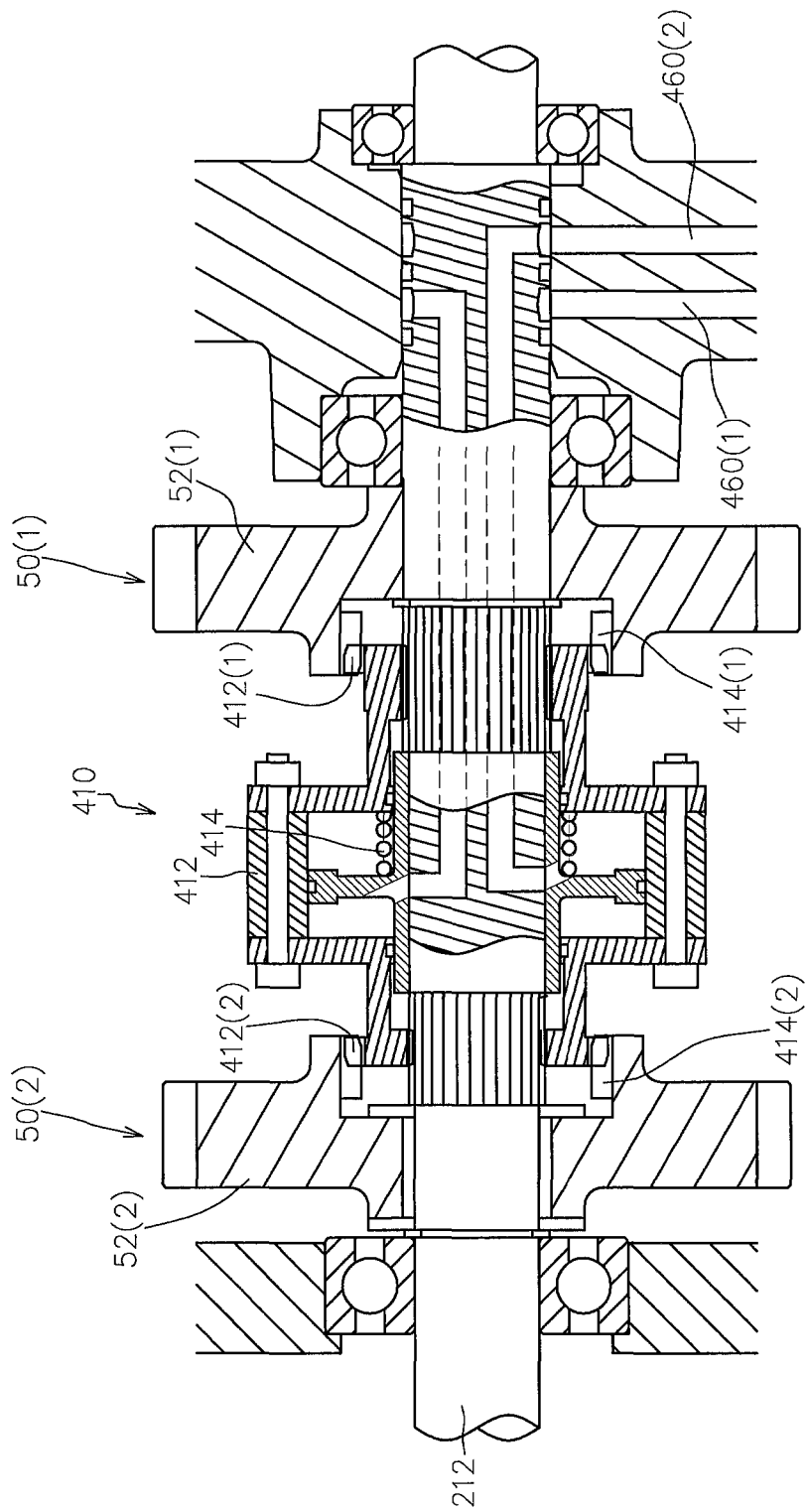
FIG. 11 is a partial cross sectional view of the vicinity of the input side clutch unit shown in FIG. 10, and shows a state in which the input side slider is positioned at an intermediate position so that both the input side first and second clutch mechanism are engaged.

As illustrated in FIG. 11, when the input side slider 412 is located at an intermediate position between the first and second positions with respect to the axial direction, the first and second recess-projection engagement portions 412(1) and 412(2) are engaged with the recess-projection engagement portions 414(1) and 414(2) of the input side first and second driving gears 52(1) and 52(2), respectively, whereby the input side slider 412 brings both the input side first and second driving gears 52(1) and 52(2) are coupled with the main driving shaft 212, so that both the input side first and second clutch mechanisms into the engagement state.

More specifically, when the input side slider 412 moves between the first position where the first transmission state is developed and the second position where the second transmission state is developed, the input side slider 412 certainly passes the intermediate position where both the input side first and second clutch mechanisms are brought into the engagement state.

The transmission structure 4 according to this embodiment having such a configuration can also effectively prevent the generation of the state where the traveling driving force is not transmitted to the driving wheels in the switching between the first and second transmission states.

The output side clutch unit 430 has substantially the same configuration as that of the input side clutch unit 410.

More specifically, the output side clutch unit 430 has a recess-projection engagement portion (not illustrated) formed in each of the output side first and second driven gears 74(1) and 74(2) and an output side slider 432 supported by the corresponding speed change output shaft 45 so as not to be relatively rotatable and so as to be movable in the axial direction between the output side first and second driven gears 74(1) and 74(2) with respect to the axial direction.

The output side slider 432 has a first recess-projection engagement portion (not illustrated) on one side in the axial direction close to the output side first driven gear 74(1) and a second recess-projection engagement portion (not illustrated) on the other side in the axial direction close to the output side second driven gear 74(2).

When the output side slider 432 is located at the first position on the one side in the axial direction, while the second recess-projection engagement portion is not engaged with a recess-projection engagement portion of the output side second driven gear 74(2), the first recess-projection engagement portion is engaged with a recess-projection engagement portion of the output side first driven gear 74(1), whereby the output side first driven gear 74(1) is coupled with the speed change output shaft 45, so that the output side slider 432 brings only an output side first clutch mechanism formed by the first recess-projection engagement portion and the recess-projection engagement portion of the output side first driven gear 74(1) into the engagement state.

When the output side slider 432 is located at the second position on the other side in the axial direction, while the first recess-projection engagement portion is not engaged with the recess-projection engagement portion of the output side first driven gear 74(1), the second recess-projection engagement portion is engaged with the recess-projection engagement portion of the output side second driven gear 74(2), whereby the output side second driven gear 74(2) is coupled with the speed change output shaft 45, so that the output side slider 432 brings only an output side second clutch mechanism formed by the second recess-projection engagement portion and the recess-projection engagement portion of the output side second driven gear 74(2) into the engagement state.

Furthermore, when the output side slider 432 is located at an intermediate position between the first and second positions with respect to the axial direction, the first and second recess-projection engagement portions are engaged with the recess-projection engagement portions of the output side first and second driven gears 74(1) and 74(2), respectively, whereby both the output side first and second driven gears 74(1) and 74(2) are coupled with the speed change output shaft 45, so that the input side slider 432 brings both the output side first and second clutch mechanisms into the engagement state.

The transmission structure 4 according to this embodiment has a hydraulic driving mechanism as a pressing mechanism for the input side slider 412 and the output side slider 432.

The hydraulic driving mechanism is provided with the pressure oil supply line 155, the drain line 157, an input side first oil chamber 450(1) pressing the input side slider 412 toward the first position by pressure oil to be supplied, an input side second oil chamber 450(2) pressing the input side slider 412 toward the second position by pressure oil to be supplied, an output side first oil chamber 452(1) pressing the output side slider 432 toward the first position by pressure oil to be supplied, an output side second oil chamber 452(2) pressing the output side slider 432 toward the second position by pressure oil to be supplied, a first supply/discharge line 460(1) supplying/discharging pressure oil to the input side first oil chamber 450(1) and the output side first oil chamber 452(1), a second supply/discharge line 460(2) supplying/discharging pressure oil to the input side second oil chamber 450(2) and the output side second oil chamber 452(2), and an electromagnetic valve 465, the position of which is control by the control device 100.

In the figure, the reference numeral 414 designates a biasing member pressing the input side slider 412 toward one side in the axial direction (first position in the example illustrated in the figure) and the reference numeral 434 designates a biasing member pressing the output side slider 432 toward one side in the axial direction (first position in the example illustrated in the figure).

The electromagnetic valve 465 is configured to be able to take a first position where the pressure oil supply/discharge line 155 is fluid-connected to the first supply/discharge line 460(1) and the second supply/discharge line 460(2) is fluid-connected to the drain line 157 and a second position where the first supply/discharge line 460(1) is fluid-connected to the drain line 157 and the pressure oil supply/discharge line 155 is fluid-connected to the second supply/discharge line 460(2).

Figure 12:
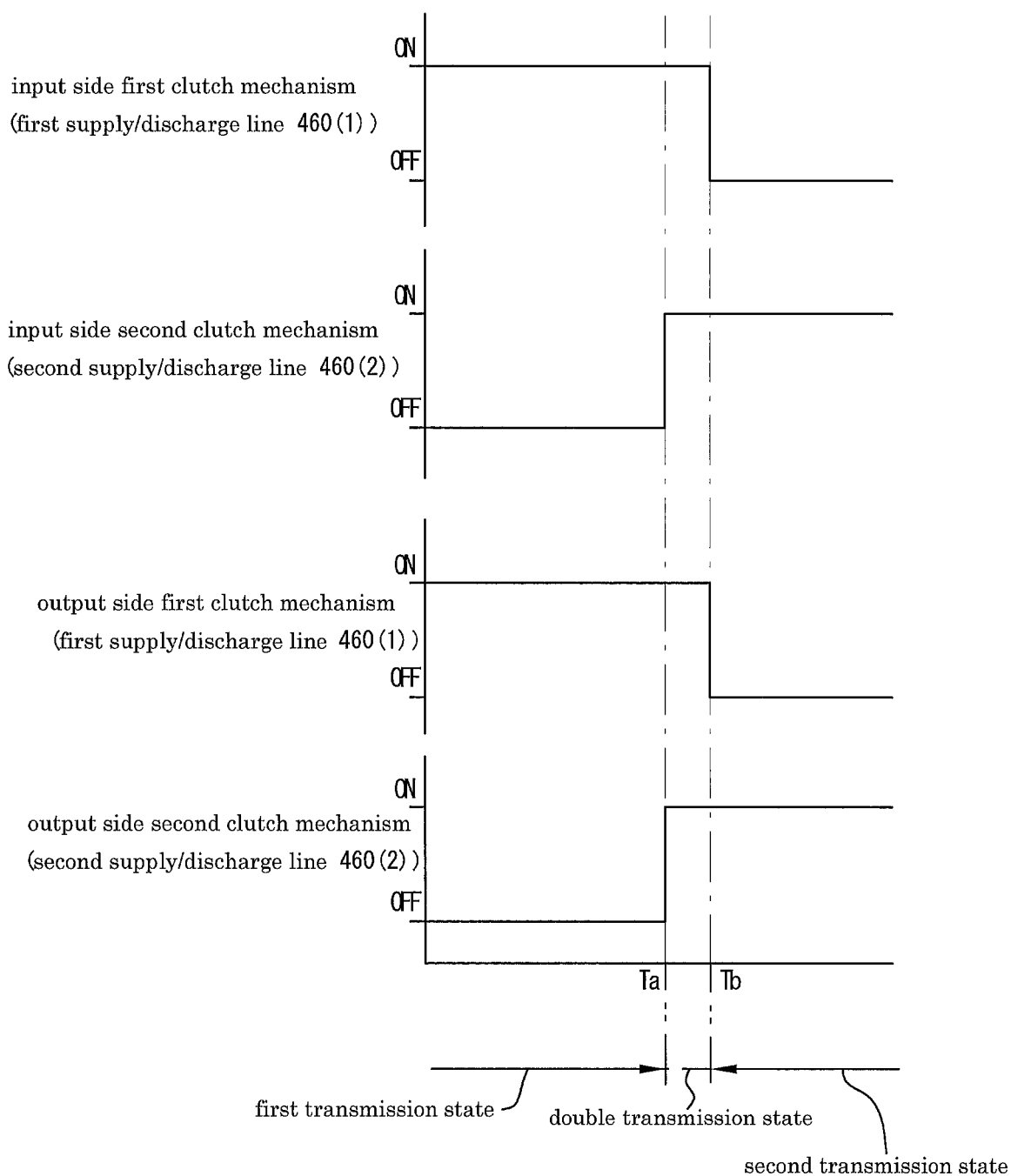
FIG. 12 is hydraulic pressure wave form charts in which the transmission structure according to the embodiment 4 is switched from a first transmission state to a second transmission states.

FIG. 12 illustrates hydraulic pressure wave form charts of the first and second supply/discharge lines 460(1) and 460(2) in the switching from the first transmission state to the second transmission state.

The control device 100 locates the electromagnetic valve 465 at the first position in a state where the speed change operation member 90 is located between the zero speed position and the switching speed position (i.e., in a low speed state where the rotational speed of the speed change output shaft 45 is less than the switching speed).

In this state, the hydraulic pressure of the second supply/discharge line 460(2) is released and pressure oil is supplied to the first supply/discharge line 460(1), and thereby the input side slider 412 and the output side slider 432 are located at the first position.

Thus, while the input side second clutch mechanism and the output side second clutch mechanism are brought into the disengagement state, the input side first clutch mechanism and the output side first clutch mechanism are brought into the engagement state, so that the transmission structure 4 is brought into the first transmission state.

In a state where the speed change operation member 90 exceeds the switching speed position (in the high speed state where the rotational speed of the speed change output shaft 45 is equal to or higher than the switching speed), the control device 100 locates the electromagnetic valve 465 at the second position.

In this state, the hydraulic of the first supply/discharge line 460(1) is released and pressure oil is supplied to the second supply/discharge line 460(2), and thereby the input side slider 412 and the output side slider 432 are located at the second position.

Thus, while the input side first clutch mechanism and the output side first clutch mechanism are brought into the disengagement state, the input side second clutch mechanism and the output side second clutch mechanism are brought into the engagement state, so that the transmission structure is brought into the second transmission state.

Herein, when recognizing that the speed change operation member 90 is operated from the zero speed position side to the switching speed position at time Ta (see FIG. 12) (i.e., when recognizing that the rotational speed of the speed change output shaft 45 reaches the switching speed from the state where the rotational speed is less than the switching speed based on a signal from the output sensor 95b), the control device 100 moves the electromagnetic valve 465 from the first position to the second position.

Thus, the input side slider 412 and the output side slider 432 are moved toward the second position from the first position where the input side slider 412 and the output side slider 432 are located at the time Ta, and then reach the second position at the time Tb. Then, the double transmission state is developed at the intermediate position in the middle of the movement.

Although both the input side clutch unit and the output side clutch unit are configured as the friction plate type in Embodiment 3 described above and both the input side clutch unit and the output side clutch unit are configured as the dog clutch type in Embodiment 4, the present invention is not limited to such configurations.

More specifically, one of the input side clutch unit and the output side clutch unit can be configured as the friction plate type and the other side can be configured as the dog clutch type.

Figure 13:
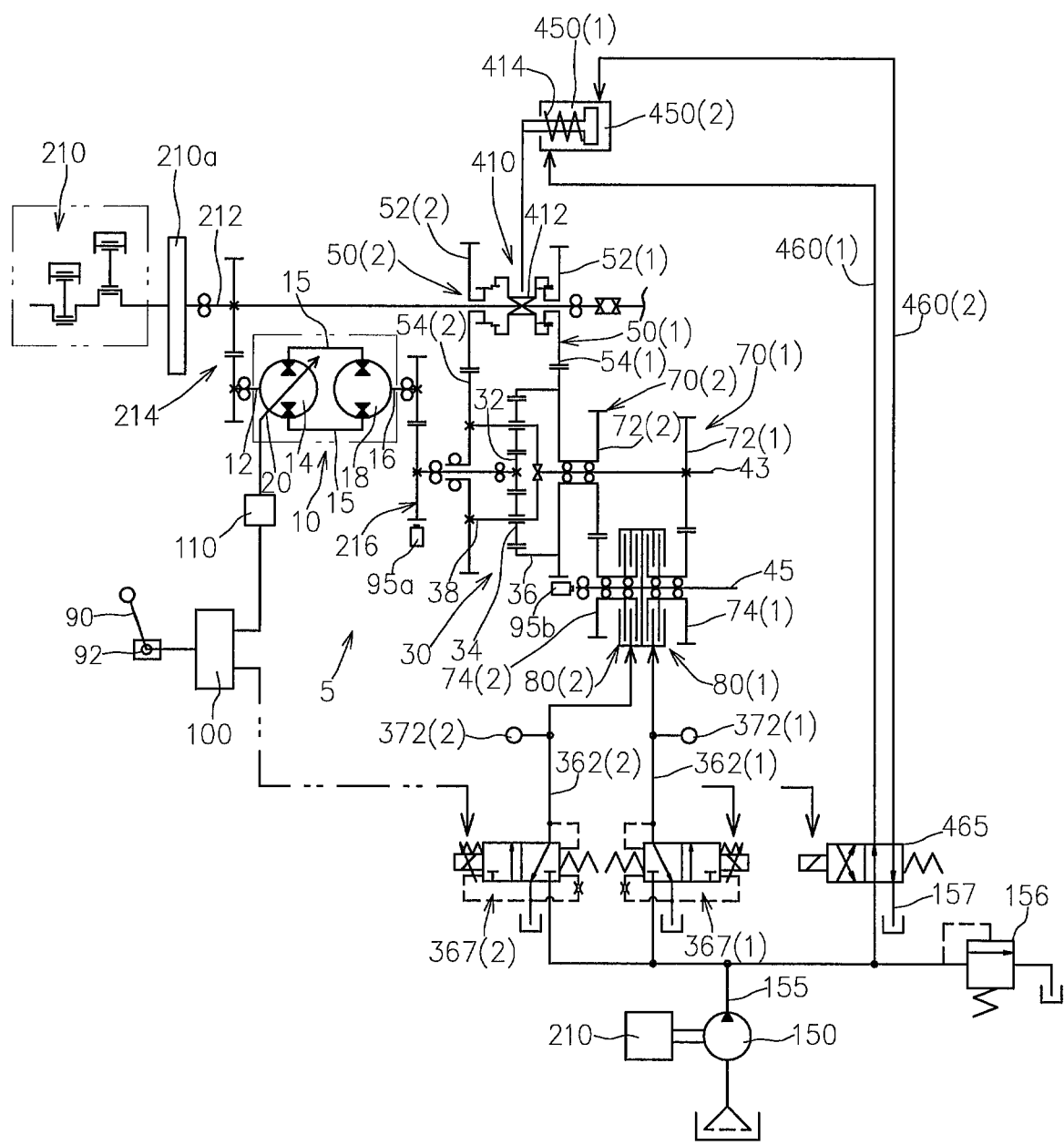
FIG. 13 is a hydraulic circuit diagram of a transmission structure according to a modification of the embodiments 3 or 4.

FIG. 13 illustrates a hydraulic circuit diagram of a transmission structure 5 according to a modification in which the input side clutch unit is configured as the dog clutch type and the output side clutch unit is configured as the friction plate type.

Figure 14:
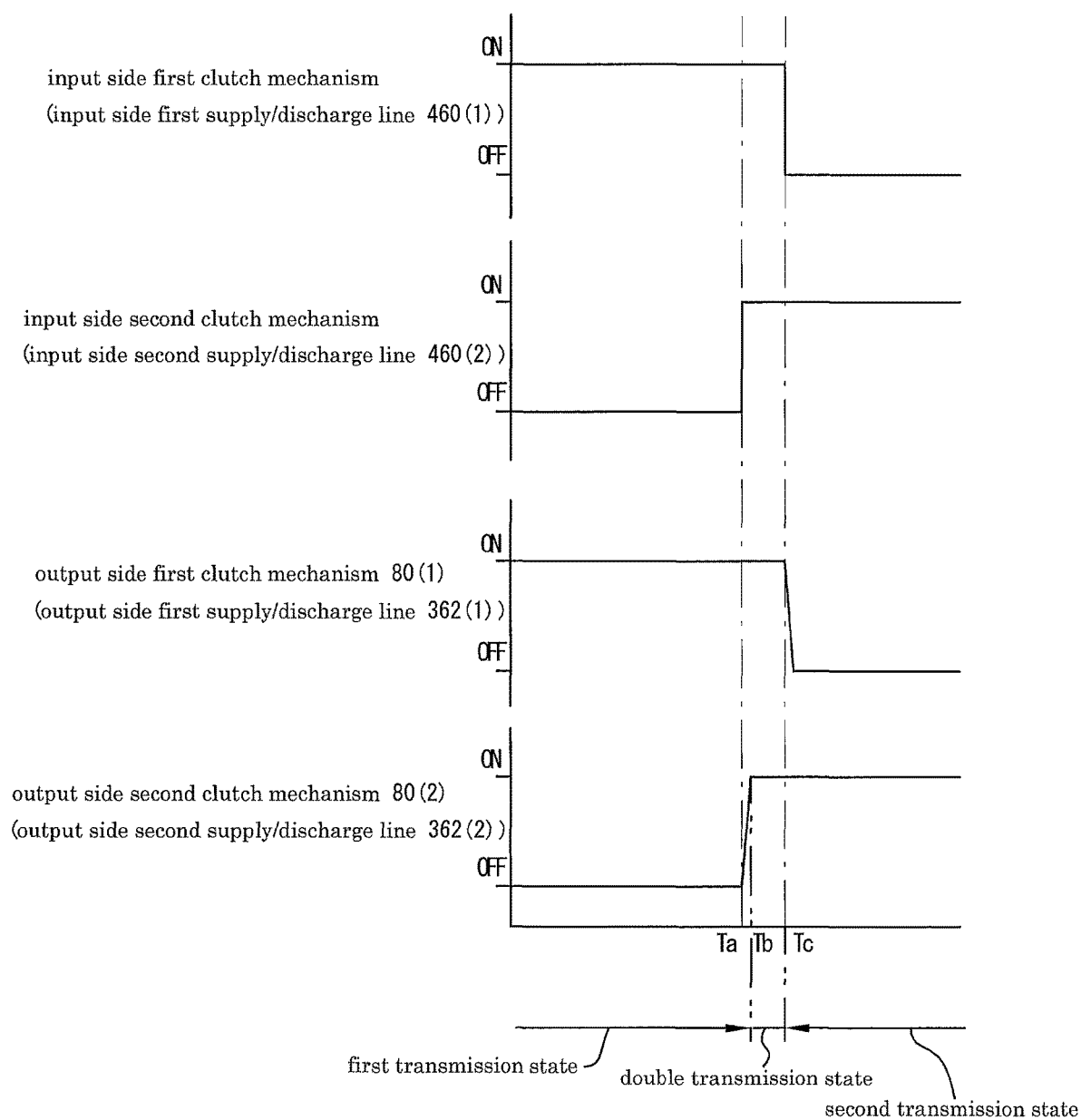
FIG. 14 is hydraulic pressure waveform charts in which the transmission structure according to the modification is switched from a first transmission state to a second transmission state.

FIG. 14 illustrate a hydraulic pressure waveform charts in the transmission structure 5 in the switching from the first transmission state to the second transmission state.

It is a matter of course that the configuration relating to the double transmission structure in Embodiment 3 and 4 described above is also applicable to Embodiment 2 described above.

Embodiment 5

Hereinafter, further yet still another embodiment of the transmission structure according to the present invention is described with reference to the accompanying drawings.

The transmission structure according to this embodiment is different from the transmission structure 3 according to Embodiment 3 described above only in the point that the position control timing of the electromagnetic valves 365(1), 365(2), 367(1) and 367(2) by the control device 100 in the switching between the first and second transmission states is changed.

Figure 15:
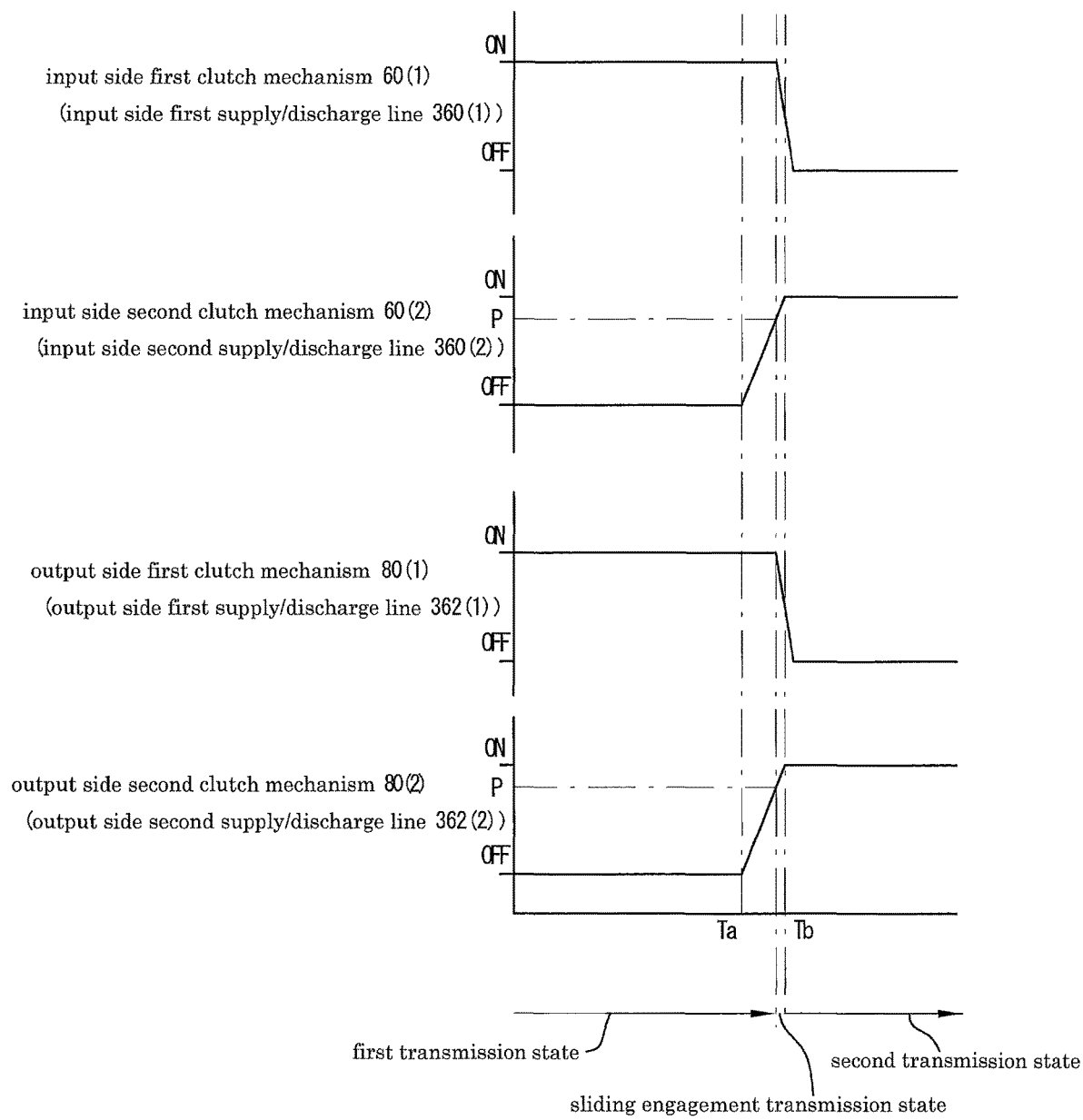
FIG. 15 is hydraulic pressure waveform charts in which a transmission structure according to an embodiment 5 of the present invention is switched from a first transmission state to a second transmission state.

FIG. 15 illustrates hydraulic pressure waveform charts of the supply/discharge lines 360(1), 360(2), 362(1) and 362(2) in the switching from the first transmission state to the second transmission state.

In the state where the speed change operation member 90 is located before the switching speed position (i.e., in a low speed state where the rotational speed of the speed change output shaft 45 is less than the switching speed), the control device 100 performs the same position control as that of Embodiment 3 described above to the electromagnetic valves 365(1), 365(2), 367(1) and 367(2).

More specifically, the control device 100 locates the input side first electromagnetic valve 365(1) and the output side first electromagnetic valve 367(1) at the supply position and locates the input side second electromagnetic valve 365(2) and the output side second electromagnetic valve 367(2) at the discharge positions.

In this state, while the hydraulic pressure of the input side second supply/discharge line 360(2) and the output side second supply/discharge line 362(2) is released, so that the input side second clutch mechanism 60(2) and the output side second clutch mechanism 80(2) are brought into the disengagement state, the input side first supply/discharge line 360(1) and the output side first supply/discharge line 362(1) are maintained at the engagement hydraulic pressure set by the pilot pressure of the corresponding electromagnetic valves 365(1) and 367(1), so that the input side first clutch mechanism 60(1) and the output side first clutch mechanism 80(1) are brought into the engagement state as illustrated in FIG. 15.

Thus, the transmission structure is brought into the first transmission state.

Also in a state where the speed change operation member 90 exceeds the switching speed position (i.e., also in the high speed state where the rotational speed of the speed change output shaft 45 is equal to or higher than the switching speed), the control device 100 performs the same position control as that of Embodiment 3 described above to the electromagnetic valves 365(1), 365(2), 367(1) and 367(2).

More specifically, the control device 100 locates the input side first electromagnetic valve 365(1) and the output side first electromagnetic valve 367(1) at the discharge positions and locates the input side second electromagnetic valve 365(2) and the output side second electromagnetic valve 367(2) at the supply positions.

In this state, while the hydraulic pressure of the input side first supply/discharge line 360(1) and the output side first supply/discharge line 362(1) is released, so that the input side first clutch mechanism 60(1) and the output side first clutch mechanism 80(1) are brought into the disengagement state, the input side second supply/discharge line 360(2) and the output side second supply/discharge line 362(2) are maintained at the engagement hydraulic pressure set by the pilot pressure of the corresponding electromagnetic valves 365(2) and 367(2), so that the input side second clutch mechanism 60(2) and the output side second clutch mechanism 80(2) are brought into the engagement state as illustrated in FIG. 15.

Thus, the transmission structure 3 is brought into the second transmission state.

Meanwhile, in the switching between the first and second transmission states, the control device 100 performs position control different from that of Embodiment 3 described above to the electromagnetic valves 365(1), 365(2), 367(1) and 367(2).

More specifically, when recognizing that the speed change operation member 90 is operated from the zero speed position side to the switching speed position at time Ta in FIG. 15. (i.e., when recognizing that the rotational speed of the speed change output shaft 45 reaches the switching speed from a state where the rotational speed is less than the switching speed based on a signal from the output sensor 95b), the control device 100 moves the input side second electromagnetic valve 365(2) and the output side second electromagnetic valve 367(2) located at the discharge positions at the time before the switching to the supply positions from the discharge positions while maintaining the input side first electromagnetic valve 365(1) and the output side first electromagnetic valve 367(1) located at the supply positions at the time before switching the transmission state (at the time of the first transmission state in this example) at the supply positions.

Thus, while the input side first supply/discharge line 360(1) and the output side first supply/discharge line 362(1) are maintained at the engagement hydraulic pressure, the hydraulic pressure of the input side second supply/discharge line 360(2) and the output side second supply/discharge line 362(2) gradually increase to reach the engagement hydraulic pressure at time Tb.

Herein, when recognizing that the hydraulic pressure of the input side second supply/discharge line 360(2) and the output side second supply/discharge line 362(2) to which pressure oil is supplied through the input side second electromagnetic valve 365(2) and the output side second electromagnetic valve 367(2), the positions of which are moved to the supply positions from the discharge positions, reaches switching hydraulic pressure P less than the engagement hydraulic pressure based on signals from the corresponding pressure sensors 370(2) and 372(2), the control device 100 moves the input side first electromagnetic valve 365(1) and the output side first electromagnetic valve 367(1) located at the supply positions at the time before the switching from the supply positions to the discharge positions.

The switching hydraulic pressure P is a hydraulic pressure at which the friction plate group of the corresponding clutch mechanism is brought into a sliding engagement state of performing power transmission while sliding.

The transmission structure according to this embodiment having such a configuration can prevent or reduce the generation of the state where the traveling driving force is not transmitted to the driving wheels 220 in the switching between the first and second transmission states as much as possible and further can effectively prevent or reduce a switching shock which may occur in the switching between the first and second transmission states.

More specifically, the input side first and second speed change ratios are set so that the rotational speed of the second element when the HST output is set to the second HST speed in the first transmission state and the rotational speed of the second element by the rotation power transmitted through the input side second transmission mechanism 50(2) in the second transmission state are the same and so that the rotational speed of the first element when the HST output is set to the second HST speed in the second transmission state and the rotational speed of the first element by the rotation power transmitted through the input side first transmission mechanism 50(1) in the first transmission state are the same.

Therefore, a rotational speed difference theoretically does not occur in the first element and/or the second element in the switching between the first and second transmission states.

However, a rotational speed difference may occur in the first element and/or the second element in the switching between the first and second transmission states due to a manufacturing error and the like.

With respect to this point, in this embodiment, even if a rotational speed difference occurs in the first element and/or the second element in the switching between the first and second transmission states, immediately before one of the clutch mechanisms (the input side second clutch mechanism 60(2) in the example of FIG. 15), to which pressure oil is supplied through the electromagnetic valve (the input side second electromagnetic valve 365(2) in the example of FIG. 15), the position of which is moved from the disengagement position to the supply position in the switching between the first and second transmission states, is brought into a perfect engagement state by way of processes in which the friction plate group of the clutch mechanism is gradually friction-engaged while sliding, and then the hydraulic pressure of the one clutch mechanism reaches the engagement hydraulic pressure, the hydraulic pressure of the other one of the clutch mechanisms (the input side first clutch mechanism 60(1) in the example of FIG. 15) brought into the engagement state before the switching between the first and second transmission states is released from the engagement hydraulic pressure.

Therefore, the generation of the state where the traveling driving force is not transmitted to the driving wheels 220 in the switching between the first and second transmission states can be prevented or reduced as much as possible and a damage on a transmission system due to the switching shock or the double transmission state which may occur in the switching between the first and second transmission states can be effectively prevented or reduced.

Moreover, the output side first and second speed change ratios are set so that the rotational speed developed in the speed change output shaft 45 when the HST output is set to the second HST speed is same in the first and second transmission states.

Therefore, a rotational speed difference theoretically does not occur in the speed change output shaft 45 in the switching between the first and second transmission states.

However, a rotational speed difference occurs in the speed change output shaft 45 in the switching between the first and second transmission states due to a manufacturing error and the like in some cases.

With respect to this point, in this embodiment, even if a rotational speed difference occurs in the speed change output shaft 45 in the switching between the first and second transmission states, immediately before one of the clutch mechanisms (the output side second clutch mechanism 80(2) in the example of FIG. 15), to which pressure oil is supplied through the electromagnetic valve (the output side second electromagnetic valve 367(2) in the example of FIG. 15), the position of which is moved from the disengagement position to the supply position in the switching between the first and second transmission states, is brought into a perfect engagement state by way of processes in which the friction plate group of the clutch mechanism is gradually friction-engaged while sliding, and then the hydraulic pressure of the one clutch mechanism reaches the engagement hydraulic pressure, the hydraulic pressure of the other one of the clutch mechanisms (the output side first clutch mechanism 80(1) in the example of FIG. 15) brought into the engagement state before the switching between the first and second transmission states is released from the engagement hydraulic pressure.

Therefore, the generation of the state where the traveling driving force is not transmitted to the driving wheels 220 in the switching between the first and second transmission states can be prevented or reduced as much as possible and a damage on the transmission system due to the switching shock or the double transmission state which may occur in the switching between the first and second transmission states can be effectively prevented or reduced.

The configuration in which, immediately before one of the clutch mechanisms is brought into a perfect engagement state from a disengagement state by way of processes in which the electromagnetic valves (the input side second electromagnetic valve 365(2) and the output side second electromagnetic valve 367(2) in the example of FIG. 15) located at the discharge positions at the time before the switching are moved from the discharge positions to the supply positions while maintaining the electromagnetic valves (the input side first electromagnetic valve 365(1) and the output side first electromagnetic valve 367(1) in the example of FIG. 15) located at the supply positions at the time before the switching at the supply positions in the switching between the first and second transmission states, and then the hydraulic pressure of the supply/discharge lines (the input side second supply/discharge line 360(2) and the output side second supply/discharge line 362(2) in the example of FIG. 15) to which pressure oil is supplied through the electromagnetic valves, the positions of which are moved from the discharge positions to the supply positions, reaches the engagement hydraulic pressure, the electromagnetic valves (the input side first electromagnetic valve 365(1) and the output side first electromagnetic valve 367(1) in the example of FIG. 15) located at the supply positions at the time before the switching are moved from the supply positions to the discharge positions can be applied to only one of the input side clutch unit formed by the input side first and second clutch mechanisms 60(1) and 60(2) and the output side clutch unit formed by the output side first and second clutch mechanisms 80(1) and 80(2) in which a rotational speed difference may occur due to a manufacturing error and the like and the dog clutch type illustrated in FIG. 10 described above can be adopted to the other clutch unit when the other clutch unit is free from the possibility or has less possibility, whereby a cost reduction can be achieved.

Embodiment 6

Hereinafter, further yet still another embodiment of the transmission structure according to the present invention is described with reference to the accompanying drawings.

Figure 16:
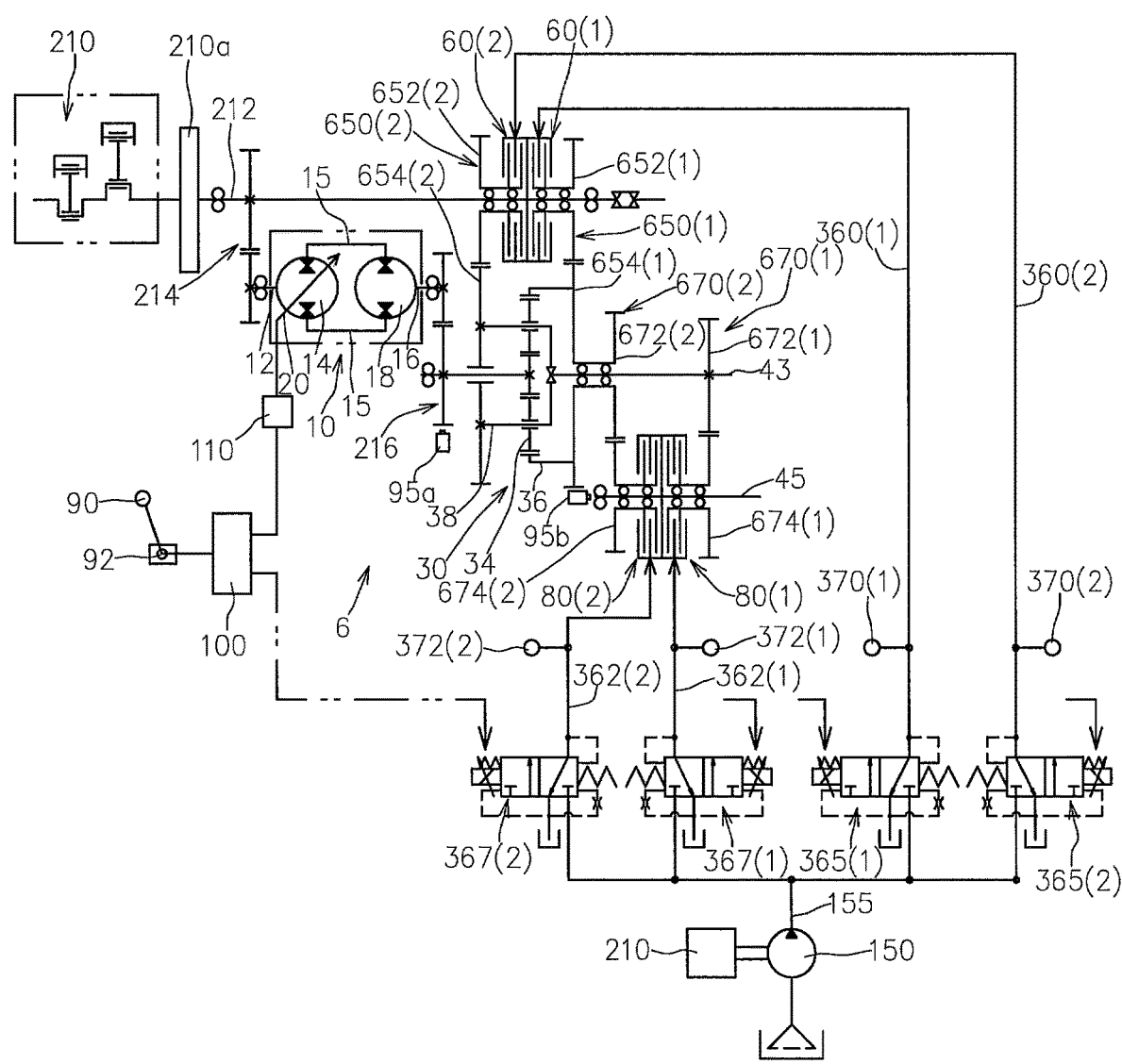
FIG. 16 is a hydraulic circuit diagram of a transmission structure according to an embodiment 6 of the present invention.

FIG. 16 illustrates a hydraulic circuit diagram of a transmission structure 6 according to this embodiment.

In the figure, the same components as those in Embodiments described above are designated by the same reference numerals and a description thereof is omitted as appropriate.

In the transmission structure 1 according to Embodiment 1, the input side first speed change ratio of the input side first transmission mechanism 50(1) and the input side second speed change ratio of the input side second transmission mechanism 50(2) are set so that the rotational speed of the second element when the HST output is set to the second HST speed in the first transmission state and the rotational speed of the second element by the rotation power transmitted through the input side second transmission mechanism 50(2) in the second transmission state are the same and so that the rotational speed of the first element when the HST output is set to the second HST speed in the second transmission state and the rotational speed of the first element by the rotation power transmitted through the input side first transmission mechanism 50(1) in the first transmission state are the same, and further the output side first speed change ratio of the output side first transmission mechanism 70(1) and the output side second speed change ratio of the output side second transmission mechanism 70(2) are set so that the rotational speed developed in the speed change output shaft 45 when the HST output is set to the second HST speed is same in the first and second transmission states.

According to the transmission structure 1 according to Embodiment 1 described above, a rotational speed difference theoretically does not occur in the first element and/or the second element and the speed change output shaft 45 in the switching between the first and second transmission states.

However, the input side first and second speed change ratios cannot be set to the ideal set values described above due to the number of gear teeth configuring the input side first and second transmission mechanisms 50(1) and 50(2) in some cases.

In such a case, a rotational speed difference occurs in the first element and/or a rotational speed difference occurs in the second element in the switching between the first and second transmission states.

Similarly, the output side first and second speed change ratios cannot be set to the ideal set values described above due to the number of gear teeth configuring the output side first and second transmission mechanisms 70(1) and 70(2) in some cases.

In such a case, a rotational speed difference occurs in the speed change output shaft 45 in the switching between the first and second transmission states.

In view of this point, the transmission structure 6 according to this embodiment is configured so that, when a rotational speed difference occurs in the first element and/or the second element and the speed change output shaft 45 in the switching between the first and second transmission states, a damage on the transmission system due to the switching shock or the double transmission state resulting from the rotational speed difference can be prevented or reduced as much as possible.

Specifically, as illustrated in FIG. 16, the transmission structure 6 according to this embodiment has input side first and second transmission mechanisms 650(1) and 650(2) in place of the input side first and second transmission mechanisms 50(1) and 50(2) and output side first and second transmission mechanisms 670(1) and 670(2) in place of the output side first and second transmission mechanisms 70(1) and 70(2) as compared with the transmission structure 1 according to Embodiment 1 described above.

As illustrated in FIG. 16, the input side first transmission mechanism 650(1) has an input side first driving gear 652(1) relatively rotatably coupled with the main driving shaft 212 and an input side first driven gear 654(1) meshed with the input side first driving gear 652(1) and coupled with the first element.

The input side second transmission mechanism 650(2) has an input side second driving gear 652(2) relatively rotatably supported by the main driving shaft 212 and an input side second driven gear 654(2) meshed with the input side second driving gear 652(2) and coupled with the second element.

The output side first transmission mechanism 670(1) has an output side first driving gear 672(1) supported by the speed change intermediate shaft 43 so as not to be relatively rotatable and an output side first driven gear 674(1) meshed with the output side first driving gear 672(1) and relatively rotatably supported by the speed change output shaft 45.

The output side second transmission mechanism 670(2) has an output side second driving gear 672(2) coupled with the first element and an output side second driven gear 674(2) meshed with the output side second driving gear 672(2) and relatively rotatably supported by the speed change output shaft 45.

Figure 17:
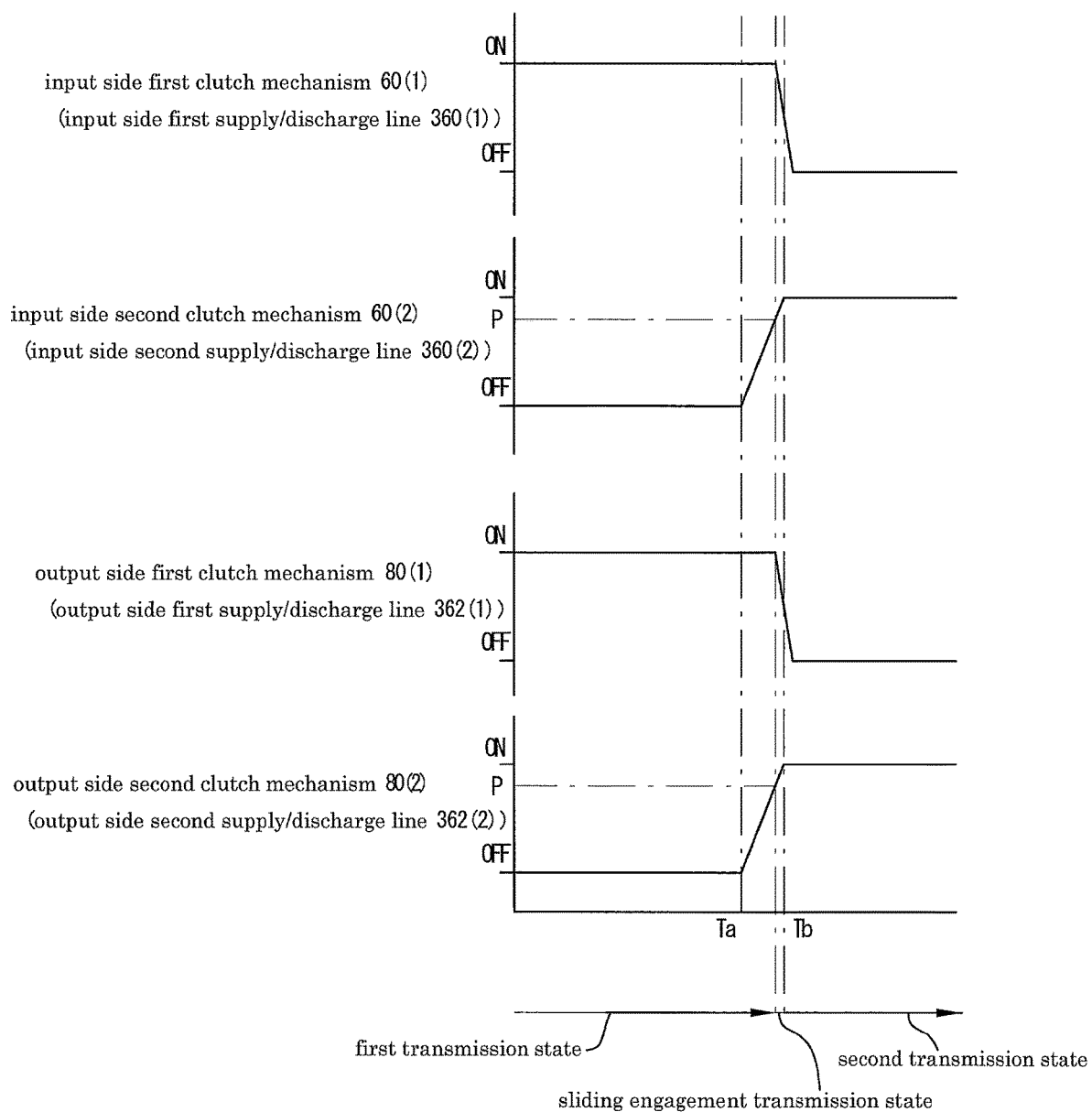
FIG. 17 is hydraulic pressure waveform charts in which the transmission structure according to the embodiment 6 is switched from a first transmission state to a second transmission state.

FIG. 17 illustrates hydraulic pressure waveform charts of the supply/discharge lines 360(1), 360(2), 362(1) and 362(2) in the switching from the first transmission state to the second transmission state.

In this embodiment, the control device 100 performs the same position control as that in Embodiment 5 described above to the electromagnetic valves 365(1), 365(2), 367(1) and 367(2) in the switching between the first and second transmission states.

More specifically, when recognizing that the rotational speed of the speed change output shaft 45 reaches the switching speed from the state where the rotational speed is less than the switching speed based on a signal from the output sensor 95b at time Ta in FIG. 17, the control device 100 moves the input side second electromagnetic valve 365(2) and the output side second electromagnetic valve 367(2) located at the discharge positions at the time before the switching from the discharge positions to the supply positions while maintaining the input side first electromagnetic valve 365(1) and the output side first electromagnetic valve 367(1) located at the supply positions at the time before the switching the transmission state (at the time of the first transmission state in this example) at the supply positions.

Thus, as illustrated in FIG. 17, the hydraulic pressure of the input side second supply/discharge line 360(2) and the output side second supply/discharge line 362(2) gradually increases to reach the engagement hydraulic pressure at time Tb while the input side first supply/discharge line 360(1) and the output side first supply/discharge line 362(1) are maintained at the engagement hydraulic pressure.

Herein, when recognizing that the hydraulic pressure of the input side second supply/discharge line 360(2) and the output side second supply/discharge line 362(2) to which pressure oil is supplied through the input side second electromagnetic valve 365(2) and the output side second electromagnetic valve 367(2), the positions of which are moved to the supply positions from the discharge positions, reaches the switching hydraulic pressure P less than the engagement hydraulic pressure based on signals from the corresponding pressure sensors 370(2) and 372(2), the control device 100 moves the input side first electromagnetic valve 365(1) and the output side first electromagnetic valve 367(1) located at the supply positions at the time before the switching from the supply positions to the discharge positions.

According to the transmission structure 6 having such a configuration, even if a rotational speed difference occurs in the first element and/or the second element and the speed change output shaft 45 in the switching between the first and second transmission states, immediately before the clutch mechanisms are brought into a perfect engagement state from a disengagement state by way of processes in which the friction plate groups of the clutch mechanisms (the input side second clutch mechanism 60(2) and the output side second clutch mechanism 80(2) in the example of FIG. 17) to which pressure oil is supplied through the electromagnetic valves (the input side second electromagnetic valve 365(2) and the output side second electromagnetic valve 367(2) in the example of FIG. 17), the positions of which are moved from the disengagement positions to the supply positions in the switching between the first and second transmission states, are gradually friction-engaged while sliding, and then the hydraulic pressure of the clutch mechanisms reaches the engagement hydraulic pressure, the clutch mechanisms (the input side first clutch mechanism 60(1) and the output side first clutch mechanism 80(1) in the example of FIG. 17)

brought into the engagement state before the switching between the first and second transmission states are released from the engagement hydraulic pressure.

Therefore, the generation of the state where the traveling driving force is not transmitted to the driving wheels 220 in the switching between the first and second transmission states can be prevented or reduced as much as possible and the switching shock or a damage on the transmission system which may occur in the switching between the first and second transmission states can be effectively prevented or reduced.

In this embodiment, the configuration where, when recognizing that, while one electromagnetic valve located at the supply position at the time before the switching is maintained at the supply position, the other electromagnetic valve located at the discharge position at the time before the switching is moved from the discharge position to the supply position in the switching between the first and second transmission states, and then the hydraulic pressure of a supply/discharge line to which pressure oil is supplied through the other electromagnetic valve reaches the switching hydraulic pressure P lower than the engagement hydraulic pressure based on a signal from the corresponding pressure sensor, the one electromagnetic valve is moved from the supply position to the discharge position is applied to both the input side clutch unit formed by the input side first and second clutch mechanisms 60(1) and 60(2) and the output side clutch unit formed by the output side first and second clutch mechanisms 80(1) and 80(2). However, it is a matter of course that the present invention is not limited to such an aspect, and the above-described configuration can be applied to only one of the input side clutch unit and the output side clutch unit in which a rotational speed difference occurs due to the setting of the number of gear teeth configuring the transmission mechanisms and the like and the dog clutch type illustrated in FIG. 10 described above can be adopted to the other clutch unit when the other clutch unit is free from the possibility, whereby a cost reduction can be achieved.

Moreover, this embodiment is also applicable to the transmission structure 2 according to Embodiment 2.

Figure 18:
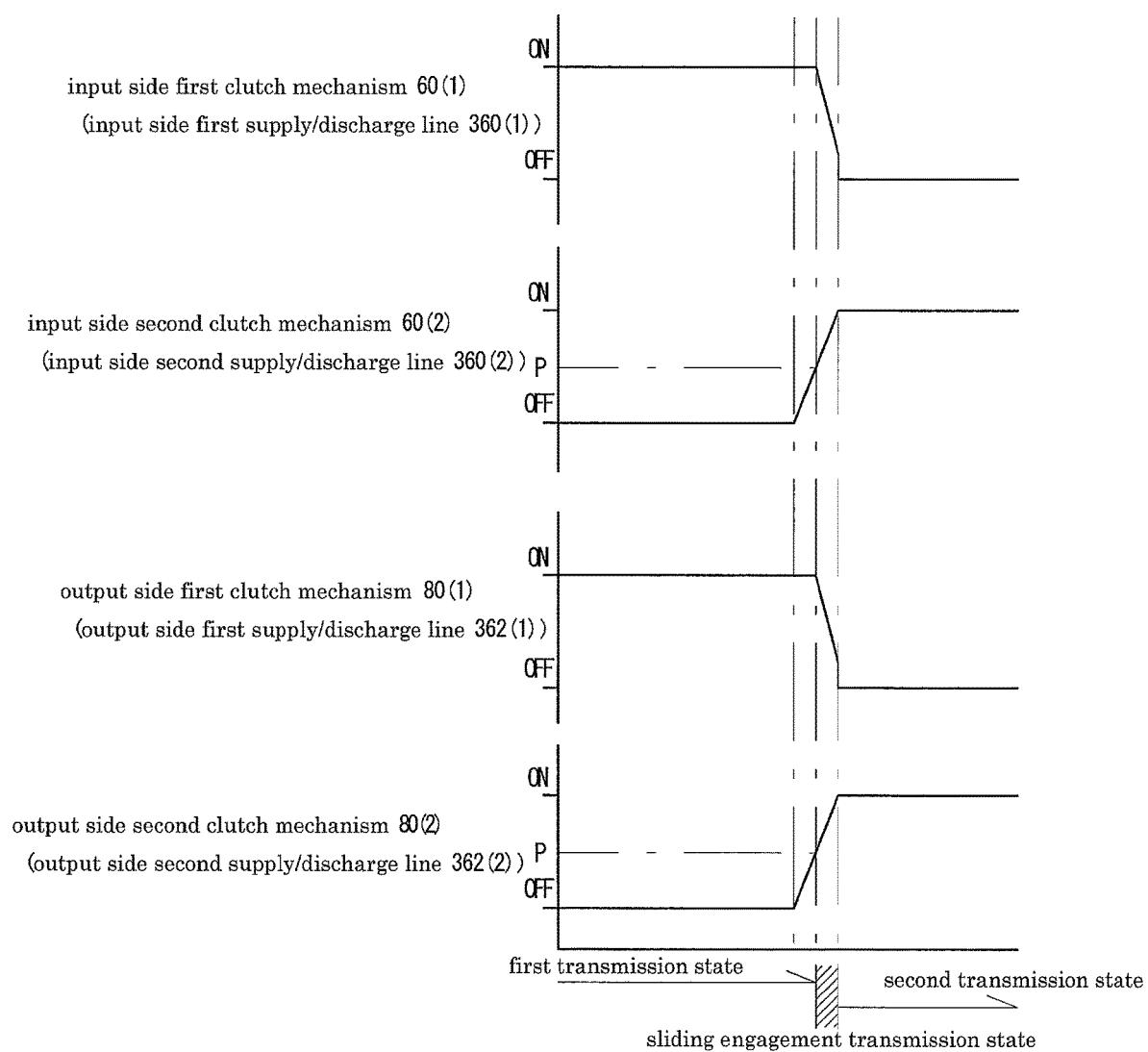
FIG. 18 is hydraulic pressure waveform charts in which a transmission structure according to a modification of the embodiment 5 or 6 is switched from a first transmission state to a second transmission state.

In Embodiments 5 and 6 described above, the hydraulic pressure of the clutch mechanism brought into the engagement state at the time before the switching (hereinafter referred to as "engaged clutch mechanism before the switching") is lowered at a substantially fixed rate to be released from the engagement hydraulic pressure in the switching between the first and second transmission states. In place of the configuration, as illustrates in FIG. 18, it is possible to lower the hydraulic pressure of the engaged clutch mechanism before the switching at a substantially fixed rate in response to the fact that the hydraulic pressure of the clutch mechanism brought into the disengagement state at the time before the switching (hereafter referred to as "disengaged clutch mechanism before the switching) reaches the switching hydraulic pressure P and then lower the hydraulic pressure of the engaged clutch mechanism before the switching to the release hydraulic pressure at once at the time when the hydraulic pressure of the disengaged clutch mechanism before the switching reaches the engagement hydraulic pressure, whereby unnecessary sliding transmission state time can be reduced to improve durability of the friction plate.

Also in Embodiments 5 and 6 described above, in place of the configuration of detecting the engagement state of the corresponding friction plate clutch mechanisms by the pressure sensors 370(1), 370(2), 372(1) and 372(2), a configuration of detecting the engagement state of the corresponding friction plate clutch mechanisms by other clutch engagement detection units detecting a supply current value, supply current time, and the like of the proportional electromagnetic valves 365(1), 365(2), 367(1) and 367(2) can also be adopted.

Embodiment 7

Hereinafter, further yet still another embodiment of the transmission structure according to the present invention is described with reference to the accompanying drawings.

Figure 19:
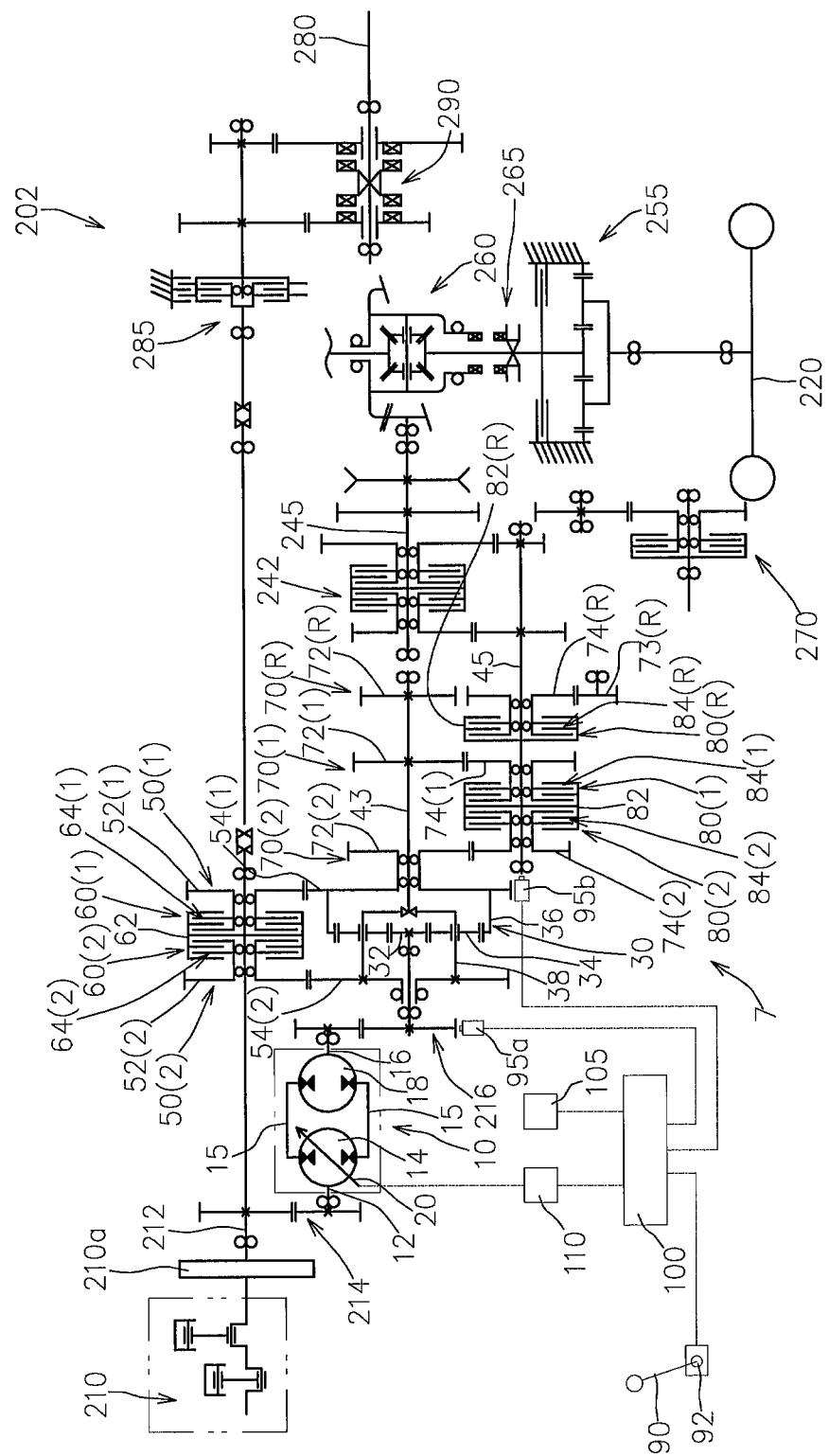
FIG. 19 is a transmission schematic view of a working vehicle to which a transmission structure according to an embodiment 7 of the present invention is applied.

FIG. 19 illustrates a transmission schematic view of a working vehicle 202 to which a transmission structure 7 according to this embodiment is applied.

Figure 20:
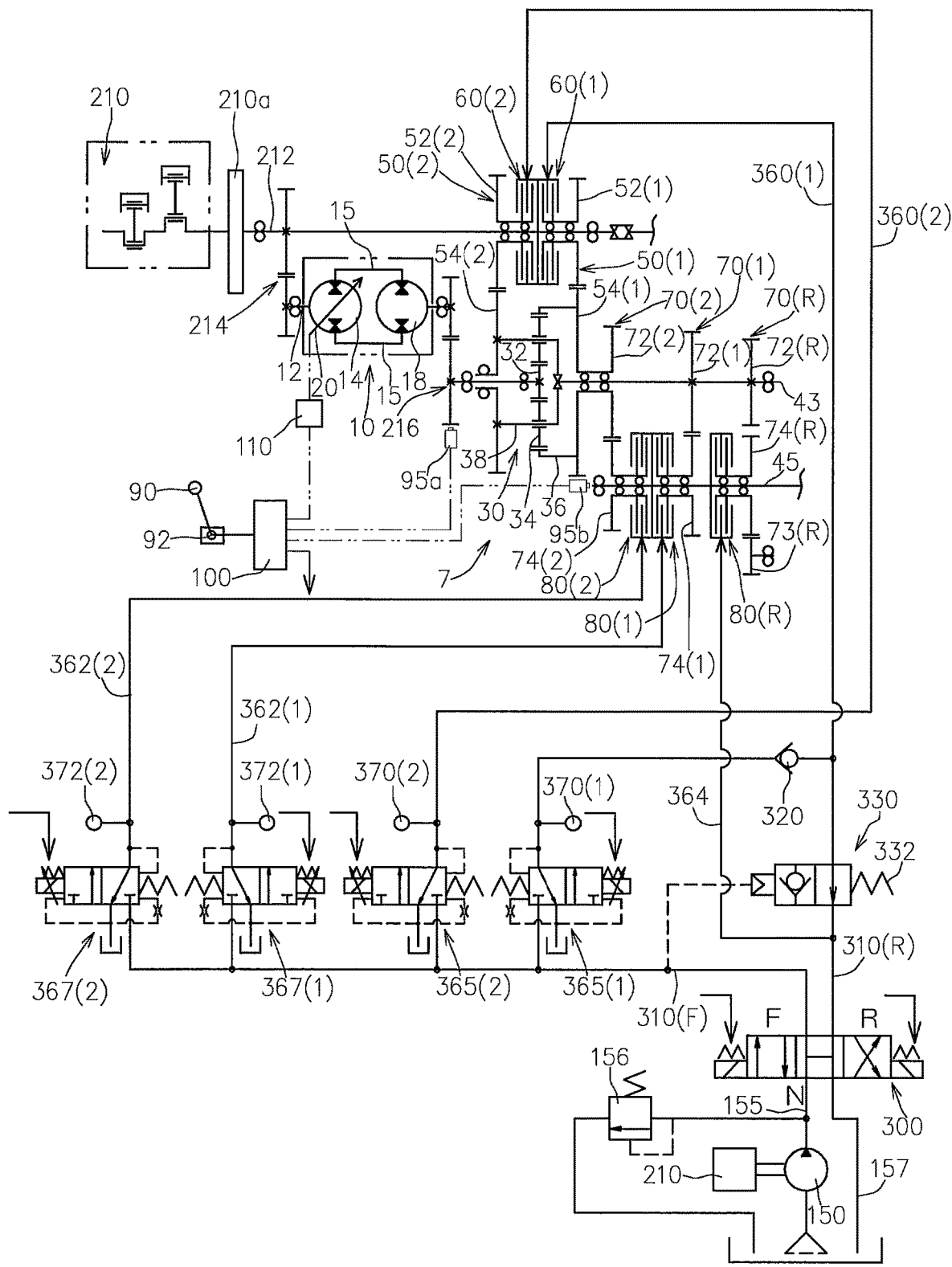
FIG. 20 is a hydraulic circuit diagram of the transmission structure according to the embodiment 7.

FIG. 20 illustrates a hydraulic circuit diagram of the transmission structure 7 according to this embodiment.

In the figure, the same components as those in Embodiments described above are designated by the same reference numerals and a description thereof is omitted as appropriate.

The transmission structure 1 according to Embodiment 1 is configured so that normal and reverse switching of driving force is performed by the forward/reverse movement switching mechanism 230 disposed on the downstream side in the transmission direction relative to the speed change output shaft 45.

More specifically, as illustrated in FIG. 1, the transmission structure 1 according to Embodiment 1 has the forward/reverse movement switching mechanism 230 switching the rotation direction of the driving force between the forward movement direction and the reverse movement direction between the speed change output shaft 45 and the traveling transmission shaft 235 operatively rotationally driven by the rotation power of the speed change output shaft 45.

In contrast thereto, the transmission structure 7 according to this embodiment is configured to be able to switch the rotation direction of the driving force transmitted to the speed change output shaft 45 between the normal direction and the reverse direction.

Specifically, as illustrated in FIG. 19, the transmission structure 7 has the HST 10, the planetary gear mechanism 30, the input side first and second transmission mechanisms 50(1) and 50(2), the input side first and second clutch mechanisms 60(1) and 60(2), the output side first transmission mechanism 70(1) (forward movement first transmission mechanism) capable of operatively transmitting the rotation power of the second element to the speed change output shaft 45 in the normal rotation state, the output side second transmission mechanism 70(2) (forward movement second transmission mechanism) capable of operatively transmitting the rotation power of the first element to the speed change output shaft 45 in the normal rotation state, a reverse movement transmission mechanism 70(R) capable of operatively transmitting the rotation power of the second element to the speed change output shaft 45 in the reverse rotation state, the output side first clutch mechanism 80(1) (forward movement first clutch mechanism), the output side second clutch mechanism 80(2), and a reverse movement clutch mechanism 80(R) engaging/disengaging the power transmission of the output side first transmission mechanism 70(1) (forward movement first transmission mechanism), the output side second transmission mechanism 70(2) (forward movement second transmission mechanism), and the reverse movement transmission mechanism 70(R), respectively, the speed change operation member 90, the HST sensor 95a, the output sensor 95b, and the control device 100.

The reverse movement transmission mechanism 70(R) has a reverse movement driving gear 72(R) supported by the speed change intermediate shaft 43 so as not to be relatively rotatable, a reverse movement driven gear 74(R) relatively rotatably supported by the speed change output shaft 45, and a reverse movement idle gear 73(R) meshed with the reverse movement driving gear 72(R) and the reverse movement driven gear 74(R).

The reverse movement clutch mechanism 80(R) has a reverse movement clutch housing 82(R) supported by the speed change output shaft 45 so as not to be relatively rotatable, a reverse movement friction plate group 84(R) containing a reverse movement driving side friction plate supported by the reverse movement driven gear 74(R) so as not to be relatively rotatable and a reverse movement driven side friction plate supported by the reverse movement clutch housing 82(R) so as not to be relatively rotatable in a state of being opposed to the reverse movement driving side friction plate, and a reverse movement piston (not illustrated) frictionally-engaging the reverse movement friction plate group 84(R).

The reference numeral 105 in FIG. 19 designates an electromagnetic valve unit containing the input side first electromagnetic valve 365(1) and the like.

The reference numeral 242 in FIG. 19 is a sub speed change mechanism containing the friction plate clutch mechanism and is provided in place of the sub speed change mechanism 240 containing the dog clutch type clutch mechanism in the transmission structure 1 according to Embodiment 1.

The control device 100
develops a forward movement first transmission state where the input side first clutch mechanism 60(1) and the output side first clutch mechanism 80(1) are brought into the engagement state in a state where the speed change operation member 90 is located between the zero speed position and the switching speed position (i.e., in a low speed state where the rotational speed of the speed change output shaft 45 is from the zero speed to speed less than the switching speed in the forward movement direction based on detection signals of the HST sensor 95a and the output sensor 95b)
develops a forward movement second transmission state where the input side second clutch mechanism 60(2) and the output side second clutch mechanism 80(2) are brought into the engagement state in a state where the speed change operation member 90 is operated beyond the switching speed position (i.e., in a high speed state where the rotational speed of the speed change output shaft 45 is equal to or higher than the switching speed in the forward movement direction), and
develops the reverse movement transmission state where the input side first clutch mechanism 60(1) and the reverse movement clutch mechanism 80(R) are brought into the engagement state in a state where the speed change operation member 90 is operated from the zero speed position to the reverse movement side (i.e., in a reverse movement transmission state where the rotational speed of the speed change output shaft 45 changes from the zero speed to the reverse movement side).

Figure 21A:
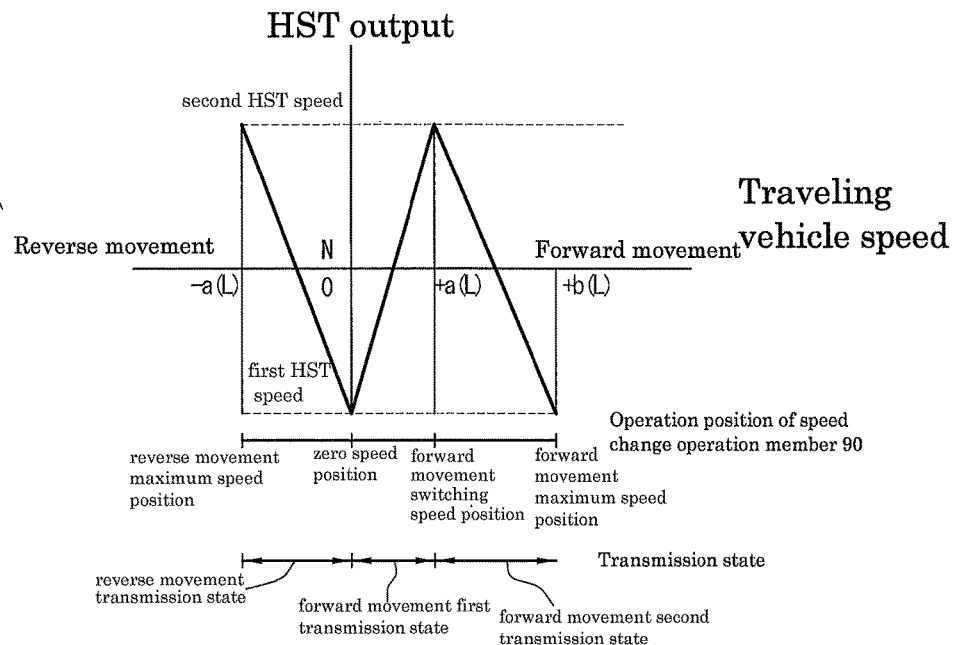
FIGS. 21A and 21B are graphs illustrating the relationship between the traveling vehicle speed and the HST output in the working vehicle to which the transmission structure according to the embodiment 7 is applied, and illustrate states where a sub speed change mechanism provided in the transmission structure is engaged with a low speed stage and a high speed stage, respectively.
Figure 21B:
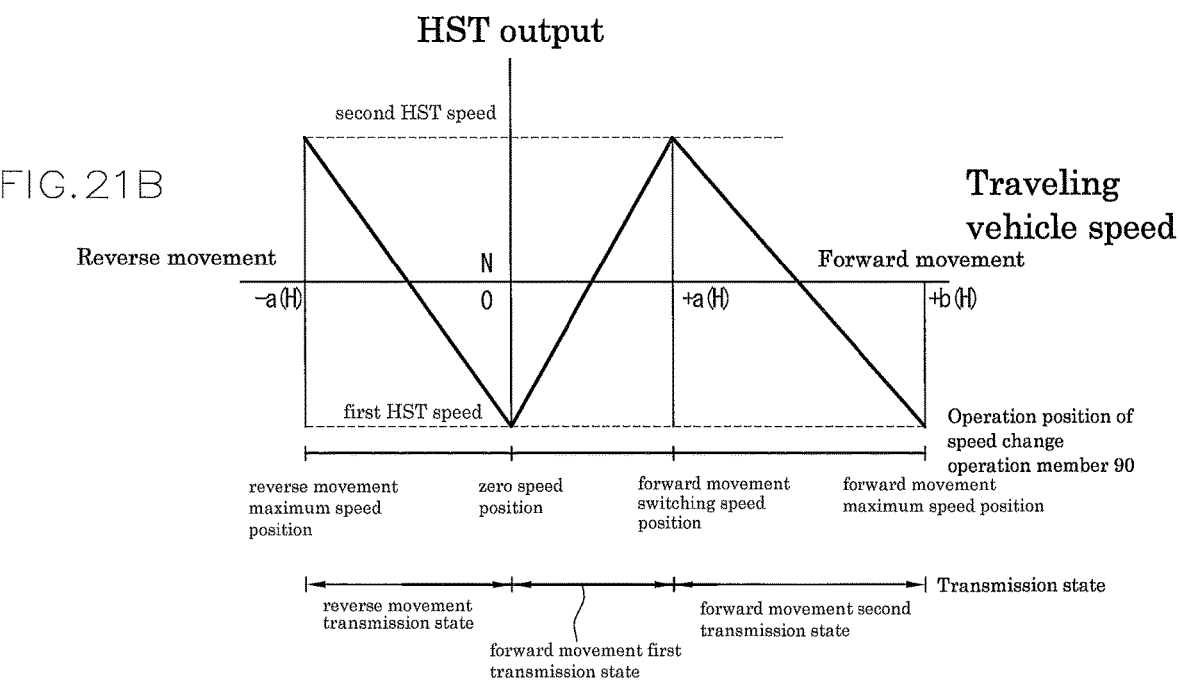

FIGS. 21A and 21B illustrate graphs illustrating the relationship between the traveling vehicle speed and the HST output in the working vehicle 202 to which the transmission structure 7 according to this embodiment is applied.

FIGS. 21A and 21B illustrate graphs in states where the sub speed change mechanism 242 is engaged with a low speed stage and a high speed stage, respectively.

As illustrated in FIGS. 21A and 21B, the control device 100 operates the output adjustment member 20 so that the HST output is speed-changed from the first HST speed toward the second HST speed in response to a forward movement side acceleration operation of the speed change operation member 90 in the forward movement first transmission state.

More specifically, when the speed change operation member 90 is operated between the zero speed position and the forward movement side switching speed position, the control device 100 develops the forward movement first transmission state, and then operates the output adjustment member 20 so that the HST output is speed-changed from the side of the first HST speed to the side of the second HST speed as the acceleration operation of the speed change operation member 90 is performed from the zero speed position side to the forward movement side switching speed position.

In the forward movement second transmission state, the control device 100 operates the output adjustment member 20 so that the HST output is speed-changed from the second HST speed toward the first HST speed in response to the forward movement side acceleration operation of the speed change operation member 90.

More specifically, when recognizing that the speed change operation member 90 is operated from the zero speed position side to the forward movement side switching speed position, the control device 100 performs switching from the forward movement first transmission state to the forward movement second transmission state, and develops the forward movement second transmission state when the speed change operation member 90 is located on the forward movement high speed side relative to the forward movement side switching speed position, and then operates the output adjustment member 20 so that the HST output is speed-changed from the second HST speed toward the first HST speed in response to the forward movement side acceleration operation of the speed change operation member 90.

In the reverse movement transmission state, the control device 100 operates the output adjustment member 20 so that the HST output is speed-changed from the first HST speed toward the second HST speed in response to the reverse movement side acceleration operation of the speed change operation member 90.

More specifically, when the speed change operation member 90 is operated from the zero speed position to the reverse movement side, the control device 100 develops the reverse movement transmission state, and then operates the output adjustment member 20 so that the HST output is speed-changed from the side of the first HST speed to the side of the second HST speed as a reverse movement acceleration operation of the speed change operation member 90 is performed.

As illustrated in FIG. 21, this embodiment is also configured so that a speed difference does not occur in the traveling speed (i.e., the speed change output shaft 45) in the switching between the forward movement side first and second transmission states in the same manner as in Embodiment 1.

Specifically, the speed change ratio (input side first speed change ratio) of the input side first transmission mechanism 50(1) and the speed change ratio (input side second speed change ratio) of the input side second transmission mechanism 50(2) are set so that the rotational speed of the second element when the HST output is set to the second HST speed in the forward movement first transmission state and the rotational speed of the second element by the rotation power transmitted through the input side second transmission mechanism 50(2) in the forward movement second transmission state are the same and so that the rotational speed of the first element when the HST output is set to the second HST speed in the forward movement second transmission state and the rotational speed of the first element by the rotation power transmitted through the input side first transmission mechanism 50(1) in the forward movement first transmission state are the same.

The speed change ratio (forward movement first speed change ratio) of the output side first transmission mechanism 70(1) (forward movement first transmission mechanism) and the speed change ratio (forward movement second speed change ratio) of the output side second transmission mechanism 70(2) (forward movement second transmission mechanism) are set so that the rotational speed developed in the speed change output shaft 45 when the HST output is set to the second HST speed is same in the first and second transmission states.

According to such a configuration, the occurrence of a rotational speed difference in the speed change output shaft 45 in the switching between the forward movement side first and second transmission states, i.e., the occurrence of a traveling speed difference, can be effectively prevented or reduced.

The HST 10 and the planetary gear mechanism 30 are set so that, when the HST output is set to the first HST speed in the engagement state of the input side first clutch mechanism 60(1), the rotational speed of the second element becomes the zero speed.

According to such a configuration, the forward/reverse movement switching of a vehicle can be smoothly performed. In particular, the configuration is effective in the case of a working vehicle performing work frequently requiring forward/reverse movement switching.

Next, the pressure oil supply/discharge configuration of the transmission structure 7 is described.

As illustrated in FIG. 20, the transmission structure 7 has the pressure oil supply line 155, the input side first supply/discharge line 360(1), the input side second supply/discharge line 360(2), the output side first supply/discharge line 362(1) (forward movement side first supply/discharge line), the output side second supply/discharge line 362(2) (forward movement side second supply/discharge line), a reverse movement supply/discharge line 364 supplying/discharging pressure oil to the reverse movement clutch mechanism 80(R), a forward movement supply line 310(F), a reverse movement supply line 310(R), the input side first electromagnetic valve 365(1), the input side second electromagnetic valve 365(2), the output side first electromagnetic valve 367(1), and the output side second electromagnetic valve 367(2), the input side first pressure sensor 370(1) and the input side second pressure sensor 370(2), the output side first pressure sensor 372(1) and the output side second pressure sensor 372(2), a check valve 320 interposed in the input side first supply/discharge line 360(1), a pilot valve 330 interposed in the reverse movement supply line 310(R), the drain line 157, and a forward/reverse movement switching electromagnetic valve 300.

In this embodiment, the input side first electromagnetic valve 365(1), the input side second electromagnetic valve 365(2), the output side first electromagnetic valve 367(1) and the output side second electromagnetic valve 367(2) are interposed between the forward movement supply line 310(F) and the input side first supply/discharge line 360(1), the input side second supply/discharge line 360(2), the output side first supply/discharge line 362(1) (forward movement side first supply/discharge line) and the output side second supply/discharge line 362(2) (forward movement side second supply/discharge line), respectively, and configured to drain the corresponding supply/discharge lines 360(1), 360(2), 362(1) and 362(2) when located at the discharge positions and meanwhile, fluid-connect the corresponding supply/discharge lines 360(1), 360(2), 362(1) and 362(2) to the forward movement supply line 310(F) when located at the supply positions.

The position of the forward/reverse movement switching electromagnetic valve 300 is controlled by the control device 100 so as to be able to take a forward movement position F where the forward movement supply line 310(F) is fluid-connected to the pressure oil supply line 155 and the reverse movement supply line 310(R) is fluid-connected to the drain line 157, a reverse movement position R where the reverse movement supply line 310(R) is fluid-connected to the pressure oil supply line 155 and the forward movement supply line 310(F) is fluid-connected to the drain line 157, and a neutral position N where the pressure oil supply line 155, the forward movement supply line 310(F), and the reverse movement supply line 310(R) are fluid-connected to the drain line 157.

The check valve 320 is interposed in the input side first supply/discharge line 360(1) to, while permitting that pressure oil supplied from the forward movement supply line 310(F) through the input side first electromagnetic valve 365(1) to flow toward the input side first clutch mechanism 60(1) in a pressure oil supply direction, prevent the flow in a pressure oil discharge direction opposite thereto.

In the reverse movement supply line 310(R), the upstream side close to the hydraulic source 150 is fluid-connected to a secondary side of the forward/reverse movement switching electromagnetic valve 300 and the downstream side on the side opposite to the hydraulic source 150 is fluid-connected to the input side first supply/discharge line 360(1) on the downstream side in the pressure oil supply direction relative to the check valve 320.

The pilot valve 330 is configured to be able to selectively take a communication position where the reverse movement supply line 310(R) is made to communicate and a check position where, while the flow of the pressure oil of the reverse movement supply line 310(R) in the pressure oil supply direction is permitted, the reverse flow is prevented.

The pilot valve 330 is configured to use the hydraulic pressure of the forward movement supply line 310(F) as pilot pressure while being energized toward the communication position by a biasing member 332 and to be located at the check position against the pressing force of the biasing member 332 when pressure oil is supplied to the forward movement supply line 310(F).

In the reverse movement supply/discharge line 364, the upstream side is fluid-connected to the reverse movement supply line 310(R) on the upstream side in the pressure oil supply direction relative to the pilot valve 330 and the downstream side is fluid-connected to the reverse movement clutch mechanism 80(R).

The pressure oil supply/discharge configuration of the transmission structure 7 operates as follows.

When the speed change operation member 90 is located at the zero speed position, the control device 100 locates the forward/reverse movement switching electromagnetic valve 300 at the neutral position.

In this state, the input side first supply/discharge line 360(1), the input side second supply/discharge line 360(2), the output side first supply/discharge line 362(1), the output side second supply/discharge line 362(2), and the reverse movement supply/discharge line 364 are all opened and all the clutch mechanisms 60(1), 60(2), 80(1), 80(2), and 80(R) are brought into the disengagement state, so that power is not transmitted to the speed change output shaft 45.

When the speed change operation member 90 is operated to the forward movement side, the control device 100 locates the forward/reverse movement switching electromagnetic valve 300 at the forward movement position F before the HST 10 outputs the first HST speed.

Thus, the reverse movement supply line 310(R) is fluid-connected to the drain line 157 and the forward movement supply line 310(F) is fluid-connected the pressure oil supply line 155.

At this time, the pilot valve 330 is located at the check position by the hydraulic pressure of the supply line in forward 310 (F). Therefore, the input side first supply/discharge line 360(1) is brought into a state where the hydraulic pressure is held.

When the speed change operation member 90 is operated from the zero speed position to the forward movement side switching speed position, the control device 100 locates the input side first electromagnetic valve 365(1) and the output side first electromagnetic valve 367(1) at the supply positions.

Thus, pressure oil flows into the input side first supply/discharge line 360(1) and the output side first supply/discharge line 362(1) from the forward movement supply line 310(F), so that the forward movement first transmission state where the input side first clutch mechanism 60(1) and the output side first clutch mechanism 80(1) are brought into the engagement state is developed.

At this time, the input side second supply/discharge line 360(2) and the output side second supply/discharge line 362(2) are drained by the corresponding electromagnetic valves 365(2) and 367(2) and the reverse movement supply/discharge line 364 is drained through the reverse movement supply line 310(R) and the forward/reverse movement switching electromagnetic valve 300.

When the speed change operation member 90 is operated to the forward movement high speed side beyond the forward movement side switching speed position, the control device 100 locates the input side second electromagnetic valve 365(2) and the output side second electromagnetic valve 367(2) at the supply positions while locating the input side first electromagnetic valve 365(1) and the output side first electromagnetic valve 367(1) at the discharge positions before the HST 10 outputs the second HST speed.

Thus, pressure oil flows into the input side second supply/discharge line 360(2) and the output side second supply/discharge line 362(2) from the forward movement supply line 310(F), so that the forward movement second transmission state is developed where the input side second clutch mechanism 60(2) and the output side second clutch mechanism 80(2) are brought into the engagement state.

At this time, the input side first supply/discharge line 360(1) and the output side first supply/discharge line 362(1) are drained through the corresponding electromagnetic valves 365(1) and 367(1) and the reverse movement supply/discharge line 364 is drained through the reverse movement supply line 310(R) and the forward/reverse movement switching electromagnetic valve 300.

When the speed change operation member 90 is operated to the reverse movement side, the control device 100 locates the forward/reverse movement switching electromagnetic valve 300 at the reverse movement position R before the HST 10 outputs the first HST speed.

Thus, the forward movement supply line 310(F) is fluid-connected to the drain line 157 and the reverse movement supply line 310(R) is fluid-connected to the pressure oil supply line 155.

At this time, the input side first electromagnetic valve 365(1), the input side second electromagnetic valve 365(2), the output side first electromagnetic valve 367(1), and the output side second electromagnetic valve 367(2) are all located at the discharge positions.

Therefore, the input side second supply/discharge line 360(2), the output side first supply/discharge line 362(1), and the output side second supply/discharge line 362(2) are opened by the corresponding electromagnetic valves 365(2), 367(1), and 367(2), respectively.

Meanwhile, the input side first supply/discharge line 360(1) is fluid-connected to the reverse movement supply line 310(R) on the downstream side in the pressure oil supply direction relative to the check valve 320.

Therefore, although the input side first electromagnetic valve 365(1) is located at the discharge position, pressure oil is supplied to the input side first supply/discharge line 360(1) through the reverse movement supply line 310(R), so that the input side first clutch mechanism 60(1) is brought into the engagement state.

At this time, the forward movement supply line 310(F) is opened, and therefore the pilot valve 330 using the hydraulic pressure of the forward movement supply line 310(F) as pilot pressure is located at the communication position by the pressing force of the biasing member 332.

Therefore, pressure oil is effectively supplied to the input side first supply/discharge line 360(1) through the reverse movement supply line 310(R).

As described above, the reverse movement supply/discharge line 364 is fluid-connected to the reverse movement supply line 310(R) on the upstream side in the pressure oil supply direction relative to the pilot valve 300 and receives the pressure oil supply from the reverse movement supply line 310(R).

Thus, the reverse movement transmission state is developed where the input side first clutch mechanism 60(1) is brought into the engagement state and the reverse movement clutch mechanism 80(R) is brought into the engagement state.

With respect to the switching control timing of the input side first electromagnetic valve 365(1) and the input side second electromagnetic valve 365(2) and the switching control timing of the output side first electromagnetic valve 367(1) and the output side second electromagnetic valve 367(2) in the switching between the forward movement side first and second transmission states, various embodiments, such as Embodiment 3 described above, Embodiment 5 described above, and Embodiment 6 described above, are applicable.

As illustrated in FIG. 20, in this embodiment, the input side first clutch mechanism 60(1), the input side second clutch mechanism 60(2), the output side first clutch mechanism 80(1), the output side second clutch mechanism 80(2), and the reverse movement clutch mechanism 80(R) are all configured as a hydraulic friction plate type.

In place of the configuration, at least one of the input side clutch unit formed by the input side first and second clutch mechanisms and the output side clutch unit formed by the output side first and second clutch mechanisms can be configured as the dog clutch type in Embodiment 4 described above.

Figure 22:
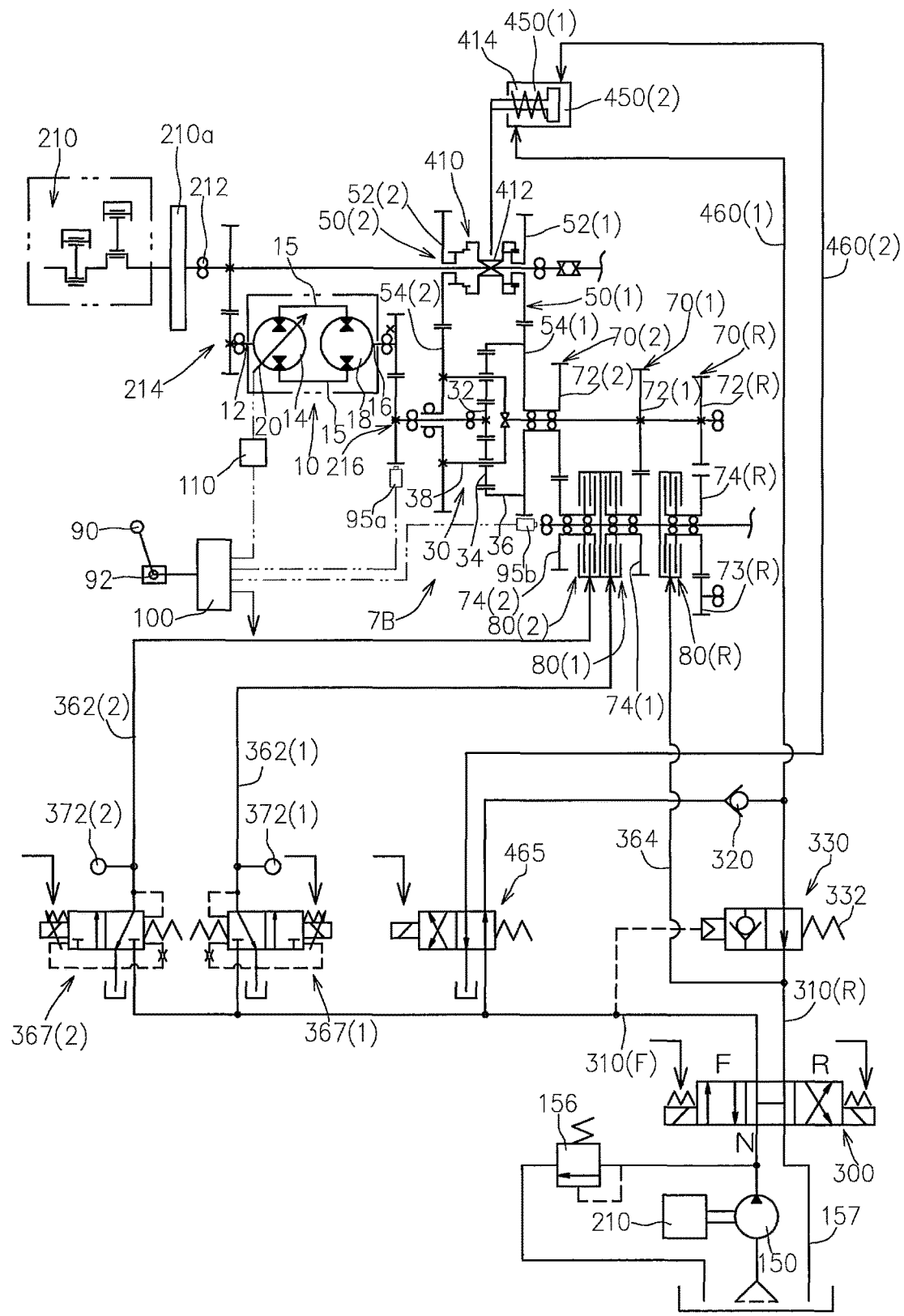
FIG. 22 is a hydraulic circuit diagram of a transmission structure according to a modification of the embodiment 7.

FIG. 22 illustrates a hydraulic circuit diagram of a transmission structure 7B according to a modification of this embodiment.

In the figure, the same members as those in Embodiments described above are designated by the same reference numerals and a description thereof is omitted as appropriate.

The transmission structure 7B has the input side clutch unit 410 of the dog clutch type in place of the input side first and second clutch mechanisms 60(1) and 60(2) of the friction plate type as compared with the transmission structure 7 according to this embodiment.

It is a matter of course that the output side clutch unit 430 of the dog clutch type can be provided in place of the output side first and second clutch mechanisms 80(1) and 80(2) and the clutch mechanism of the dog clutch type can also be provided in place of the reverse movement clutch mechanism 80(R).

Embodiment 8

Hereinafter, further yet still another embodiment of the transmission structure according to the present invention is described with reference to the accompanying drawings.

Figure 23:
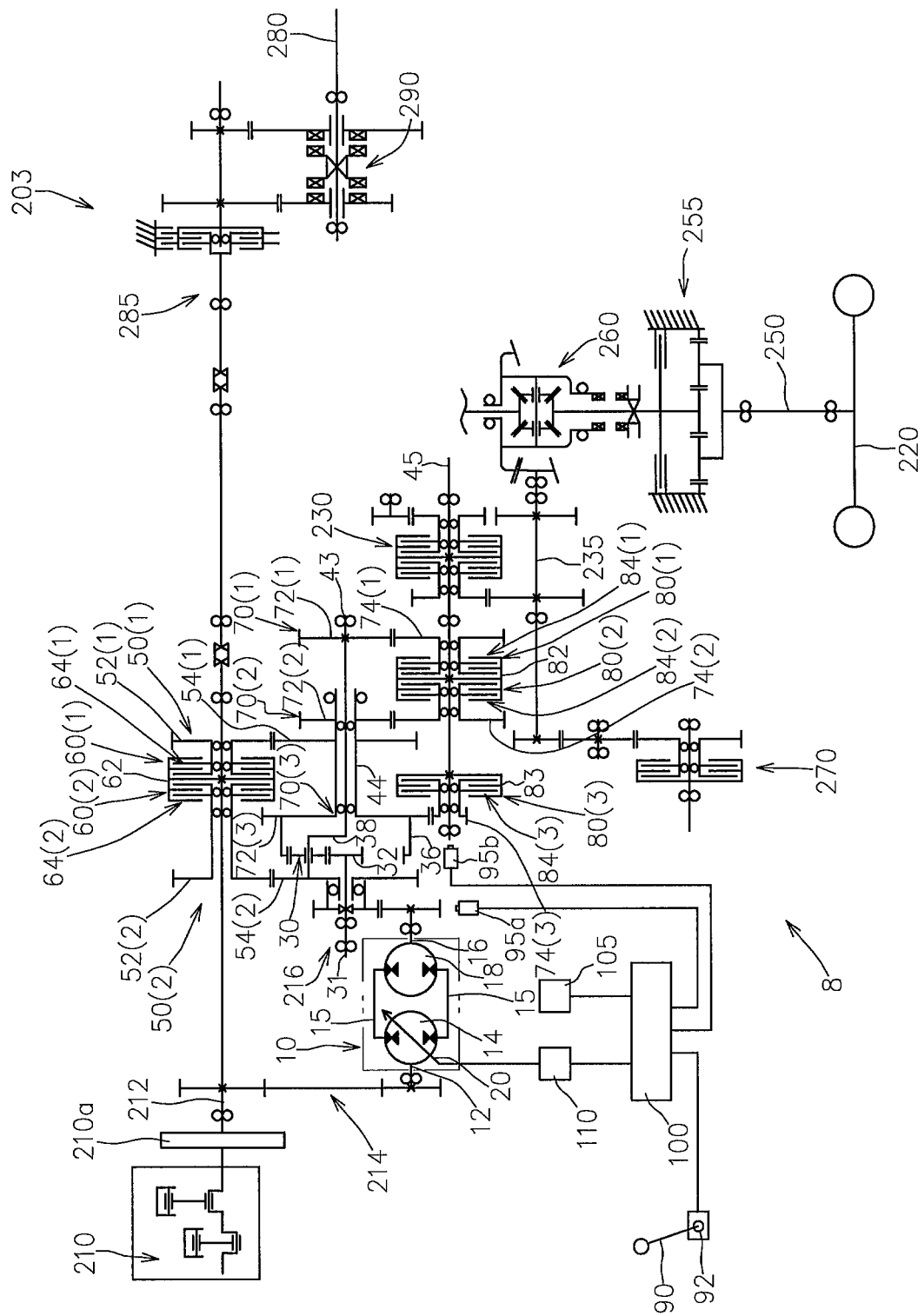
FIG. 23 is a transmission schematic view of a working vehicle to which a transmission structure according to an embodiment 8 of the present invention is applied.

FIG. 23 illustrates a transmission schematic view of a working vehicle 203 to which a transmission structure 8 according to this embodiment is applied.

Figure 24:
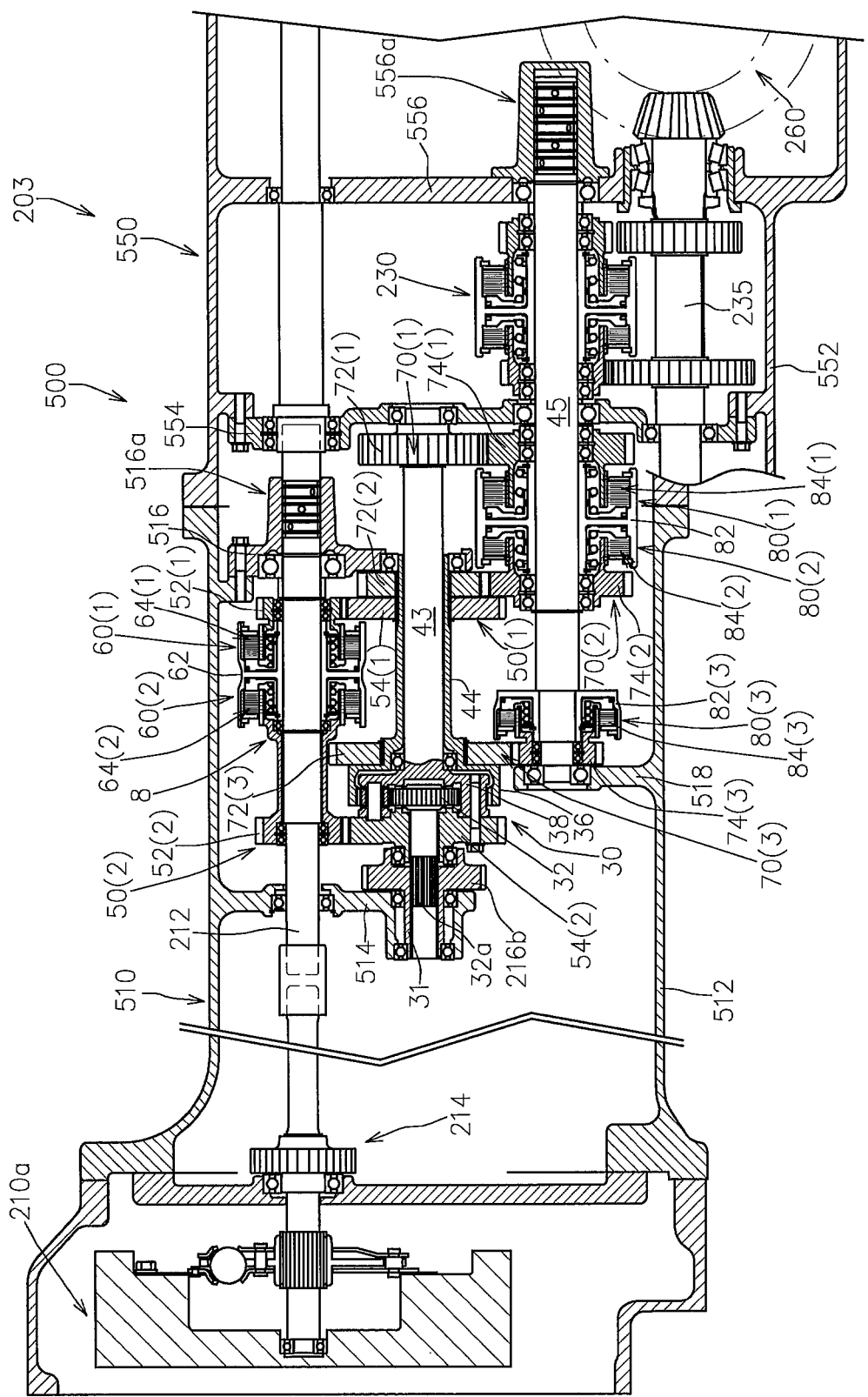
FIG. 24 is a partial vertical cross-sectional side view of the working vehicle shown in FIG. 23.

FIG. 24 illustrates a partial vertical cross-sectional side view of the working vehicle 203.

In the figures, the same components as those in Embodiments described above are designated by the same reference numerals and a description thereof is omitted as appropriate.

As illustrated in FIG. 23, the transmission structure 8 according to this embodiment is further provided with an output side third transmission mechanism 70(3) and an output side third clutch mechanism 80(3) as compared with the transmission structure 1 according to Embodiment 1 described above.

More specifically, the transmission structure 8 is provided with the HST 10, the planetary gear mechanism 30, the speed change output shaft 45, the input side first and second transmission mechanisms 50(1) and 50(2), the input side first and second clutch mechanisms 60(1) and 60(2), the output side first to third transmission mechanisms 70(1) to 70(3), the output side first to third clutch mechanisms 80(1) to 80(3), the speed change operation member 90, the HST sensor 95a, the output sensor 95b, and the control device 100.

In this embodiment, the clutch mechanisms 60(1), 60(2), and 80(1) to 80(3) are configured as hydraulic friction plate clutch units.

The output side third transmission mechanism 70(3) is configured to be able to transmit the rotation power of the first element (the internal gear 36 in this embodiment) to the speed change output shaft 45 at an output side third speed change ratio where the speed change output shaft 45 is rotated at rotational speed higher than the rotational speed at the output side second speed change ratio of the output side second transmission mechanism 70(2).

The output side third clutch mechanism 80(3) is configured to engage/disengage the power of the output side third transmission mechanism 70(3).

Figure 25:
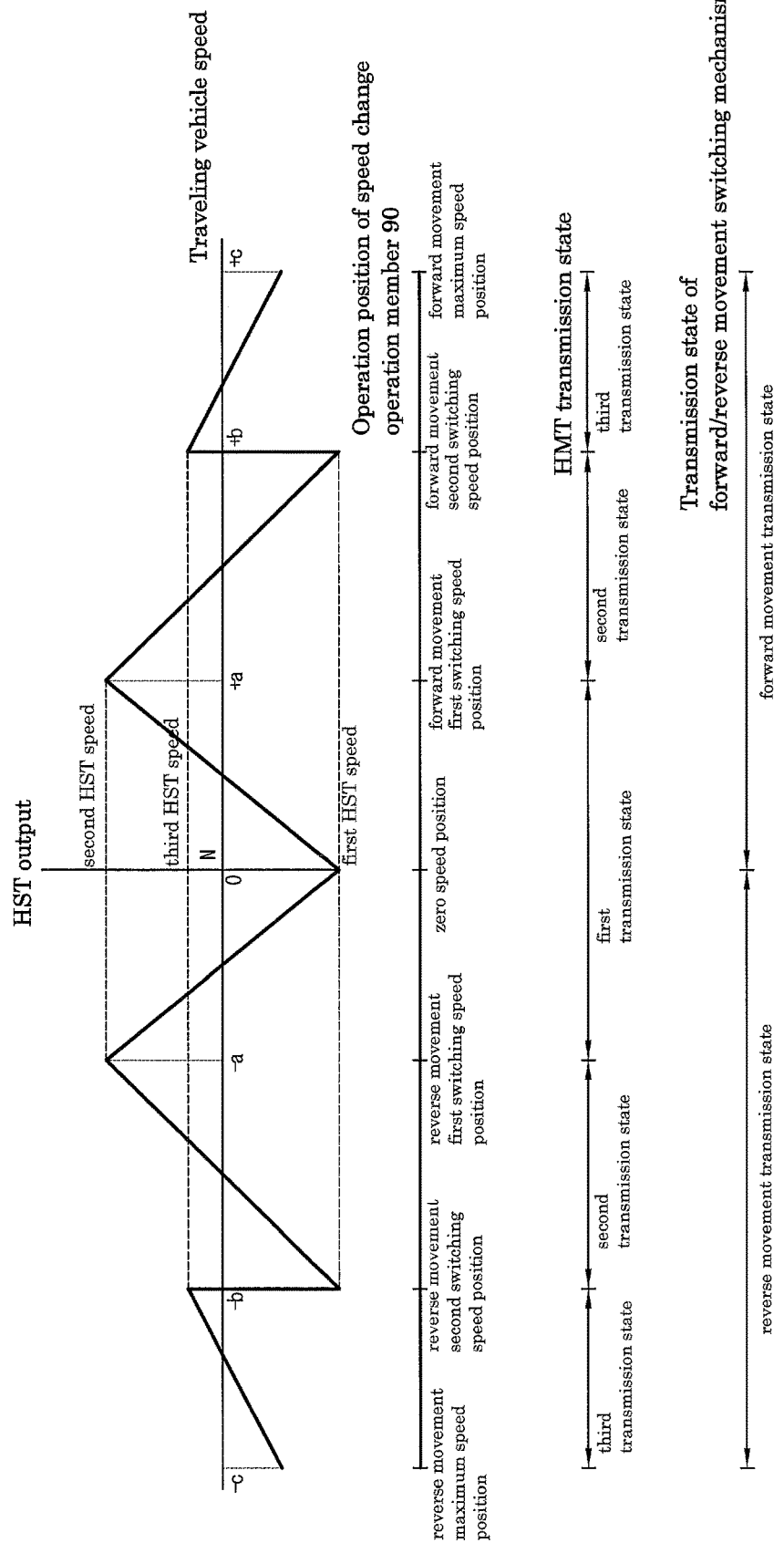
FIG. 25 is a graph illustrating the relationship between the traveling vehicle speed and the HST output in the working vehicle shown in FIG. 23.

FIG. 25 illustrates a graph illustrating the relationship between the traveling vehicle speed and the HST output in the working vehicle 203 to which the transmission structure 8 according to this embodiment is applied.

As illustrated in FIG. 25, in this embodiment, the control device 100 develops a first transmission state where, while the input side first clutch mechanism 60(1) is brought into the engagement state and the input side second clutch mechanism 60(2) is brought into the disengagement state, the output side first clutch mechanism 80(1) is brought into the engagement state and the remaining output side second and third clutch mechanisms 80(2) and 80(3) are brought into the disengagement state in a state where the speed change operation member 90 is located between the zero speed position and the first switching speed position (i.e., in a low speed state where the rotational speed of the speed change output shaft 45 is from the zero speed to speed less than the first switching speed based on detection signals of the HST sensor 95a and the output sensor 95b), develops a second transmission state where, while the input side first clutch mechanism 60(1) is brought into the disengagement state and the input side second clutch mechanism 60(2) is brought into the engagement state, the output side second clutch mechanism 80(2) is brought into the engagement state and the remaining output side first and third clutch mechanisms 80(1) and 80(3) are brought into the disengagement state in a state where the speed change operation member 90 is located between the first switching speed position and the second switching speed position. (i.e., in the intermediate speed state where the rotational speed of the speed change output shaft 45 is from the first switching speed to the second switching speed based on detection signals of the HST sensor 95a and the output sensor 95b), and develops a third transmission state where, while the input side first clutch mechanism 60(1) is brought into the disengagement state and the input side second clutch mechanism 60(2) is brought into the engagement state, the output side third clutch mechanism 80(3) is brought into the engagement state and the remaining output side first and second clutch mechanisms 80(1) and 80(2) are brought into the disengagement state in a state where the speed change operation member 90 is operated beyond the second switching speed position (i.e., in a high speed state where the rotational speed of the speed change output shaft 45 exceeds the second switching speed based on detection signals of the HST sensor 95a and the output sensor 95b).

As illustrated in FIG. 23, the transmission structure 8 has the forward/reverse movement switching mechanism 230 interposed between the speed change output shaft 45 and the traveling transmission shaft 235, in which the output of the forward/reverse movement switching mechanism 230 is operatively transmitted to the traveling transmission shaft 235.

Then, the control device 100 brings the forward/reverse movement switching mechanism 230 into a forward movement transmission state and a reverse movement transmission state in response to an operation to the forward movement side and the reverse movement side of the speed change operation member 90, respectively.

More specifically, in the working vehicle 203, when the speed change operation member 90 is operated between the zero speed position and a forward movement side first switching speed position, the forward movement first transmission state is developed, and, when the speed change operation member 90 is located at the forward movement side first switching speed position, the traveling transmission shaft 235 rotates at rotational speed setting the traveling vehicle speed to +a.

When the speed change operation member 90 is operated between the forward movement side first switching speed position and a forward movement side second switching speed position, the forward movement second transmission state is developed and, when the speed change operation member 90 is located at the forward movement side second switching speed position, the traveling transmission shaft 235 rotates at rotational speed setting the traveling vehicle speed to +b.

Then, when the speed change operation member 90 is operated beyond the forward movement side second switching speed position, a forward movement third transmission state is developed and, when the speed change operation member 90 is located at a forward movement side maximum speed position, the traveling transmission shaft 235 rotates at rotational speed setting the traveling vehicle speed to +c.

Similarly, when the speed change operation member 90 is operated between the zero speed position and a reverse movement side first switching speed position, a reverse first transmission state is developed and, when the speed change operation member 90 is located at the reverse movement side first switching speed position, the traveling transmission shaft 235 rotates at rotational speed setting the traveling vehicle speed to −a.

When the speed change operation member 90 is operated between the reverse movement side first switching speed position and a reverse movement side second switching speed position, a reverse movement second transmission state is developed and, when the speed change operation member 90 is located at the reverse movement side second switching speed position, the traveling transmission shaft 235 rotates at rotational speed setting the traveling vehicle speed to −b.

Then, when the speed change operation member 90 is operated beyond the reverse movement side second switching speed position, a reverse movement third transmission state is developed and, when the speed change operation member 90 is located at a reverse movement side maximum speed position, the traveling transmission shaft 235 rotates at rotational speed setting the traveling vehicle speed to −c.

In the same manner as in Embodiment 1 described above, the input side first speed change ratio of the input side first transmission mechanism 50(1) and the input side second speed change ratio of the input side second transmission mechanism 50(2) are set so that the rotational speed of the second element (the carrier 38 in this embodiment) when the HST output is set to the second HST speed in the first transmission state and the rotational speed of the second element by the rotation power transmitted through the input side second transmission mechanism 50(2) in the second transmission state are the same and so that the rotational speed of the first element (the internal gear 36 in this embodiment) when the HST output is set to the second HST speed in the second transmission state and the rotational speed of the first element by the rotation power transmitted through the input side first transmission mechanism 50(2) in the first transmission state are the same.

As illustrated in FIG. 25, the output side first speed change ratio of the output side first transmission mechanism 70(1) and the output side second speed change ratio of the output side second transmission mechanism 70(2) are set so that the rotational speed developed in the speed change output shaft 45 when the HST output is set to the second HST speed is same in the first and second transmission states.

As illustrated in FIG. 25, the transmission structure 8 according to this embodiment is configured so that the control device 100 operates the output adjustment member 20 so that the rotational speed developed in the speed change output shaft 45 in a transmission state after the switching coincides with or approaches the rotational speed developed in the speed change output shaft 45 in a transmission state before the switching in the switching between the second and third transmission states.

More specifically, when the speed change operation member 90 is operated in the acceleration direction under the second transmission state to reach the second switching speed position (when the rotational speed of the speed change output shaft 45 reaches the second switching speed), while the control device 100 shifts the output side second clutch mechanism 80(2) from the engagement state to the disengagement state and shifts the output side third clutch mechanism 80(3) from the disengagement state to the engagement state, the control device 100 operates the output adjustment member 20 so that the output of the HST 10 is speed-changed from the rotational speed (first HST speed) rotating the speed change output shaft 45 at the second switching speed under the second transmission state to the rotational speed (third HST speed of FIG. 25) rotating the speed change output shaft 45 at the second switching speed or speed around the second switching speed under the third transmission state.

When the speed change operation member 90 is operated in a deceleration direction under the third transmission state to reach the second switching speed position (when the rotational speed of the speed change output shaft 45 reaches the second switching speed), while the control device 100 shifts the output side third clutch mechanism 80(3) to the disengagement state from the engagement state and shifts the output side second clutch mechanism 80(2) to the engagement state from an disengagement state, the control device 100 operates the output adjustment member 20 so that the output of the HST 10 is speed-changed from the rotational speed (third HST speed) rotating the speed change output shaft 45 at second switching speed under the third transmission state to the rotational speed (first HST speed) rotating the speed change output shaft 45 at the second switching speed or speed around the second switching speed under the second transmission state.

The transmission structure 8 having such a configuration can extend the speed changeable range (speed change region) while obtaining the same effects as those of the transmission structure according to Embodiment 1 described above.

In this embodiment, the output side first and second speed change ratios are set so that the rotational speed developed in the speed change output shaft 45 when the HST output is set to the second HST speed is same in the first and second transmission states as described above. However, in place of the configuration, a configuration may be acceptable in which the control device 100 operates the output adjustment member 20 so that, in the switching between the first and second transmission states, the rotational speed developed in the speed change output shaft 45 in a transmission state after the switching coincides with or approaches the rotational speed developed in the speed change output shaft 45 in the transmission state before the switching.

As illustrated in FIG. 23 and FIG. 24, the transmission structure 8 according to this embodiment has a speed change transmission shaft 44 externally inserted in a relatively rotatable manner into the speed change intermediate shaft 43 coupled with the second element (the carrier 38 in this embodiment) so as not to be relatively rotatable around the axis.

The speed change transmission shaft 44 is configured to be coupled with the first element (the internal gear 36 in this embodiment) so as not to be relatively rotatable around the axis, the input side first transmission mechanism 50(1) is configured to operatively transmit the rotation power of the main driving shaft 212 to the first element through the speed change transmission shaft 44, and the output side first and second transmission mechanisms 70(1) and 70(2) are configured to operatively transmit the rotation power of the first element to the speed change output shaft 45 through the speed change transmission shaft 44.

In detail, as illustrated in FIG. 23 and FIG. 24, the input side first driven gear 54(1) of the input side first transmission mechanism 50(1) is supported by the speed change transmission shaft 44 so as not to be relatively rotatable in a state of being operatively coupled with the input side first driving gear 52(1) relatively rotatably supported by the main driving shaft 212 in this embodiment.

The output side second driving gear 72(2) of the output side second transmission mechanism 70(2) is supported by the speed change transmission shaft 44 so as not to be relatively rotatable in a state of being operatively coupled with the output side second driven gear 74(2).

The output side third transmission mechanism 70(3) has an output side third driving gear 72(3) supported by the speed change transmission shaft 44 so as not to be relatively rotatable and an output side third driven gear 74(3) operatively coupled with the output side third driving gear 72(3) and relatively rotatably supported by the speed change output shaft 45.

The input side second transmission mechanism 50(2) has the input side second driving gear 52(2) relatively rotatably supported by the main driving shaft 212 and the input side first driven gear 54(2) operatively coupled with the input side second driving gear 52(2) and made relatively unrotatable to the second element in the same manner as in Embodiment 1 described above.

As illustrated in FIG. 24, the transmission structure 8 has a variable input shaft 31 supporting the third element (the sun gear 32 in this embodiment) functioning as the variable power input portion so as not to be relatively rotatable around the axis and the input side first driven gear 54(2) is relatively rotatably supported by the variable input shaft 31.

The variable input shaft 31 supports a driven gear 216b of the gear train 216 operatively transmitting the rotation power of the motor shaft 16 to the third element (the sun gear 32) so as not to be relatively rotatable.

In this embodiment, the output side third clutch mechanism 80(3) has an output side clutch housing 83 supported by the speed change output shaft 45 so as not to be relatively rotatable, an output side third friction plate group 84(3) containing a third driving side friction plate supported by the output side third driven gear 74(3) so as not be relatively rotatable and a third driven side friction plate supported by the output side clutch housing 83 so as not to be relatively rotatable in a state of being opposed to the third driving side friction plate, and an output side third piston (not illustrated) frictionally engaging the output side third friction plate group 84(3).

As illustrated in FIG. 24, the transmission structure 8 according to this embodiment is housed in a housing structure 500 in the working vehicle 203.

The housing structure 500 has a front housing 510 and a rear housing 550 coupled in series.

The front housing 510 has a hollow front housing body 512, a front supporting wall 514 and a second supporting wall 518 extended radially inward from the inner surface at an intermediate position in the longitudinal direction of the front housing body 512, and a front bearing plate 516 detachably coupled with a boss portion formed to project radially inward from the inner surface near a rear opening of the front housing body 512.

The rear housing 550 has a hollow rear housing body 552 detachably coupled with the front housing body 512, a rear bearing plate 554 detachably coupled with a boss portion formed to project radially inward from the inner surface near a front opening of the rear housing body 552, and a rear supporting wall 556 extended radially inward from the inner surface at an intermediate position in the longitudinal direction of the rear housing body 552.

In such a configuration, the main driving shaft 212 is supported by the front supporting wall 514, the front bearing plate 516, and the rear bearing plate 554 so as to be rotatable around the axis and the input side first and second clutch mechanisms 60(1) and 60(2) are supported by the main driving shaft 212 in the front housing body 512. A relay cylinder portion 516a for supplying/discharging pressure oil to/from the input side first and second clutch mechanisms 60(1) and 60(2) is integrally formed in the front bearing plate 516 fitted onto the main driving shaft 212. To the relay cylinder portion 516a, the input side first and second supply/discharge lines 360(1) and 360(2) illustrated in FIG. 16 described above are connected using a means, such as a pipe.

The variable input shaft 31 is configured as a hollow shaft integrally formed in a rotation center portion of the driven gear 216b and the front end side is supported by the front supporting wall 514 so as to be rotatable around the axis.

In a sun gear shaft 32a integrally having the sun gear 32 on the rear end side, the front end side is inserted into the rear end side of the variable input shaft 31 to be spline-coupled therewith and the intermediate poartion in the axial direction relatively rotatably supports the input side second driven gear 54(2).

The speed change intermediate shaft 43 is disposed coaxially with the variable input shaft 31 and the sun gear shaft 32a. The speed change intermediate shaft 43 integrally has the carrier 38 on the front end side and the carrier 38 is coupled with the input side second driven gear 54(2) through a bolt. Thus, the front end side of the speed change intermediate shaft 43 is supported by the front bearing plate 516 through the sun gear shaft 32a and the speed change input shaft 31 so as to be rotatable around the axis and the rear end side of the speed change intermediate shaft 43 is supported by the rear bearing plate 554 so as to be rotatable around the axis.

The hollow speed change transmission shaft 44 externally inserted into the speed change intermediate shaft 43 in a relatively rotatable manner integrally has the internal gear 36 in a front end portion, the front end side thereof is supported by the front supporting wall 514 through the speed change intermediate shaft 43, and the rear end side thereof is supported by the front bearing plate 516. Then, the output side third driving gear 72(3), the input side first driven gear 54(1), and the output side second driving gear 72(2) are spline-fitted onto the outer periphery of an intermediate portion reaching the front bearing plate 516 from the internal gear 36 of the speed change transmission shaft 44.

The speed change output shaft 45 is supported by the second supporting wall 518, the rear bearing plate 554, and the rear supporting wall 556 so as to be rotatable around the axis. The first traveling transmission shaft 235 is supported by the rear bearing plate 554 and the rear supporting wall 556 so as to be rotatable around the axis.

The speed change output shaft 45 supports the output side third clutch mechanism 80(3) on the front end side, supports the output side first and second clutch mechanisms 80(1) and 80(2) in an intermediate portion, and supports the clutch mechanism of the forward/reverse movement switching mechanism 230 on the rear end side, respectively. The hydraulic friction plate clutch unit is used also for the clutch mechanism of the forward/reverse movement switching mechanism 230. A relay cylinder portion 556a for supplying/discharging pressure oil to/from the five clutch mechanisms arranged on the speed change output shaft 45 is mounted on the rear supporting wall 556 and fitted to a rear end portion of the speed change output shaft 45.

In a rear half portion not illustrated of the rear housing 550, the differential mechanism 260, the PTO clutch mechanism 285, and the PTO multistage speed change mechanism 290 are housed.

In this embodiment, although the input side first and second clutch mechanisms 60(1) and 60(2) and the output side first to third clutch mechanisms 80(1) to 80(3) are all configured as the friction plate type, some or all thereof can be configured as the dog clutch type.

Figure 26:
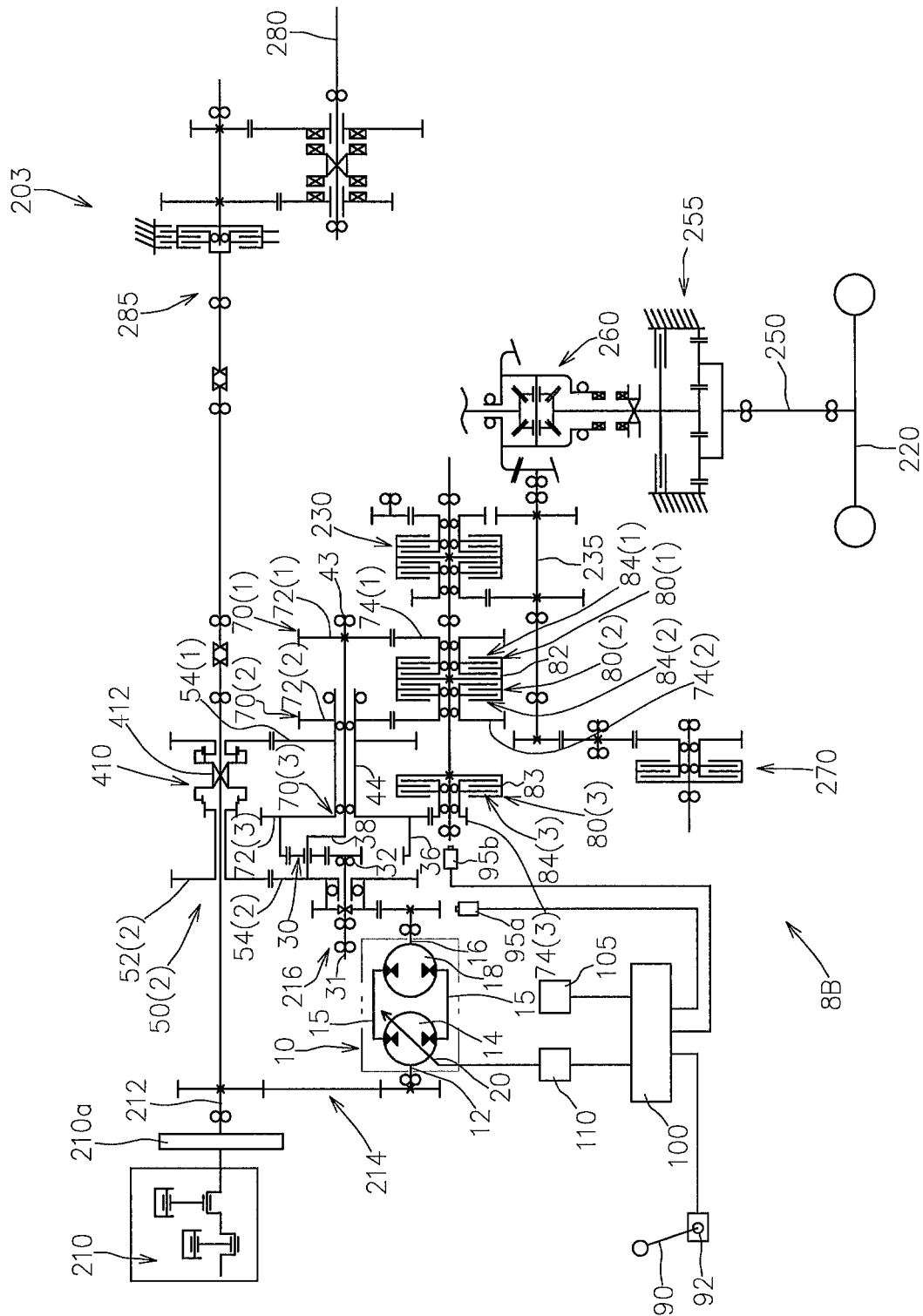
FIG. 26 is a transmission schematic view of a working vehicle to which a transmission structure according to a modification of the embodiment 8 is applied.

FIG. 26 illustrates a transmission schematic view of a working vehicle 203 to which a transmission structure 8B according to a modification of this embodiment provided with the input side clutch unit 410 of the dog clutch type in place of the input side first and second clutch mechanisms 60(1) and 60(2) of the friction plate type is applied.

Embodiment 9

Hereinafter, further yet still another embodiment of the transmission structure according to the present invention is described with reference to the accompanying drawings.

Figure 27:
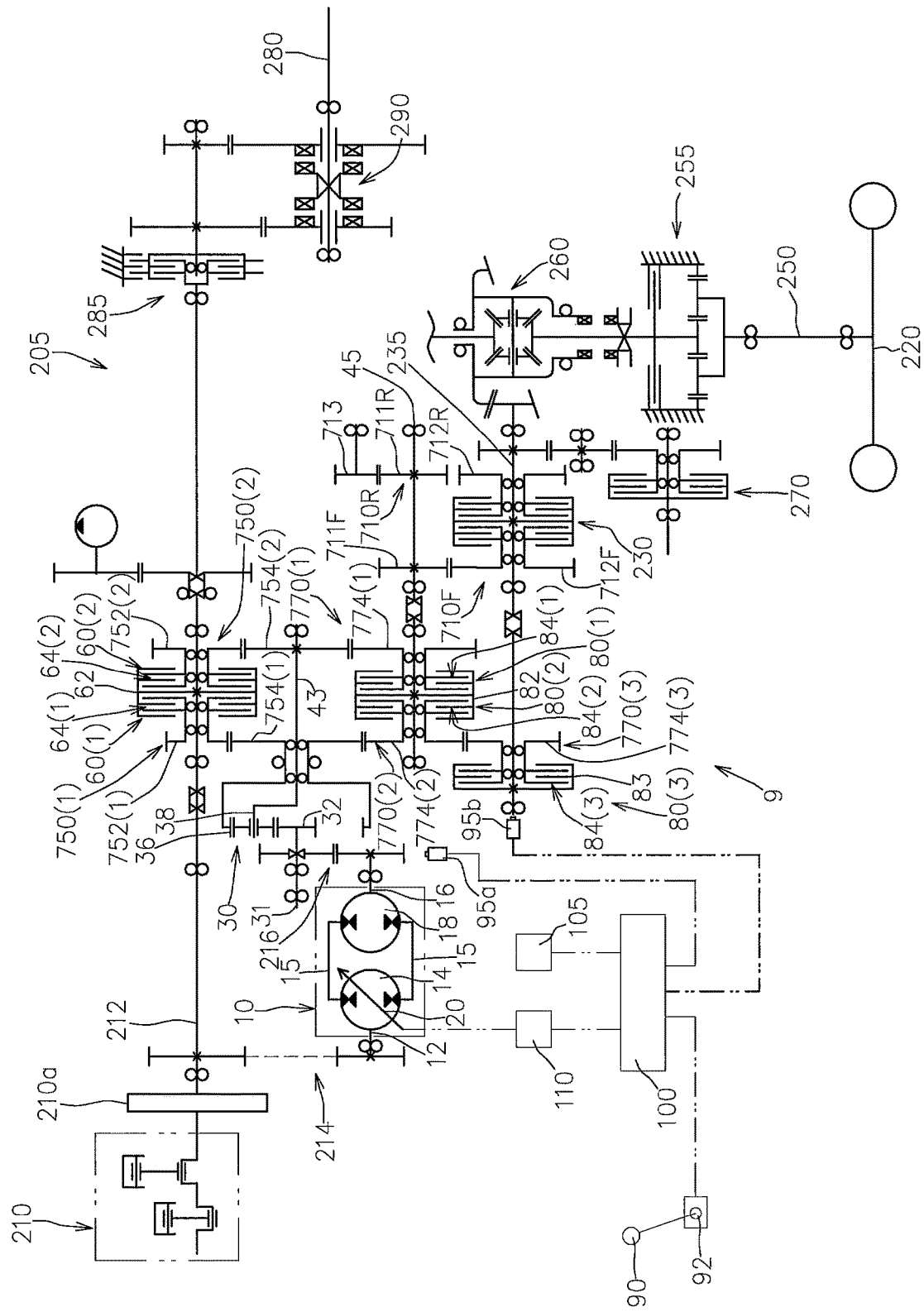
FIG. 27 is a transmission schematic view of a working vehicle to which a transmission structure according to an embodiment 9 of the present invention is applied.

FIG. 27 illustrates a transmission schematic view of a working vehicle 205 to which the transmission structure 9 according to this embodiment is applied.

Figure 28:
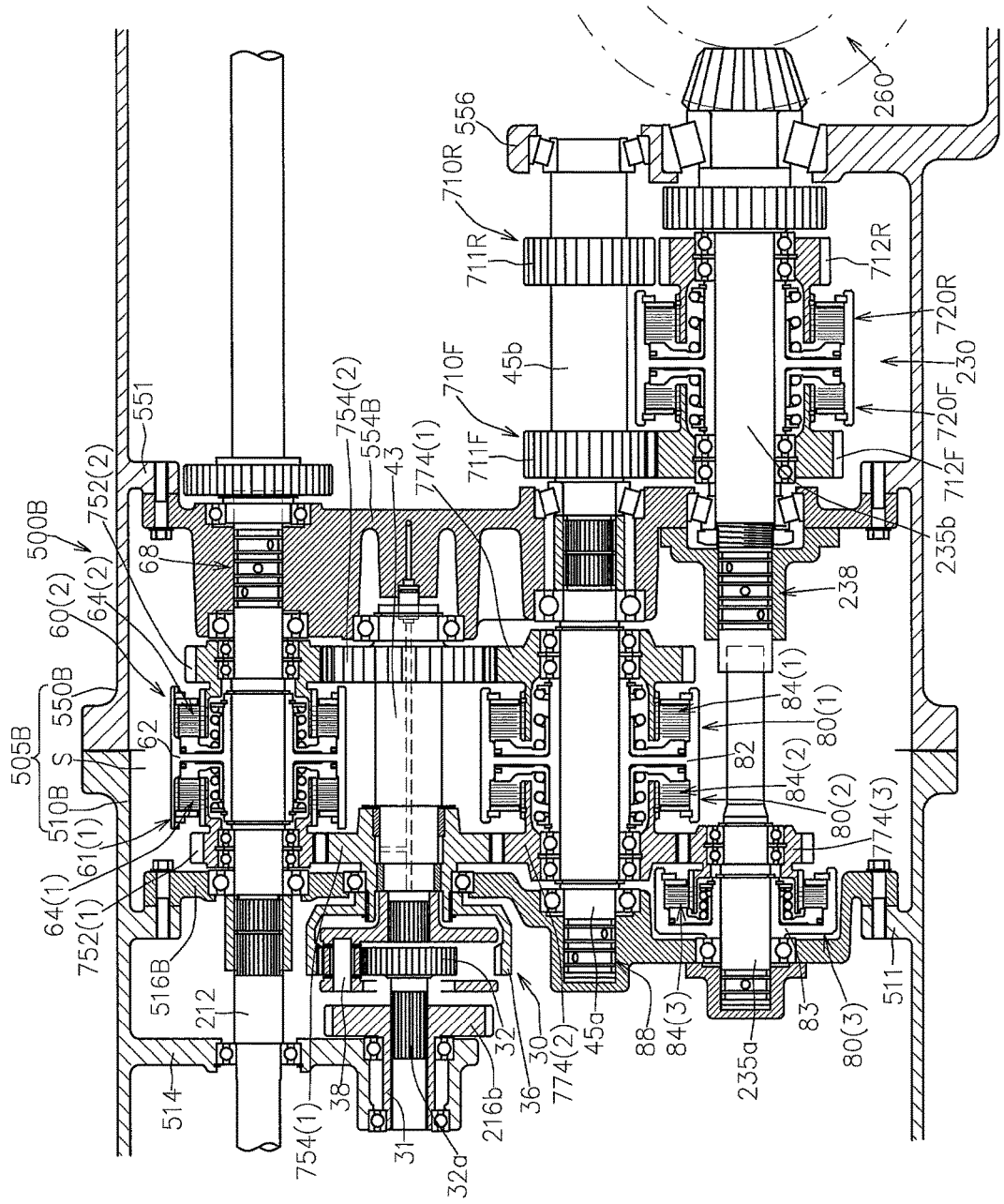
FIG. 28 is a partial vertical cross-sectional side view of the working vehicle shown in FIG. 27.

FIG. 28 illustrates a partial vertical cross-sectional side view of the working vehicle 205.

In the figures, the same components as those in Embodiments described above are designated by the same reference numerals and a description thereof is omitted as appropriate.

The transmission structure 9 according to this embodiment is common to the transmission structure 8 according to Embodiment 8 described above in the point of having the output side first to third clutch mechanisms 80(1) to 80(3).

Meanwhile, the transmission structure 9 is different from the transmission structure 8 according to Embodiment 8 described above in the following point.

More specifically, the transmission structure 8 according to Embodiment 8 described above is configured so that the rotation power is transmitted to the traveling transmission shaft 235 through the forward/reverse movement switching mechanism 230 in all the first to third transmission states developed according to the engagement states of the output side first to third clutch mechanisms 80(1) to 80(3).

In contrast thereto, the transmission structure 9 according to this embodiment is configured so that, while the rotation power is transmitted to the traveling transmission shaft 235 through the forward/reverse movement switching mechanism 230 in the first and second transmission states developed according to the engagement states of the output side first and second clutch mechanisms 80(1) and 80(2), the rotation power in the forward movement direction is transmitted to the traveling transmission shaft 235 without via the forward/reverse movement switching mechanism 230 in the third transmission state developed in the engagement state of the output side third clutch mechanism 80(3).

In detail, as illustrated in FIG. 27, the transmission structure 9 is provided with the HST 10 and the planetary gear mechanism 30, the input side first transmission mechanism 750(1) capable of operatively transmitting the rotation power of the driving source 210 to the first element (the internal gear 36 in this embodiment) at the input side first speed change ratio and the input side second transmission mechanism 750(2) capable of operatively transmitting the rotation power of the driving source 210 to the second element (the carrier 38 in this embodiment) at the input side second speed change ratio, the input side first and second clutch mechanisms 60(1) and 60(2), the speed change output shaft 45 and the traveling transmission shaft 235, the forward/reverse movement switching mechanism 230, an output side first transmission mechanism 770(1) capable of operatively transmitting the rotation power of the second element at the output side first speed change ratio to the speed change output shaft 45, an output side second transmission mechanism 770(2) capable of operatively transmitting the rotation power of the first element at the output side second speed change ratio to the speed change output shaft 45, an output side third transmission mechanism 770(3) capable of operatively transmitting the rotation power of the first element as the driving force in the forward movement direction to the traveling transmission shaft 235, the output side first to third clutch mechanisms 80(1) to 80(3), the speed change operation member 90, the HST sensor 95a, and the control device 100.

As illustrated in FIG. 27 and FIG. 28, the transmission structure 9 further has the speed change intermediate shaft 43 coupled with the second element (the carrier 38 in this embodiment) so as not to be relatively rotatable around the axis.

Moreover, the transmission structure 9 has an output sensor 95b directly or indirectly detecting the rotational speed of the traveling transmission shaft 235.

The input side first transmission mechanism 750(1) has an input side first driving gear 752(1) relatively rotatably supported by the main driving shaft 212 operatively coupled with the driving source 210 and an input side first driven gear 754(1) operatively coupled with the input side first driving gear 752(1) and the first element (the internal gear 36 in this embodiment) in a state of being relatively rotatably supported by the speed change intermediate shaft 43.

The input side second transmission mechanism 750(2) has an input side second driving gear 752(2) relatively rotatably supported by the main driving shaft 212 and an input side second driven gear 754(2) operatively coupled with the input side second driving gear 752(2) in a state of being supported by the speed change intermediate shaft 43 so as not to be relatively rotatable, in which the rotation power of the main driving shaft 212 is operatively transmitted to the second element (the carrier 38 in this embodiment) through the speed change intermediate shaft 43.

In this case, as illustrated in FIG. 27 and FIG. 28, the input side first and second clutch mechanisms 60(1) and 60(2) are supported by the main driving shaft 212 so as to engage/disengage the input side first and second driving gears 752(1) and 752(2), respectively, with/from the main driving shaft 212.

More specifically, in this embodiment, the input side first clutch mechanism 60(1) is configured to have the input side clutch housing 62 supported by the main driving shaft 212 so as not to be relatively rotatable, an input side first friction plate group 64(1) containing a first driving side friction plate supported by the input side clutch housing 62 so as not to be relatively rotatable and a first driven side friction plate supported by the input side first driving gear 752(1) so as not to be relatively rotatable in a state of being opposed to the first driving side friction plate, and an input side first piston (not illustrated) frictionally engaging the input side first friction plate group 64(1).

The input side second clutch mechanism 60(2) is configured to have the input side clutch housing 62, an input side second friction plate group 64(2) containing a second driving side friction plate supported by the input side clutch housing 62 so as not to be relatively rotatable and a second driven side friction plate supported by the input side second driving gear 752(2) so as not to be relatively rotatable in a state of being opposed to the second driving side friction plate, and an input side second piston (not illustrated) frictionally engaging the input side second friction plate group 64(2).

In this embodiment, the output side first transmission mechanism 770(1) is configured to be able to operatively transmit the rotation power of the second element to the speed change output shaft 45 utilizing the input side second driven gear 754(2) in the input side second transmission mechanism 750(2).

In detail, as illustrated in FIG. 27 and FIG. 28, the output side first transmission mechanism 770(1) has an output side first driven gear 774(1) operatively coupled with the input side second driven gear 754(2) in a state of being relatively rotatably supported by the speed change output shaft 45.

The output side second transmission mechanism 770(2) is configured to be able to operatively transmit the rotation power of the first element to the speed change output shaft 45 utilizing the input side first driven gear 754(2) in the input side first transmission mechanism 750(1).

In detail, as illustrated in FIG. 27 and FIG. 28, the output side second transmission mechanism 770(2) has an output side second driven gear 774(2) operatively coupled with the input side first driven gear 754(1) in a state of being relatively rotatably supported by the speed change output shaft 45.

In this case, as illustrated in FIG. 27 and FIG. 28, the output side first and second clutch mechanisms 80(1) and 80(2) are supported by the speed change output shaft 45 so as to engage/disengage the output side first and second driven gears 774(1) and 774(2), respectively, with/from the speed change output shaft 45.

More specifically, in this embodiment, the output side first clutch mechanism 80(1) is configured to have an output side clutch housing 82 supported by the speed change output shaft 45 so as not to be relatively rotatable, an output side first friction plate group 84(1) containing a first driving side friction plate supported by the output side first driven gear 774(1) so as not to be relatively rotatable and a first driven side friction plate supported by the output side clutch housing 82 so as not to be relatively rotatable in a state of being opposed to the first driving side friction plate, and an output side first piston (not illustrated) frictionally engaging the output side first friction plate group 84(1).

The output side second clutch mechanism 80(2) is configured to have the output side clutch housing 82, an output side second friction plate group 84(2) containing a second driving side friction plate supported by the output side second driven gear 774(2) so as not to be relatively rotatable and a second driven side friction plate supported by the output side clutch housing 82 so as not to be relatively rotatable in a state of being opposed to the second driving side friction plate, and an output side second piston (not illustrated) frictionally engaging the output side second friction plate group 84(2).

In the output side third transmission mechanism 770(3), the speed change ratio is set so that the rotational speed of the traveling transmission shaft 235 at the timing when the rotation power of the first element is operatively transmitted to the traveling transmission shaft 235 through the output side third transmission mechanism 770(3) is higher than the rotational speed of the traveling transmission shaft 235 at the timing when the rotation power of the first element is operatively transmitted to the traveling transmission shaft 235 through the output side second transmission mechanism 770(2) and the forward/reverse movement switching mechanism 230 in the forward movement transmission state.

In this embodiment, the output side third transmission mechanism 770(3) is configured to be able to operatively transmit the rotation power of the first element to the traveling transmission shaft 235 utilizing the output side second driven gear 774(2) in the output side second transmission mechanism 770(2).

In detail, as illustrated in FIG. 27 and FIG. 28, the output side third transmission mechanism 770(3) has an output side third driven gear 774(3) operatively coupled with the output side second driven gear 774(2) in a state of relatively rotatably being supported by the traveling transmission shaft 235.

In this case, as illustrated in FIG. 27 and FIG. 28, the output side third clutch mechanism 80(3) is supported by the traveling transmission shaft 235 so as to engage/disengage the output side third driven gear 774(3) with/from the traveling transmission shaft 235.

More specifically, in this embodiment, the output side third clutch mechanism 80(3) is configured to have the output side clutch housing 83 supported by the traveling transmission shaft 235 so as not to be relatively rotatable, an output side third friction plate group 84(3) containing a third driving side friction plate supported by the output side third driven gear 774(3) so as not to be relatively rotatable and a third driven side friction plate supported by the output side clutch housing 83 so as not to be relatively rotatable in a state of being opposed to the third driving side friction plate, and an output side third piston (not illustrated) frictionally engaging the output side third friction plate group 84(3).

The output side third driven gear 774(3) can also be operatively coupled with the output side first driven gear 774(1) in place of the output side second driven gear 774(2).

More specifically, the output side third transmission mechanism 770(3) can also be modified so as to operatively transmit the rotation power of the first element to the traveling transmission shaft 235 utilizing the output side first driven gear 774(1) in the output side first transmission mechanism 770(1).

Figure 29:
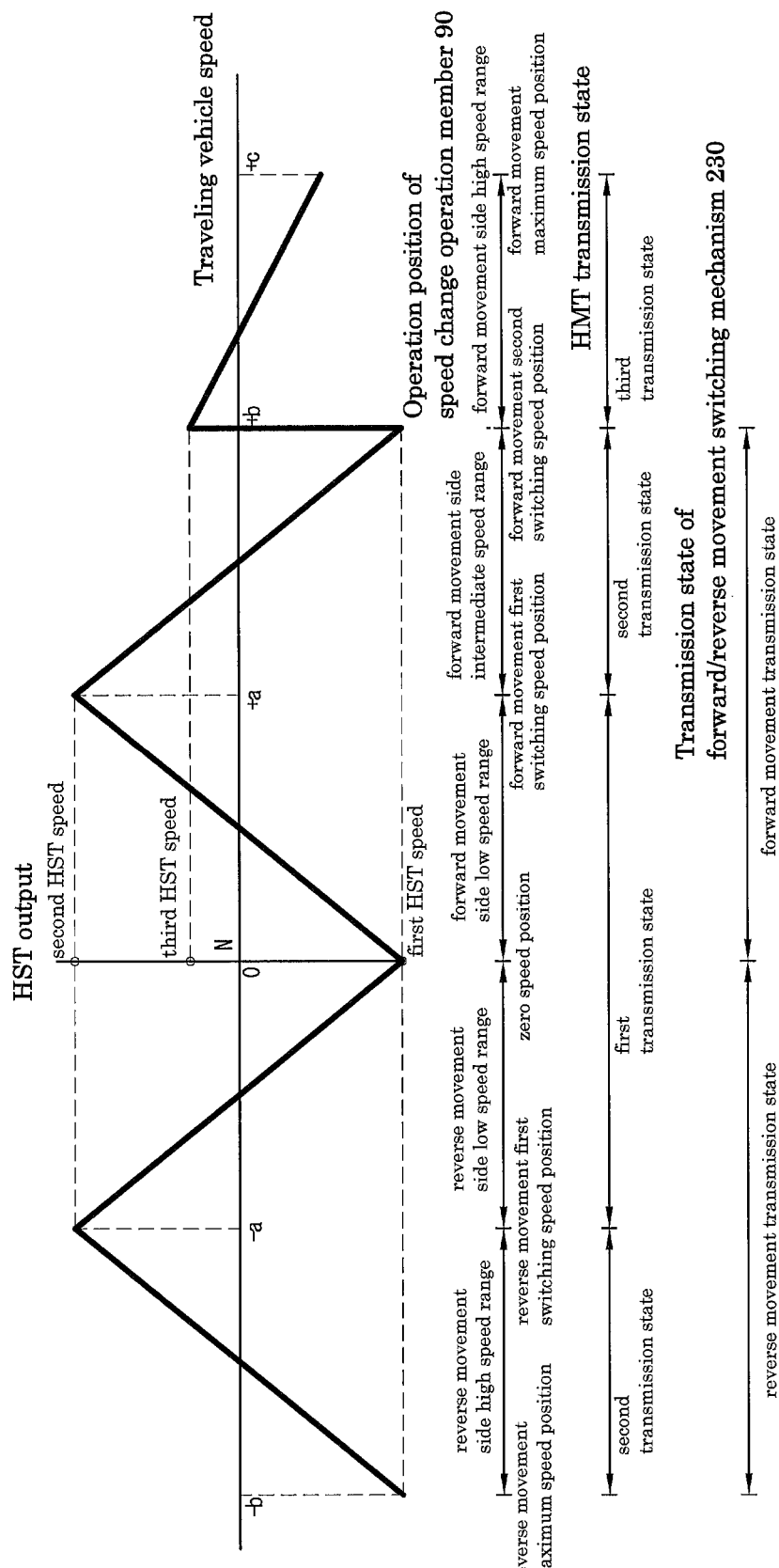
FIG. 29 is a graph illustrating the relationship between the traveling vehicle speed and the HST output in the working vehicle shown in FIG. 27.

FIG. 29 illustrates a graph illustrating the relationship between the traveling vehicle speed and the HST output in the working vehicle 205 to which the transmission structure 9 according to this embodiment is applied.

As illustrated in FIG. 29, the control device 100 in this embodiment operates the output adjustment member 20 so that the HST output is set to the first HST speed setting the synthetic rotation power of the planetary gear mechanism 30 to zero in response to an operation to the zero speed position of the speed change operation member 90, when the speed change operation member 90 is operated in a forward movement side low speed range between the zero speed position and the forward movement side first switching speed position, while the control device 100 develops a first transmission state where the first element is functioned as the reference power input portion operatively transmitted from the driving source 210 and the second element is functioned as the output portion of synthetic rotation power, so that the synthetic rotation power output from the second element is operatively transmitted to the speed change output shaft 45 by bringing the output side first clutch mechanism 80(1) into the engagement state and bringing the other output side clutch mechanisms 80(2) and 80(3) into the disengagement state while bringing the input side first clutch mechanism 60(1) into the engagement state and bringing the input side second clutch mechanism 60(2) into the disengagement state, the control device 100 brings the forward/reverse movement switching mechanism 230 into the forward movement transmission state and the control device 100 operates the output adjustment member 20 so that the HST output is speed-changed from the side of the first HST speed toward the side of the second HST speed in response to the acceleration operation of the speed change operation member 90, when the speed change operation member 90 is operated in a forward movement side intermediate speed range between the forward movement side first switching speed position and the forward movement side second switching speed position, while the control device develops a second transmission state where the second element is functioned as the reference power input portion and the first element is functioned as the output portion of synthetic rotation power, so that the synthetic rotation power output from the first element is operatively transmitted to the speed change output shaft 45 by bringing the output side second clutch mechanism 80(2) into the engagement state and bringing the other output side clutch mechanisms 80(1) and 80(3) into the disengagement state while bringing the input side first clutch mechanism 60(1) into the disengagement state and bringing the input side second clutch mechanism 60(2) into the engagement state, the control device 100 brings the forward/reverse movement switching mechanism 230 into the forward movement transmission state and the control device 100 operates the output adjustment member 20 so that the HST output is speed-changed from the side of the second HST speed toward the side of the first HST speed in response to the acceleration operation of the speed change operation member 90, when the speed change operation member 90 is operated in a forward movement side high speed range beyond the forward movement side second switching speed position, while the control device 100 develops a third transmission state where the second element is functioned as the reference power input portion and the first element is functioned as the output unit of synthetic rotation power, so that the synthetic rotation power output from the first element is operatively transmitted to the traveling transmission shaft 235 as driving force in the forward movement direction through the output side third transmission mechanism 770(3) by bringing the output side third clutch mechanism 80(3) into the engagement state and bringing the other output side clutch mechanisms 80(1) and 80(3) into the disengagement state while bringing the input side first clutch mechanism 60(1) into the disengagement state and bringing the input side second clutch mechanism 60(2) into the engagement state, the control device 100 operates the output adjustment member 20 so that the HST output is speed-changed from the side of the second HST speed toward the side of the first HST speed in response to the acceleration operation of the speed change operation member 90, when the speed change operation member 90 passes a forward movement side second switching speed position between the forward movement side intermediate speed range and the forward movement side high speed range, the control device 100 operates the output adjustment member 20 so that the rotational speed of the traveling transmission shaft 235 in a transmission state developed immediately after the passage coincides with or approaches the rotational speed of the traveling transmission shaft 235 in a transmission state developed immediately before the passage, when the speed change operation member 90 is operated in a reverse movement side low speed range between the zero speed and a reverse movement side first switching speed position, while the control device 100 develops the first transmission state, the control device brings the forward/reverse movement switching mechanism 230 into the reverse movement transmission state and the control device 100 operates the output adjustment member 20 so that the HST output is speed-changed from the side of the first HST speed toward the side of the second HST speed in response to the acceleration operation of the speed change operation member 90, and when the speed change operation member 90 is operated in a reverse movement side high speed range beyond the reverse movement side first switching speed position, while the control device 100 develops the second transmission state, the control device 100 brings the forward/reverse movement switching mechanism 230 into the reverse movement transmission state and the control device 100 operates the output adjustment member 20 so that the HST output is speed-changed from the side of the second HST speed toward the side of the first HST speed in response to the acceleration operation of the speed change operation member 90.

In the same manner as in Embodiment 1, the input side first speed change ratio of the input side first transmission mechanism 750(1) and the second speed change ratio of the input side second transmission mechanism 750(2) are set so that the rotational speed of the second element (the carrier 38 in this embodiment) when the HST output is set to the second HST speed in the first transmission state and the rotational speed of the second element by the rotation power transmitted through the input side second transmission mechanism 750(2) in the second transmission state are the same and so that the rotational speed of the first element (the internal gear 36 in this embodiment) when the HST output is set to the second HST speed in the second transmission state and the rotational speed of the first element by the rotation power transmitted through the input side first transmission mechanism 750(1) in the first transmission state are the same.

As illustrated in FIG. 29, the output side first speed change ratio of the output side first transmission mechanism 770(1) and the output side second speed change ratio of the output side second transmission mechanism 770(2) are set so that the rotational speed developed in the speed change output shaft 45 when the HST output is set to the second HST speed is same in the first and second transmission states.

Then, as described above, when the speed change operation member 90 passes the forward movement side second switching speed position between the forward movement side intermediate speed range and the forward movement side high speed range, the control device 100 operates the output adjustment member 20 so that the rotational speed of the traveling transmission shaft 235 in a transmission state developed immediately after the passage coincides with or approaches the rotational speed of the traveling transmission shaft 235 in a transmission state developed before the passage.

More specifically, when the speed change operation member 90 is operated in the acceleration direction in the forward movement side intermediate speed range (second transmission state), passes the forward movement side second switching speed position, and then enters the forward movement side high speed range, while the control device 100 shifts the output side second clutch mechanism 80(2) from the engagement state to the disengagement state and shifts the output side third clutch mechanism 80(3) shifted from the disengagement state to the engagement state to perform switching from the second transmission state to the third transmission state, the control device 100 operates the output adjustment member 20 so that the output of the HST 10 is speed-changed from the rotational speed (first HST speed) setting the traveling vehicle speed to +b under the second transmission state to the rotational speed (third HST speed) setting the traveling vehicle speed to +b or speed therearound under the third transmission state.

When the speed change operation member 90 is operated in the deceleration direction in the forward movement side high speed range (third transmission state), passes the forward movement side second switching speed position, and then enters the forward movement side intermediate speed range, while the control device 100 shifts the output side third clutch mechanism 80(3) from the engagement state to the disengagement state and shifts the output side second clutch mechanism 80(2) from the disengagement state to the engagement state to perform switching from the third transmission state to the second transmission state, the control device 100 operates the output adjustment member 20 so that the output of the HST 10 is speed-changed from the rotational speed (third HST speed) setting the traveling vehicle speed to +b under the third transmission state to the rotational speed (first HST speed) setting the traveling vehicle speed to +b or speed therearound under the second transmission state.

The transmission structure 9 having such a configuration can further extend the speed changeable range (speed change region) on the forward movement side while obtaining the same effects as those of the transmission structure 1 according to Embodiment 1.

In this embodiment, the output side first and second speed change ratios are set so that the traveling vehicle speed when the HST output is set to the second HST speed is same in the first and second transmission states as described above. However, in place of the setting, a configuration may be acceptable in which the control device 100 operates the output adjustment member 20 so that, in the switching between the first and second transmission states, the traveling vehicle speed in a transmission state after the switching coincides with or approaches the traveling vehicle speed in the transmission state after the switching.

The transmission structure 9 according to this embodiment is housed in a housing structure 500B in the working vehicle 205.

As illustrated in FIG. 28, the housing structure 500B is provided with a hollow housing body 505B, a first bearing plate 516B detachably coupled with the hollow housing body 505B, and a second bearing plate 554B detachably coupled with the housing body 505B at a position spaced from the first bearing plate 516B in the longitudinal direction of the housing body 505B and forming a partitioned space S between the first bearing plates 516B and the second bearing plate 554B.

In this embodiment, the housing body 505B has a front housing body 510B and a rear housing body 550B detachably connected in series.

The first bearing plate 516B is detachably coupled with a boss portion 511 provided in the inner surface of the front housing body 510B near a rear opening of the front housing body 510B and the second bearing plate 554B is detachably coupled with a boss portion 551 provided in the inner surface of the rear housing body 550B near a front opening of the rear housing body 550B.

As illustrated in FIG. 28, the main driving shaft 212, the speed change intermediate shaft 43, the speed change output shaft 45, and the traveling transmission shaft 235 are supported by the first and second bearing plates 516B and 554B in a state of being parallel to one another and disposed along the longitudinal direction of the housing body 505B.

The input side first and second driving gears 752(1) and 752(2) and the input side first and second clutch mechanisms 60(1) and 60(2) are supported in a portion located in the partitioned space S of the main driving shafts 212 in a state where the input side first and second clutch mechanisms 60(1) and 60(2) are located between the input side first and second driving gears 752(1) and 752(2) with respect to the axial direction of the main driving shaft 212.

The input side first and second driven gears 754(1) and 754(2) are supported in a portion located in the partitioned space S of the speed change intermediate shaft 43 in a state of being located at the same positions as those of the input side first and second driving gears 752(1) and 752(2), respectively, with respect to the axial direction.

The output side first and second driven gears 774(1) and 774(2) and the output side first and second clutch mechanisms 80(1) and 80(2) are supported in a portion located in the partitioned space S of the speed change output shaft 45 in a state where the output side first and second driven gears 774(1) and 774(2) are located at the same positions as those of the input side second and first driven gears 754(2) and 754(1), respectively, with respect to the axial direction and the output side first and second clutch mechanisms 80(1) and 80(2) are located between the input side first and second driven gears 774(1) and 774(2) with respect to the axial direction.

The output side third driven gear 774(3) and the output side third clutch mechanism 80(3) are supported in a portion located in the partitioned space S of the traveling transmission shaft 235 in a state where the output side third driven gear 774(3) is located at the same position in the axial direction as that of the output side second driven gear 774(2) and the output side third clutch mechanism 80(3) is located on the far side of the output side second driven gear 774(2) from the output side first and second clutch mechanisms 80(1) and 80(2) with respect to the axial direction.

The forward/reverse movement switching mechanism 230 is supported in a portion located outside the partitioned space S of the speed change output shaft 45 and the traveling transmission shaft 235.

In detail, as illustrated in FIG. 27 and FIG. 28, the forward/reverse movement switching mechanism 230 has a forward movement side gear train 710F containing a forward movement side driving gear 711F supported by the speed change output shaft 44 and a forward movement side driven gear 712F supported by the traveling transmission shaft 235 and meshed with the forward movement side driving gear 711F, a reverse movement side gear train 710R containing a reverse movement side driving gear 231R supported by the speed change output shaft 45 and a reverse movement side driven gear 712R supported by the traveling transmission shaft 235 and meshed with the reverse movement side driving gear 711R through an idle gear 713 (see FIG. 27), a forward movement side clutch mechanism 720F engaging/disengaging the power transmission in the forward direction from the speed change output shaft 45 to the traveling transmission shaft 235 through the forward movement side gear train 710F, and a reverse movement side clutch mechanism 720R engaging/disengaging the power transmission in the reverse movement direction from the speed change output shaft 45 to the traveling transmission shaft 235 through the reverse movement side gear train 710R.

As illustrated in FIG. 28, in this embodiment, the forward movement side driving gear 711F is supported in a rear portion extended rearward relative to the second bearing plate 554B of the speed change output shaft 45 so as not to be relatively rotatable and the reverse movement side driving gear 711R is supported in a rear portion of the speed change output shaft 45 so as not to be relatively rotatable at a position spaced from the forward movement side driving gear 711F in the axial direction.

In this embodiment, the speed change output shaft 45 has a first speed change output shaft 45a located on the front side and a second speed change output shaft 45b located on the rear side and coupled coaxially with the first speed change output shaft 45a so as not to be relatively rotatable around the axis, in which the second speed change output shaft 45b forms the rear portion of the speed change output shaft 45.

The forward movement side driven gear 712F is relatively rotatably supported in a rear portion extended rearward relative to the second bearing plate 554B of the traveling transmission shaft 235 at the same position as that of the forward movement side driving gear 711F with respect to the axial direction.

The reverse movement side driven gear 712R is relatively rotatably supported in a rear portion of the traveling transmission shaft 235 at the same position as that of the reverse movement side driving gear 711R with respect to the axial direction.

Then, the forward movement side and reverse movement side clutch mechanisms 720F and 720R are supported in the rear portion of the traveling transmission shaft 235 in a state of being located between the forward movement side driven gear 712F and the reverse movement side driven gear 712R with respect to the axial direction.

In this embodiment, the traveling transmission shaft 235 has a first traveling transmission shaft 235a located on the front side and a second traveling transmission shaft 235b located on the rear side and coupled coaxially with the first traveling transmission shaft 235a so as not to be relatively rotatable around the axis, in which the second traveling transmission shaft 235b forms the rear portion of the traveling transmission shaft 235.

By having such a housing structure, the transmission structure 9 according to this embodiment can effectively achieve a reduction in the number of used gears and the size.

As described above, in this embodiment, the output side third driven gear 774(3) is located at the same position as that of the output side second driven gear 774(2) with respect to the axial direction and is meshed with the output side second driven gear 774(2).

In place of the configuration, the output side third driven gear 774(3) may be located at the same position as that of the output side first driven gear 774(1) with respect to the axial direction and meshed with the output side first driven gear 774(1). In this case, the output side third clutch mechanism 80(3) is supported in a portion located in the partitioned space S of the traveling transmission shaft 235 in a state of being located on the far side of the output side first driven gear 774(1) from the output side first and second clutch mechanisms 80(1) and 80(2) with respect to the axial direction.

As illustrated in FIG. 28, in this embodiment, a rotary joint 68 for supplying/discharging hydraulic oil to the input side first and second clutch mechanisms 60(1) and 60(2) is provided in the main driving shaft 212 and a bearing portion of the main driving shaft 212 in the second bearing plate 554B.

Moreover, a rotary joint 88 for supplying/discharging hydraulic oil to the output side first and second clutch mechanisms 80(1) and 80(2) is provided in the speed change output shaft 45 and a bearing portion of the speed change output shaft 45 in the first bearing plate 516B.

Furthermore, a rotary joint 238 for supplying/discharging hydraulic oil to/from the output side third clutch mechanism 80(3), the forward movement side clutch mechanism 720F, and the reverse movement side clutch mechanism 720R is provided in the traveling transmission shaft 235 and a relay cylinder portion 555 mounted in the second bearing plate 554B.

The invention claimed is:

1. A transmission structure interposed in a traveling system transmission path from a driving source until a traveling device of a vehicle, the transmission structure comprising:
   an Hydrostatic Transmission (HST) configured to continuously change rotation power operatively input from the driving source to rotation power at least between a first HST speed and a second HST speed;
   a planetary gear mechanism having first, second and third elements, in which the third element functions as an input portion of the HST output;
   an input side first transmission mechanism operatively coupled with the first element and capable of inputting the rotation power from the driving source;
   an output side first transmission mechanism operatively coupled with the second element and capable of outputting the rotation power to the traveling device;
   an input side second transmission mechanism operatively coupled with the second element and capable of inputting the rotation power from the driving source;
   an output side second transmission mechanism operatively coupled with the first element and capable of outputting the rotation power to the traveling device;
   a speed change operation member capable of setting a traveling speed in a forward movement; and
   a control device performing operation control of the HST, the input side first and second transmission mechanisms and the output side first and second transmission mechanisms upon receipt of a signal from the speed change operation member,
   wherein when the speed change operation member is positioned at a zero speed position, the control device controls the HST so that the HST output has the first HST speed that brings the planetary gear mechanism into a synthetic rotation power zero speed state while developing a first transmission state where the first element functions as an input portion of the rotation power from the driving source and the second element functions as an output portion of outputting rotation power to the traveling device by bringing the input side first transmission mechanism and the output side first transmission mechanism into an engagement state and bringing the input side second transmission mechanism and the output side second transmission mechanism into a disengagement state, wherein when the speed change operation member is operated in a range from the zero speed position to a first traveling speed in the forward movement, the control device operates the HST so that the HST output is speed-changed from the first HST speed toward the second HST speed in response to an acceleration operation in the forward movement of the speed change operation member while developing the first transmission state, wherein when the speed change operation member is operated in a range from the first traveling speed to a second traveling speed in the forward movement, the control device operates the HST so that the HST output is speed-changed from the second HST speed toward the first HST speed in response to an acceleration operation in the forward movement of the speed change operation member while developing a second transmission state where the first element functions as the output portion of outputting rotation power to the traveling device and the second element functions as the input portion of the rotation power from the driving source by bringing the input side first transmission mechanism and the output side first transmission mechanism into a disengagement state and bringing the input side second transmission mechanism and the output side transmission mechanism into an engagement state, and wherein speed change ratios of the input side first and second transmission mechanisms are set so that when the HST output has the second HST speed, the rotational speeds developed in the second elements in the first and second transmission states substantially coincides with each other and the rotational speeds developed in the first elements in the first and second transmission states substantially coincides with each other.

2. The transmission structure according to claim 1, wherein speed change ratios of the output side first and second transmission mechanisms are set so that when the HST output has the second HST speed, the rotational speeds developed in the traveling device in the first and second transmission states substantially coincides with each other.

3. The transmission structure according to claim 2, wherein in a switching transition stage between the first and second transmission states, the control device develop a double transmission state in which both the input side first and second transmission mechanisms are brought into the engagement state and both the output side first and second transmission mechanisms are brought into the engagement state.

4. The transmission structure according to claim 1, wherein in switching between the first and second transmission states, the control device operates the HST so that rotational speed developed in the traveling device in a transmission state after the switching substantially coincides with rotational speed developed in the traveling device in a transmission state before the switching.

5. The transmission structure according to claim 1, wherein the input side first and second transmission mechanisms and the output side first and second transmission mechanisms each include a clutch unit, and wherein at least one of the input side clutch units and at least one of the output side clutch units are configured as a hydraulic friction plate type in which a clutch engagement state is developed through a sliding engagement state by receiving pressure oil supply.

6. The transmission structure according to claim 5, further comprising:

a pressure oil supply line receiving pressure oil supply from a hydraulic source;

first and second supply/discharge lines supplying/discharging pressure oil to the input side and output side clutch units of the hydraulic friction plate type, respectively;

first and second electromagnetic valves which are interposed in the first and second supply/discharge lines, respectively, and which can take a discharge position where a corresponding supply/discharge line is drained and a supply position where a corresponding supply/discharge line is fluid-connected to the pressure oil supply line; and a clutch engagement detection unit detecting an engagement state of the clutch units of the hydraulic friction plate type, wherein when in switching between the first and second transmission states, the control device moves the electromagnetic valve located at the discharge position at time before the switching from the discharge position to the supply position while maintaining the electromagnetic valve located at the supply position at the time before the switching at the supply position in the switching between the first and second transmission states, and then moves the electromagnetic valve located at the supply position at the time before the switching from the supply position to the discharge position when the control device recognizes that the clutch unit to which pressure oil is supplied through the electromagnetic valve, a position of which is moved from the discharge position to the supply position, is brought into the engagement state based on a signal from the clutch engagement detection unit.

7. The transmission structure according to claim 1 further comprising:

a speed change output shaft operatively receiving rotation power from the output side first and second transmission mechanisms;

a traveling transmission shaft operatively coupled with the traveling device; and a forward/reverse movement switching mechanism disposed between the speed change output shaft and the traveling transmission shaft.

8. The transmission structure according to claim 1 further comprising:

a speed change output shaft operatively coupled with the traveling device; and a reverse movement transmission mechanism capable of operatively transmitting the rotation power of the second element to the speed change output shaft in a reverse rotation state, wherein the output side first and second transmission mechanisms are capable of operatively transmitting the rotation power of the second element and the first element, respectively, to the speed change output shaft in a normal rotation state, wherein the speed change operation member is capable of being further operated from the zero speed position toward a rearward movement side, and wherein when the speed change operation member is operated from the zero speed position toward the rearward movement side, the control device operates the HST so that the HST output is speed-changed from the first HST speed toward the second HST speed in response to an acceleration operation in the rearward movement of the speed change operation member while bringing the input side first transmission mechanism and the reverse movement transmission mechanism into an engagement state and bringing the input side second transmission mechanism and the output side first and second transmission mechanisms into a disengagement state.

9. The transmission mechanism according to claim 2 further comprising:
a speed change output shaft operatively coupled with the traveling device; and
an output side third transmission mechanism capable of operatively transmitting the rotation power of the first element to the speed change output shaft in parallel with the output side second transmission mechanism,
wherein the output side first and second transmission mechanisms operatively rotating the speed change output shaft at output side first and second speed change ratios, respectively, and the output side third transmission mechanism operatively rotating the speed change output shaft at an output side third speed change ratio higher than the output side second speed change ratio,
wherein the speed change operation member is capable to be also operated in a range between the second traveling speed and a third traveling speed beyond the second traveling speed in the forward movement,
wherein when the speed change operation member is operated in the range between the second and third traveling speeds, the control device operates the HST so that the HST output is speed-changed from the second HST speed toward the first HST speed in response to an acceleration operation in the forward movement of the speed change operation member while developing a third transmission state where the first element functions as the output portion of outputting rotation power to the speed change output shaft and the second element functions as the input portion of the rotation power from the driving source by bringing the input side first transmission mechanism into a disengagement state, bringing the input side second transmission mechanism into an engagement state, bringing the output side third transmission mechanism into an engagement state and bringing other output side transmission mechanisms into a disengagement state, and
wherein in switching between the second and third transmission states, the control device operates the HST so that rotational speed developed in the speed change output shaft in a transmission state after the switching substantially coincides with rotational speed developed in the speed change output shaft in a transmission state before the switching.

10. The transmission mechanism according to claim 7 further comprising an output side third transmission mechanism operatively coupled with the first element and capable of outputting the rotation power to the traveling transmission shaft in such a manner that the traveling transmission shaft rotates in the same rotational direction as the speed change output shaft,
wherein the output side first and second transmission mechanisms have output side first and second speed change ratios, respectively, and the output side third transmission mechanism has an output side third speed change ratio higher than the output side second speed change ratio,
wherein the speed change operation member is capable to be also operated in a range between the second traveling speed and a third traveling speed in the forward movement,
wherein when the speed change operation member is operated in the range between the second and third traveling speeds, the control device operates the HST so that the HST output is speed-changed from the second HST speed toward the first HST speed in response to an acceleration operation in the forward movement of the speed change operation member while developing a third transmission state where rotation power of the first element is operatively transmitted to the speed change output shaft and the second element functions as the input portion of the rotation power from the driving source by bringing the input side first transmission mechanism into a disengagement state, bringing the input side second transmission mechanism into an engagement state, bringing the output side third transmission mechanism into an engagement state and bringing other output side transmission mechanisms into a disengagement state, and
wherein in switching between the second and third transmission states, the control device operates the HST so that rotational speed developed in the speed change output shaft in a transmission state after the switching substantially coincides with rotational speed developed in the speed change output shaft in a transmission state before the switching.

11. A transmission structure comprising:
an Hydrostatic Transmission (HST) continuously changing rotation power operatively input into a pump shaft from a driving source to rotation power at least between first HST speed and second HST speed according to an operation position of an output adjustment member, and then outputting the changed rotation power as an HST output from a motor shaft;
a planetary gear mechanism having first to third elements, in which the third element functions as an input portion of the HST output;
a speed change output shaft;
input side first and second transmission mechanisms capable of operatively transmitting the rotation power of the driving source to the first element and the second element, respectively;
input side first and second clutch mechanisms engaging/disengaging power transmission of the input side first and second transmission mechanisms, respectively;
forward movement first and second transmission mechanisms capable of operatively transmitting rotation power of the second element and the first element, respectively, to the speed change output shaft in a normal rotation state;
a reverse movement transmission mechanism capable of operatively transmitting the rotation power of the second element to the speed change output shaft in a reverse rotation state;
a forward movement first clutch mechanism, a forward movement second clutch mechanism, and a reverse movement clutch mechanism engaging/disengaging power transmission of the forward movement first transmission mechanism, the forward movement second transmission mechanism, and the reverse movement transmission mechanism, respectively;
a speed change operation member;
an HST sensor directly or indirectly detecting a speed change state of the HST;
an output sensor directly or indirectly detecting rotational speed of the speed change output shaft; and
a control device controlling operations of the output adjust member, the input side first clutch mechanism, the input side second clutch mechanism, the forward movement first clutch mechanism, the forward movement second clutch mechanism, and the reverse movement clutch mechanism, wherein based on detection signals of the HST sensor and the output sensor, in a low speed state where the rotational speed of the speed change output shaft is from zero speed to speed less than switching speed in a forward movement direction, while the control device develops a forward movement first transmission state where the input side first clutch mechanism and the forward movement first clutch mechanism are brought into an engagement state, the control device operates the output adjustment member so that the HST output is speed-changed from the first HST speed toward the second HST speed in response to a forward movement side acceleration operation of the speed change operation member, in a high speed state where the rotational speed of the speed change output shaft is equal to or higher than the switching speed in the forward movement direction, while the control device develops a forward movement second transmission state where the input side second clutch mechanism and the forward movement second clutch mechanism are brought into the engagement state, the control device operates the output adjustment member so that the HST output is speed-changed from the first HST speed toward the second HST speed in response to the forward movement side acceleration operation of the speed change operation member, and, in a reverse movement transmission state where the rotational speed of the speed change output shaft is changed from the zero speed to the reverse movement side, while the control device develops a reverse movement transmission state where the input side first clutch mechanism and the reverse movement clutch mechanism are brought into the engagement state, the control device operates the output adjustment member so that the HST output is speed-changed from the first HST speed toward the second HST speed in response to a reverse movement side acceleration operation of the speed change operation member.

12. The transmission structure according to claim 11, wherein the input side first transmission mechanism operatively transmits the rotation power of the driving source to the first element at an input side first speed change ratio,
wherein the input side second transmission mechanism operatively transmits the rotation power of the driving source to the second element at an input side second speed change ratio, and
wherein the input side first and second speed change ratios are set so that rotational speed of the second element when the HST output is set to the second HST speed in the forward movement first transmission state and rotational speed of the second element by rotation power transmitted through the input side second transmission mechanism in the forward movement second transmission state are same and so that rotational speed of the first element when the HST output is set to the second HST speed in the forward movement second transmission state and rotational speed of the first element by rotation power transmitted through the input side first transmission mechanism in the forward movement first transmission state are same.

13. The transmission structure according to claim 11, wherein the forward movement first transmission mechanism operatively transmits the rotation power of the second element to the speed change output shaft at a forward movement first speed change ratio and the forward movement second transmission mechanism operatively transmits the rotation power of the first element to the speed change output shaft at a forward movement second speed change ratio, and
wherein the forward movement first and second speed change ratios are set so that rotational speed developed in the speed change output shaft when the HST output is set to the second HST speed is same in the first and second transmission states.

14. The transmission structure according to claim 11, wherein the HST and the planetary gear mechanism are set so that the rotational speed of the second element becomes the zero speed when the HST output is set to the first HST speed in the engagement state of the input side first clutch mechanism.

* * * * *